United States Patent
Yelheri et al.

(10) Patent No.: US 11,755,590 B2
(45) Date of Patent: Sep. 12, 2023

(54) DATA CONNECTOR COMPONENT FOR IMPLEMENTING INTEGRITY CHECKING, ANOMALY DETECTION, AND FILE SYSTEM METADATA ANALYSIS

(71) Applicant: NetApp Inc., Sunnyvale, CA (US)

(72) Inventors: Sharankumar Yelheri, Santa Clara, CA (US); Atul Ramesh Pandit, Los Gatos, CA (US); Tijin George, Sunnyvale, CA (US)

(73) Assignee: NetApp, Inc., San Jose, CA (US)

( * ) Notice: Subject to any disclaimer, the term of this patent is extended or adjusted under 35 U.S.C. 154(b) by 49 days.

(21) Appl. No.: 17/242,356

(22) Filed: Apr. 28, 2021

(65) Prior Publication Data

US 2022/0138207 A1     May 5, 2022

Related U.S. Application Data

(60) Provisional application No. 63/109,717, filed on Nov. 4, 2020.

(51) Int. Cl.
*G06F 16/00* (2019.01)
*G06F 16/2457* (2019.01)
(Continued)

(52) U.S. Cl.
CPC .... *G06F 16/24573* (2019.01); *G06F 11/1448* (2013.01); *G06F 16/219* (2019.01); *G06F 16/2246* (2019.01); *G06F 16/289* (2019.01)

(58) Field of Classification Search
None
See application file for complete search history.

(56) References Cited

U.S. PATENT DOCUMENTS

| 7,631,155 B1 | 12/2009 | Bono et al. |
| 8,285,758 B1 | 10/2012 | Bono et al. |

(Continued)

FOREIGN PATENT DOCUMENTS

| EP | 1618504 A1 | 1/2006 |
| WO | 2015116125 A1 | 8/2015 |
| WO | 2019212768 A1 | 11/2019 |

OTHER PUBLICATIONS

EP Search Report cited in EP Application No. 21206538.7 dated Apr. 19, 2022, 7 pgs.

(Continued)

*Primary Examiner* — Jean M Corrielus
(74) *Attorney, Agent, or Firm* — COOPER LEGAL GROUP, LLC

(57) ABSTRACT

Techniques are provided for on-demand creation and/or utilization of containers and/or serverless threads for hosting data connector components. The data connector components can be used to perform integrity checking, anomaly detection, and file system metadata analysis associated with objects stored within an object store. The data connector components may be configured to execute machine learning functionality to perform operations and tasks. The data connector components can perform full scans or incremental scans. The data connector components may be stateless, and thus may be offlined, upgraded, onlined, and/or have tasks transferred between data connector components. Results of operations performed by the data connector components upon base objects may be stored within sibling objects.

20 Claims, 31 Drawing Sheets

(51) Int. Cl.
*G06F 16/28* (2019.01)
*G06F 16/22* (2019.01)
*G06F 11/14* (2006.01)
*G06F 16/21* (2019.01)

(56) References Cited

U.S. PATENT DOCUMENTS

| | | |
|---|---|---|
| 9,767,106 B1 | 9/2017 | Duggal et al. |
| 9,817,834 B1 * | 11/2017 | Searls .................. G06F 16/128 |
| 9,898,369 B1 | 2/2018 | Moghe et al. |
| 10,019,180 B1 | 7/2018 | Miah et al. |
| 10,089,187 B1 | 10/2018 | Pecoraro et al. |
| 10,114,581 B1 | 10/2018 | Natanzon et al. |
| 10,296,594 B1 | 5/2019 | Datta |
| 10,417,190 B1 | 9/2019 | Donlan et al. |
| 10,936,191 B1 | 3/2021 | Lakshminarayanan |
| 11,016,943 B2 | 5/2021 | George et al. |
| 11,032,156 B1 | 6/2021 | Jain et al. |
| 11,080,253 B1 | 8/2021 | Leshinsky et al. |
| 11,086,105 B2 | 8/2021 | Chang et al. |
| 11,144,502 B2 | 10/2021 | George et al. |
| 11,144,503 B2 | 10/2021 | George et al. |
| 11,157,455 B2 | 10/2021 | Narasingarayanapeta et al. |
| 11,182,096 B1 | 11/2021 | Tang et al. |
| 11,392,541 B2 | 7/2022 | Bhattacharya et al. |
| 11,442,893 B2 | 9/2022 | Chen et al. |
| 11,531,648 B2 | 12/2022 | Smith et al. |
| 11,573,859 B2 | 2/2023 | Kumarasamy |
| 11,573,860 B1 | 2/2023 | Xiang et al. |
| 11,625,306 B2 | 4/2023 | Yelheri et al. |
| 2004/0260673 A1 | 12/2004 | Hitz et al. |
| 2006/0242489 A1 | 10/2006 | Brockway et al. |
| 2007/0100905 A1 | 5/2007 | Masters et al. |
| 2010/0179959 A1 | 7/2010 | Shoens |
| 2010/0332101 A1 * | 12/2010 | Braunberger ............ B60Q 1/26 340/905 |
| 2010/0332401 A1 | 12/2010 | Anand et al. |
| 2012/0143825 A1 | 6/2012 | Boehm et al. |
| 2012/0317079 A1 | 12/2012 | Shoens et al. |
| 2014/0040199 A1 | 2/2014 | Golab et al. |
| 2014/0156601 A1 | 6/2014 | Strunk et al. |
| 2014/0181039 A1 | 6/2014 | Harrison et al. |
| 2014/0222878 A1 | 8/2014 | Avati et al. |
| 2015/0100791 A1 | 4/2015 | Chen et al. |
| 2016/0057229 A1 * | 2/2016 | Barton .................... H04L 67/06 709/219 |
| 2016/0378563 A1 | 12/2016 | Gaurav |
| 2017/0091235 A1 | 3/2017 | Yammine et al. |
| 2017/0123935 A1 | 5/2017 | Pandit et al. |
| 2017/0366606 A1 | 12/2017 | Ban-Shaul |
| 2018/0137014 A1 | 5/2018 | Li et al. |
| 2018/0150548 A1 | 5/2018 | Shah |
| 2018/0196827 A1 | 7/2018 | Sundaram et al. |
| 2018/0314835 A1 | 11/2018 | Dodson et al. |
| 2018/0356989 A1 | 12/2018 | Meister et al. |
| 2019/0065323 A1 | 2/2019 | Dhamdhere et al. |
| 2019/0220198 A1 | 7/2019 | Kashi Visvanathan et al. |
| 2019/0311049 A1 | 10/2019 | Bhargava M R et al. |
| 2019/0354617 A1 | 11/2019 | Kim |
| 2019/0361626 A1 | 11/2019 | East |
| 2019/0370610 A1 | 12/2019 | Batoukov et al. |
| 2020/0065199 A1 | 2/2020 | Xing et al. |
| 2020/0241754 A1 | 7/2020 | Bett et al. |
| 2020/0242075 A1 | 7/2020 | Davis et al. |
| 2020/0285612 A1 * | 9/2020 | George ................. G06F 16/128 |
| 2020/0285613 A1 * | 9/2020 | George ................. G06F 16/128 |
| 2020/0285614 A1 * | 9/2020 | George ............... G06F 11/1451 |
| 2020/0285616 A1 * | 9/2020 | George ................. G06F 16/162 |
| 2021/0048995 A1 | 2/2021 | Myers et al. |
| 2021/0240911 A1 | 8/2021 | Kucherov et al. |
| 2021/0342304 A1 | 11/2021 | Bangalore et al. |
| 2021/0382857 A1 | 12/2021 | Srivas |
| 2021/0406129 A1 | 12/2021 | Zheng et al. |
| 2021/0406216 A1 * | 12/2021 | Komatsu ............... G06F 16/128 |
| 2022/0027313 A1 | 1/2022 | George et al. |
| 2022/0138048 A1 | 5/2022 | Yelheri et al. |
| 2022/0138051 A1 | 5/2022 | Yelheri et al. |
| 2022/0138151 A1 | 5/2022 | Yelheri et al. |
| 2022/0138152 A1 | 5/2022 | Yelheri et al. |
| 2022/0138153 A1 * | 5/2022 | Yelheri ............... H04L 67/1095 707/649 |
| 2022/0138169 A1 | 5/2022 | Yelheri et al. |
| 2022/0382637 A1 * | 12/2022 | Balasubramanian ........................ G06F 11/1435 |
| 2023/0029616 A1 * | 2/2023 | Pandit ..................... G06F 3/065 |

OTHER PUBLICATIONS

EP Search Report cited in EP Application No. 2120653.7 dated Apr. 19, 2022, 8 pgs.
"Stateful Container Online Migration Method and Apparatus", 2015, Liu Quanbo and Xu Jun, Published May 25, 2018, 18 pgs.
"Destructors", Jun. 2022, Erez Metula, in Managed Code Rootkits, ScienceDirest, Reprinted from the Internet at http://www.sciencedirect.com/topics/computer-science/destructors, 11 pgs.
Non-Final Office Action cited in U.S. Appl. No. 17/242,399 dated Jul. 21, 2022, 30 pgs.
Non-Final Office Action cited in U.S. Appl. No. 17/242,448 dated Jul. 13, 2022, 25 pgs.
International Search Report and Written Opinion for Application No. PCT/US2021/057856 dated Apr. 26, 2022, 20 pages.
International Search Report and Written Opinion for Application No. PCT/US2021/057878 dated Feb. 24, 2022, 14 pages.
Michael V., et al., "Cumulus," ACM Transactions on Storage, Association for Computing Machinery, New York, 2009, vol. 5(4), pp. 1-28.
Co-pending U.S. Appl. No. 18/297,671, inventor Yelheri; Sharankumar, filed Apr. 10, 2023.
Non-Final Office Action dated Mar. 15, 2023 for U.S. Appl. No. 17/242,429, filed Apr. 28, 2021, 22 pages.
Final Office Action dated Jun. 8, 2023 for U.S. Appl. No. 17/242,363, filed Apr. 28, 2021, 15 pages.
International Preliminary Report on Patentability for Application No. PCT/US2021/057856 dated May 19, 2023, 15 pages.
International Preliminary Report on Patentability for Application No. PCT/US2021/057878, dated May 19, 2023, 11 pages.
Non-Final Office Action dated May 11, 2023 for U.S. Appl. No. 17/242,399, filed Apr. 28, 2021, 39 pages.
Notice of Allowance dated Jun. 2, 2023 for U.S. Appl. No. 17/242,448, filed Apr. 28, 2021, 6 pages.
Final Office Action dated Jul. 19, 2023 for U.S. Appl. No. 17/155,138, filed Jan. 22, 2021, 18 pages.

* cited by examiner

DATA CONNECTOR COMPONENT FOR IMPLEMENTING INTEGRITY CHECKING, ANOMALY DETECTION, AND FILE SYSTEM METADATA ANALYSIS

RELATED APPLICATIONS

This application claims priority to U.S. Provisional Patent Application, titled "DATA CONNECTOR COMPONENT FOR IMPLEMENTING INTEGRITY CHECKING, ANOMALY DETECTION, AND FILE SYSTEM METADATA ANALYSIS", filed on Nov. 4, 2020 and accorded Application No.: 63/109,717, which is incorporated herein by reference.

BACKGROUND

Many users utilize cloud computing environments to store data, host applications, run virtual machines, etc. A client device may connect to a cloud computing environment in order to transmit data from the client device to the cloud computing environment for storage. The client device may also retrieve data from the cloud computing environment. In this way, the cloud computing environment can provide scalable low cost storage.

Some users and businesses may use or deploy their own primary storage systems such as a clustered network of nodes (storage controllers) for storing data, hosting applications, etc. A primary storage system may provide robust data storage and management features, such as data replication, data deduplication, encryption, backup and restore functionality, snapshot creation and management functionality, incremental snapshot creation, etc. However, storage provided by such primary storage systems can be relatively more costly and less scalable compared to cloud computing storage. Thus, cost savings and scalability can be achieved by using a hybrid of primary storage systems and remote cloud computing storage. Unfortunately, the robust functionality provided by primary storage systems is not compatible with cloud computing storage, and thus these features are lost.

DETAILED DESCRIPTION

Figure 1:
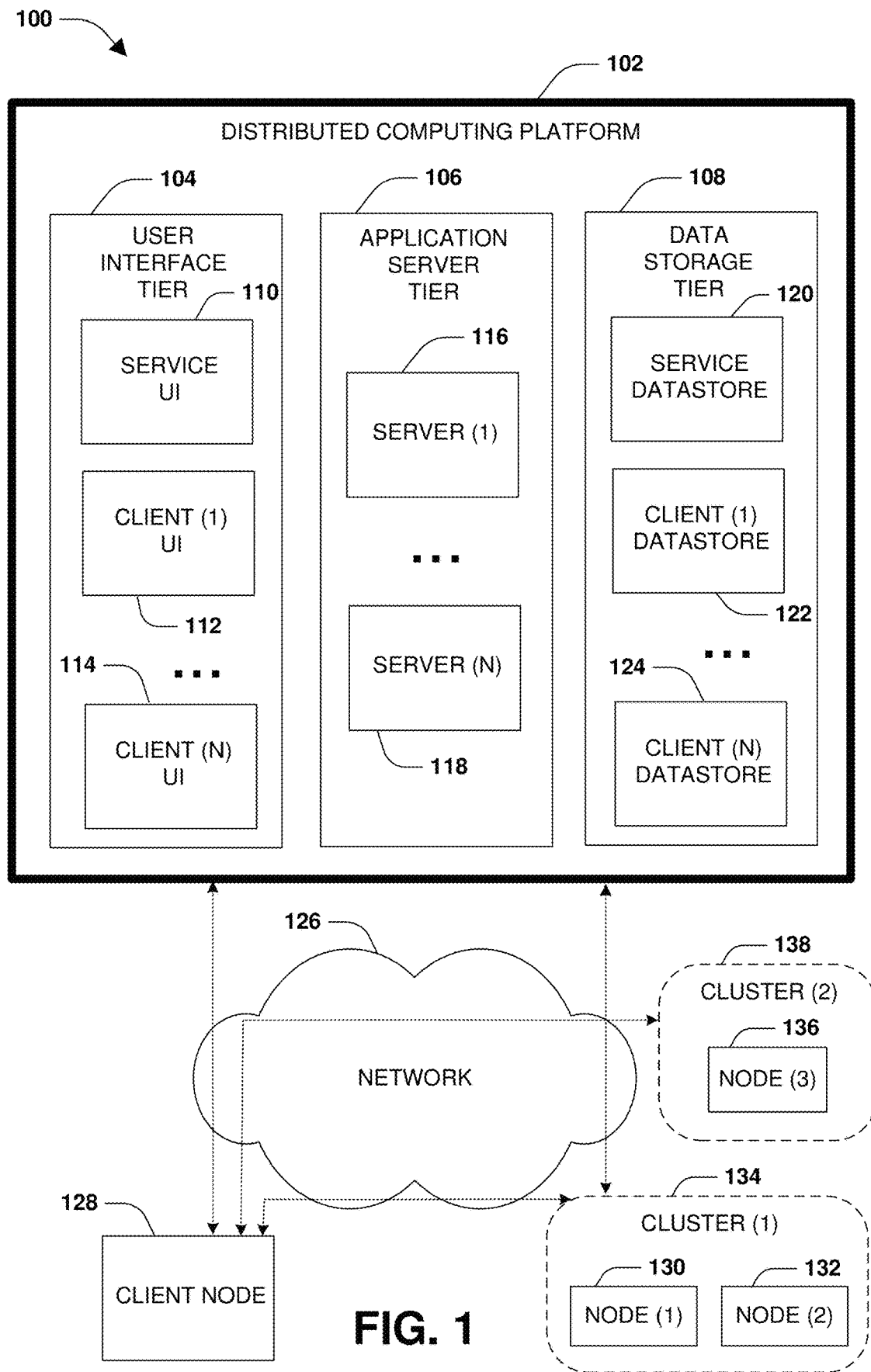
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

An object file system is used to store, retrieve, and manage objects within an object store, such as a cloud computing environment. The object file system is capable of representing data in the object store in a structured format. It may be appreciated that any type of data (e.g., a file, a directory, an image, a storage virtual machine, a logical unit number (LUN), application data, backup data, metadata, database data, a virtual machine disk, etc.) residing in any type of computing device (e.g., a computer, a laptop, a wearable device, a tablet, a storage controller, a node, an on-premise server, a virtual machine, another object store or cloud computing environment, a hybrid storage environment, data already stored within the object store, etc.) using any type of file system can be stored into objects for storage within the object store. This allows the data to be represented as a file system so that the data of the objects can be accessed and mounted on-demand by remote computing devices. This also provides a high degree of flexibility in being able to access data from the object store, a cloud service, and/or a network file system for analytics or data access on an on-demand basis. The object file system is able to represent snapshots in the object store according to a snapshot file system tree structure, and provides the ability to access snapshot data universally for whomever has access to an object format of the object file system. Snapshots in the object store are self-representing through the snapshot file system tree structure, and the object file system provides access to a complete snapshot copy without having to access other snapshots.

The object file system provides the ability to store any number of snapshots in the object store so that cold data (e.g., infrequently accessed data) can be stored for long periods of time in a cost effective manner, such as in the cloud. The object file system stores data within relatively larger objects to reduce cost. Representation of data in the object store is complete, such that all data and required container properties can be independently recovered from the object store. The object file system format ensures that access is consistent and is not affected by eventual consistent nature of underlying cloud infrastructure.

The object file system provides version neutrality. Changes to on-prem metadata versions provide little impact on the representation of data in the object store. This allow data to be stored from multiple versions of on-prem over time, and the ability to access data in the object store without much version management. The object file system provides an object format that is conducive to garbage collection for freeing objects (e.g., the ability to free and reuse slots and/or objects storing data of a delete snapshot), such as where a lower granularity of data can be garbage collected such as at a per snapshot deletion level.

In an embodiment, snapshots of data, such as of a primary volume, maintained by a computing device (e.g., a node, storage controller, or other on-prem device that is remote to the object store) can be created by the computing device. The snapshots can be stored, such as by a data mover, in the object store independent of the primary volume and can be retained for any duration of time. Data can be restored from the snapshots without dependency on the primary volume (e.g., the data can be restored to a different volume or at a different computing device). The snapshot copies in the object store can be used for load distribution, development testing, virus scans, analytics, etc. Because the snapshot copies (e.g., snapshot data stored within objects) are independent of the primary volume at the computing device, such operations can be performed without impacting performance of the computing device.

A snapshot is frozen in time representation of a file system. All the necessary information may be organized as files. All the blocks of the file system may be stitched together using cloud block numbers (e.g., a cloud block number comprises a sequence number of an object and a slot number of a slot within that object) and the file will be represented by a data structure (e.g., represented by a snapshot file system tree structure) when stored into the object store within one or more objects. Using cloud block numbers, a next node within the snapshot file system tree structure can be identified for traversing the snapshot file system tree structure to locate a node representing data to be accessed. The block of the data may be packed into bigger objects in order to be cloud storage friendly, where blocks are stored into slots of a bigger object that is then stored within the object store. All the indirections (pointers) to reach leaf nodes of a file (e.g., user data such as file data is represented by leaf nodes within the snapshot file system tree structure) may be normalized and may be version independent. Every snapshot may be a completely independent copy, and any data for a snapshot can be located by walking the object file system by traversing the snapshot file system tree structure. While doing incremental snapshot copy, changed blocks between two snapshots may be copied to the object store, and unchanged blocks will be shared with previous snapshots as opposed to being redundantly stored in the object store. In this way, deduplication is provided for and between snapshot data stored within objects of the object store. As will be described later, an embodiment of a snapshot file system in the object store is illustrated by FIG. 5B.

Cloud block numbers are used to uniquely represent data (e.g., a block's worth of information from the computing device) in the object store at any point in time. A cloud block number is used to derive an object name (e.g., a sequence number) and an index (a particular slot) within the object. An object format, used by the object file system to format objects, allows for sharing of cloud blocks. This provides for storage space efficiency across snapshots so that deduplication and compression used by the computing device will be preserved. Additional compression is applied before writing objects to the object store and information to decompress the data is kept in the object header.

Similar to data (e.g., a file, directory, or other data stored by the computing device), metadata can be stored into objects. Metadata is normalized so that the restoration of data using the metadata from an object to a remote computing device will be version independent. That is, snapshot data at the computing device can be stored into objects in a version neutral manner. Snapshots can be mounted and traversed independent of one another, and thus data within an object is represented as a file system, such as according to the snapshot file system tree structure. The format of non-leaf nodes of the snapshot file system tree structure (e.g., indirects such as pointers to other non-leaf nodes or to leaf nodes of user data) can change over time. In this way, physical data is converted into a version independent format as part of normalization. Denormalization may be performed while retrieving data from the objects, such as to restore a snapshot. In an example of normalization, a slot header in an object has a flag that can be set to indicate that a slot comprises normalized content. Each slot of the object is independently represented. Slot data may comprise version data. The slot data may specify a number of entries within the object and an entry size so that starting offsets of a next entry can be calculated from the entry size of a current entry.

In an embodiment, denormalization of a first version of data/metadata (e.g., a prior version) can be retrieved from data backed up in an object according to a second version (e.g., a future version). In an example, if the future version added a new field, then during denormalization, the new field is skipped over. Denormalization of a future version can be retrieved from data backed up in an object according to a prior version. A version indicator in the slot data can be used to determine how of an entry is to be read and interpreted, and any missing fields will be set to default values.

In an embodiment of the object format of objects stored within the object store by the data mover, relatively larger objects will be stored in the object store. As will be described later, an embodiment of an object is illustrated by FIG. 5C. An object comprises an object header followed by data blocks (slots). The object header has a static array of slot context comprising information used to access data for slots. Each slot can represent any length of logical data (e.g., a slot is a base unit of data of the object file system of the object store). Since data blocks for metadata are normalized, a slot can represent any length of logical data. Data within the slots can be compressed into compression groups, and a slot will comprise enough information for how to decompress and return data of the slot.

In an embodiment, storage efficiency provided by the computing device is preserved within the object store. A volume copied from the computing device into objects of the object store is maintained in the object store as an independent logical representation of the volume. Any granularity of data can be represented, such as a directory, a qtree, a file, or other data container. A mapping metafile (a VMAP) is used to map virtual block IDs/names (e.g., a virtual volume block number, a hash, a compression group name, or any other set of names of a collection of data used by the computing device) to cloud block numbers in the object store. This mapping metafile can be used to track duplicate data per data container for storage efficiency.

The mapping metafile enables duplicate data detection of duplicate data, such as a duplicate block or a compression group (e.g., a compressed group of blocks/slots within an object). The mapping metafile is used to preserve sharing of data within and across multiple snapshots stored within objects in the object store. The mapping metafile is used for sharing of groups of data represented by a unique name. The mapping metafile is used to populate indirect blocks with corresponding cloud block numbers for children nodes (e.g., compressed or non-compressed). The mapping metafile is used to help a garbage collector make decisions on what cloud block numbers can be freed from the object store when a corresponding snapshot is deleted by the computing device. The mapping metafile is updated during a snapshot copy operation to store snapshot data from the computing device into objects within the object store. An overflow mapping metafile can also be used, such as to represent entries with base key collision. The overflow mapping metafile will support variable length key and payload in order to optimize a key size according to a type of entry in the overflow mapping metafile.

The mapping metafile may be indexed by virtual volume block numbers or starting virtual volume block numbers of a compression group. An entry within the mapping metafile may comprise a virtual volume block number as a key, a cloud block number, an indication of whether the cloud block number is the start of a compression group, a compression indicator, an indicator as to whether additional information is stored in the overflow mapping metafile, a logical length of the compression group, a physical length of the compression group, etc. Entries are removed/invalidated from the mapping metafile if corresponding virtual volume block numbers are freed by the computing device, such as when a snapshot is deleted by the computing device.

The data structure, such as the snapshot file system tree structure, is used to represent data within an object. Each node of the snapshot file system tree structure is represented by a cloud block number. The key to the snapshot file system tree structure may uniquely identify uncompressed virtual volume block numbers, a contiguous or non-contiguous compression group represented by virtual volume block numbers associated with such, and/or an entry for non-starting virtual volume block numbers of the compression group to a starting virtual volume block number of the compression group. A key will comprise a virtual volume block number, a physical length of a compression group, an indicator as to whether the entry represents a start of the compression group, and/or a variable length array of virtual volume block numbers of either non-starting virtual volume block numbers or the starting virtual volume block number (if uncompressed then this is field is not used). The payload will comprise cloud block numbers and/or flags corresponding to entries within the mapping metafile.

Before transferring objects to the object store for an incremental snapshot, the mapping metafile is processed to clear any stale entries. This is to ensure that a stale virtual volume block number or compression group name is not reused for sharing (deduplication). In particular, between two snapshots, all virtual volume block numbers transitioning from a 1 to 0 (to indicate that the virtual volume block numbers are no longer used) in a snapshot to be copied to the object store in one or more objects are identified. Entries within the mapping metafile for these virtual volume block numbers transitioning from a 1 to 0 are removed from the mapping metafile. In this way, all entries using these virtual volume block numbers are invalidated.

As part of copying a snapshot to the object store, changed data and indirections for accessing the changed data are transferred (or all data for initialization). In particular, changed user data of the computing device is traversed through buftrees using a snapdiff operation (a difference operation) to determine a data difference between two snapshots. Logical (uncompressed) data is read and populated into objects and associated with cloud block numbers. To preserve storage efficiency, a mapping from a unique name representing the logical data (e.g., virtual volume block number or a compression group name for compressed data) to a cloud block number (e.g., of a slot within which the logical data is stored) is recorded in the mapping metafile. Lookups to the mapping metafile will be performed to ensure only a single copy of changed blocks are copied to the object store. Metadata is normalized for version independency and stored into objects. Indirects (non-leaf nodes) are stored in the object to refer to unchanged old cloud blocks and changed new cloud blocks are stored in the object, which provides a complete view of user data and metadata for each snapshot. Inodes are written to the object store while pushing changed inofile blocks to the object store. Each inode entry within an inofile is normalized to represent a version independent inode format. Each inode will have a list of next level of indirect blocks (e.g., non-leaf nodes of the snapshot file system tree structure storing indirects/pointers to other nodes). Snapinfo objects comprise snapshot specific information. A snapinfo object of a snapshot has a pointer to a root of a snapshot logical file system. A root object for each primary volume (e.g., a primary volume for which a snapshot is captured) is copied to the object store. Each snapshot is associated with an object ID (sequence number) map that tracks which objects are in use in a snapshot (e.g., which objects comprise data of the snapshot) and is subsequently used for garbage collection in the future when a particular snapshot is deleted.

In an embodiment of data access and restoration, the snapshot file system tree structure represents an object file system (a cloud file system) that can be mounted and/or traversed from any remote device utilizing APIs using a thin layer orchestrating between client requests and object file system traversal. A remote device provides an entry point to the object tree using a universal identifier (UUID) that is a common identifier for all object names for a volume (or container). A rel root object is derived from the UUID, which has pointers (names) to next level snapinfo objects. If a user is browsing a snapshot, a snapshot snapinfo is looked up within snapinfo objects. If no snapshot is provided, then latest snapshot info is used. The snapshot info has cloud block numbers for an inode file. The inode file is read from the object store using the cloud block number and an inode within the inode file is read by traversing the inode file's tree structure. Each level including the inode has a cloud block number for a next level until a leaf node (a level 0 block of data) is read. Thus, the inode for the file of interest is obtained, and the file's tree structure is traversed by looking up cloud block number for a next level of the tree structure (e.g., a cloud block number from a level 1 is used to access the level 0 block) until the required data is read. Object headers and higher level indirects are cached to reduce the amount of access to the object store. Additionally, more data may be read from the object store than needed to benefit from locality for caching. Data access can be used to restore a complete copy of a snapshot, part of a snapshot (e.g., a single file or directory), or metadata.

In an embodiment of read/write cloning, a volume or file, backed from a snapshot in the object store, is created. Read access will use a data access path through a tree structure. At a high level, write access will read the required data from the object store (e.g., user data and all levels of the file/volume tree that are part of user data modification by a write operation). The blocks are modified and the modified content is rewritten to the object store.

In an embodiment, defragmentation is provided for objects comprising snapshot copies in the object store and to prevent fragmented objects from being sent to the object store during backup. Defragmentation of objects involves rewriting an object with only used data, which may exclude unused/freed data no longer used by the computing device (e.g., data of a deleted snapshot no longer referenced by other snapshots). An object can only be overwritten if used data is not changed. Object sequence numbers are not reused. Only unused data can be freed, but used data cannot be overwritten. Reads will ensure that slot header and data are read from same object (timestamp checking). Reading data from the object store involves reading the header info and then reading the actual data. If these two reads go to different objects (as determined by timestamp comparison), then the read operation is failed and retried.

Defragmentation occurs when snapshots are deleted and objects could not be freed because another snapshot still contains some reference to the objects that would be freed (not all slots within these objects are freed but some still comprise used data from other snapshots). A slot within an object can only be freed when all snapshots referring to that slot are deleted (e.g., an oldest snapshot having the object in use such that younger snapshots do not reuse the freed slots). Also, ownership count can be persistently stored. When a snapshot is deleted, all objects uniquely owned by that snapshot are freed, but objects present in other snapshots (e.g., a next/subsequent snapshot) are not freed. A count of such objects is stored with a next snapshot so that the next snapshot becomes the owner of those objects. Defragmentation is only performed when a number of used slots in an object (an object refcount) is less than a threshold. If the number is below a second threshold, then further defragmentation is not performed. In order to identify used slots and free slots, the file system in the snapshot is traversed and a bitmap is constructed where a bit will be used to denote if a cloud block is in use (a cloud block in-use bitmap). This map is used to calculate the object refcount.

To perform defragmentation, the cloud block in-use map is prepared by walking the cloud snapshot file system. This bitmap is walked to generate an object refcount for the object. The object refcount is checked to see if it is within a range to be defragmented. The object is checked to see if the object is owned by the snapshot by comparing an object ID map of a current and a previous snapshot. If the object is owned and is to be defragmented, then the cloud block in-use map is used to find free slots and to rewrite the object to comprise data from used slots and to exclude freed slots. The object header will be updated accordingly with new offsets.

Fragmentation may be mitigated. During backup, an object ID map is created to contain a bit for each object in use by the snapshot (e.g., objects storing snapshot data of the snapshot). The mapping metafile (VMAP) is walked to create the object ID map. An object reference map can be created to store a count of a number of cloud blocks in use in that object. If the count is below a threshold, then data of the used blocks can be rewritten in a new object.

For each primary volume copied to the object store, there is a root object having a name starting with a prefix followed by a destination end point name and UUID. The root object is written during a conclude phase. Another copy for the root object is maintained with a unique name as a defense to eventual consistency, and will have a generation number appended to the name. A relationship state metafile will be updated before the root object info is updated. The root object has a header, root info, and bookkeeping information. A snapshot info is an object containing snapshot specific information, and is written during a conclude phase of a backup operation. Each object will have its own unique sequence number, which is generated automatically.

As provided herein, one or more data connector components are implemented for integrity checking, anomaly detection, and file system metadata analysis associated with objects within an object store. A data mover may be configured to copy snapshots from a storage operating system of a node into an object store as objects. In particular, the data mover may transform data within a volume into an object format having a tree structure (e.g., a snapshot file system tree structure) tailored for the object store. The backup data from the volume may be structured as time-series snapshots that can be stored within the object store (e.g., cloud-resident) for a substantial amount of time. The backup data of the snapshots may be forever incremental, and a later snapshot may point to objects in prior/older snapshots (e.g., snapshots may share common data). Unfortunately, bugs and corruption in software layers could occur. If an older snapshot becomes corrupted and there is no periodic integrity checks, then newer snapshots can inherit the corruption making all snapshots sharing the corruption as unusable without a user being aware of such.

In some embodiments, the term "serverless" may correspond to a computing execution model in which the underlying compute services platform enables a self-contained, ephemeral in both compute and memory, run-to-completion threads of compute processing mechanism. No resources are allocated to the application making use of the execution model beyond the time it is executing. The management of these ephemeral threads is entirely handled by the underlying platform with absolutely no administration by the application using the serverless execution model, according to some embodiments. Moreover, these threads are entirely state-less, and the state required for the continuation of the application is to be stored external to the computing platform. Embodiments of such a platform include the ones provided by the cloud provider (e.g., like AWS Lambda, Azure functions, Cloud Functions, Knative, etc.).

Accordingly, as provided herein, a data connector component is provided to detect corruption of various complexities. Depending upon the complexity of the corruption/anomaly that is to be detected between snapshots, it may not be cost and scale effective to run anomaly detection in a primary storage operating system hosting the volume (e.g., a source volume whose snapshots are backed up to the object store) actively being accessed by client I/O. Accordingly, the data connector component may be utilized for corruption and anomaly detection in a cost effective and scalable manner because the data connector component can be hosted on-demand as one or more containers and/or integrity checking functionality can be implemented through serverless threads. The containers and/or serverless threads may be generated on-demand for parallel processing of an object.

Data copied into the object store is transformed and copied as objects, but contains all the data and metadata that describes the original data in the source volume. This data and metadata is a rich source of information that can be mined or can be used to train models to generate required outputs for insight and analytics. Since the data connector component provides a scale-out and cost-effective way to access data and metadata through containers and/or serverless threads, the data connector component can be utilized for file system metadata analysis and insight.

In an embodiment of utilizing a data connector component for integrity checking, a snapshot object blueprint check may be performed. With the object store format, a snapshot is made up of objects. Some of these objects may be owned exclusively by the snapshot (e.g., objects only comprising data of the snapshot and not other data of other snapshots) and some of the objects may be shared with older snapshots. Each snapshot has a bitmap that tracks all the objects referred by a snapshot, such as objects solely owned by the snapshot and objects shared by the snapshot. In some instances, the inconsistencies in the snapshot are due to missing objects due to software bugs like bugs in garbage collection, etc. The data connector component is configured to evaluate the bitmap of each snapshot and perform a HEAD API test of each object to make sure that all the objects that constitute a snapshot can be accessed. If not, then the data connector component throws a warning at which the users can take appropriate action, such as by suggesting or automatically performing reinitializing or re-baselining of a snapshot backup relationship with a source volume so that the corruption does not affect newer snapshots. In an example, a bitmap comparison between two snapshots may be performed to avoid doing the HEAD API test for bits which are already tested in a previous snapshot's integrity checking. Bitmap checking is extremely fast, efficient, and cheap because object data is not read. In an embodiment, snapshot object blueprint checking may be performed in conjunction with data migration where object integrity checking will be used to verify that all the objects for concerned snapshots are appropriately copied during migration.

In an embodiment of utilizing a data connector component for integrity checking, object integrity checking may be performed. Each object created by the data mover has a header followed by a number of slots with each slot carrying data for parts of primary volume data. The object header contains a magic entry describing the type of object and also has checksum for each slot. The data connector component may implement an integrity checker that will read each object and do local checks, such expected magic and will compute the checksum for each slot and verify the computed checksums with the stored checksum in the object header. Any issues found will be reported to users for appropriate action.

In an embodiment of utilizing a data connector component for integrity checking, file system integrity checking may be performed. File system integrity checking may be relatively more exclusive verification. Each snapshot in the object store is an independent file system. The data connector component may implement an integrity checker that will walk through each snapshot file system tree (e.g., a tree structure of a snapshot file system) and verify a number of local and distributed aspects of the snapshot file system. Local checks will include checks such as verifying if the snapshot file system tree structure is intact and whether each object represents the expected level in the snapshot file system tree structure. Distributed checks will include bookkeeping verifications, such as whether there is an expected number of directories, files, data blocks, etc. A distributed check may verify whether a next pointer represents a next level down within a snapshot file system tree structure of a snapshot (e.g., whether a pointer within an indirect block is present add/or points to a next level down within a snapshot file system tree structure of a snapshot).

In an embodiment of utilizing a data connector component for integrity checking, anomaly detection may be performed. An example of anomaly detection includes determining whether the number of files modified in a snapshot's timeframe does not conform to an expected average number of files modified as calculated by an anomaly detection algorithm. Other examples of anomalies that may be detected are unexpected file operations such as deletes, encrypted files due to ransomware, unexpected modify times of files, unexpected data change rates, etc. This may be detected by analyzing prior statistics indicative of normal file access and management. The anomaly detection may be compute-heavy, but the data connector component can be scaled out to any number of data connector components (and/or serverless threads) and instantiated on-demand within a container, which makes the data connector component efficient for anomaly detection.

In an embodiment of utilizing a data connector component for integrity checking, file system metadata analysis may be performed. Because the object format and/or tree structure (e.g., snapshot file tree structure) represent entire source volume data and metadata and because backup data is copied as time-series snapshots, metadata analysis may be performed in a time-series fashion in order to expose insights into metadata. For example, file attributes (e.g., modify time, size, last accessed time, creation time, type, etc.) may be mined in order to generate various views (e.g., how much data changed over a timespan, what directories were accessed the most over a timespan, etc.).

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a one or more file systems to logically organize data within storage devices as one or more storage objects and provide a logical/virtual representation of how the storage objects are organized on the storage devices (e.g., a file system tailored for block-addressable storage, a file system tailored for byte-addressable storage such as persistent memory). A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other file system metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain file system operations needed to deduplicate a block, duplicate records in the dup file are sorted in certain file system sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an decompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that the file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
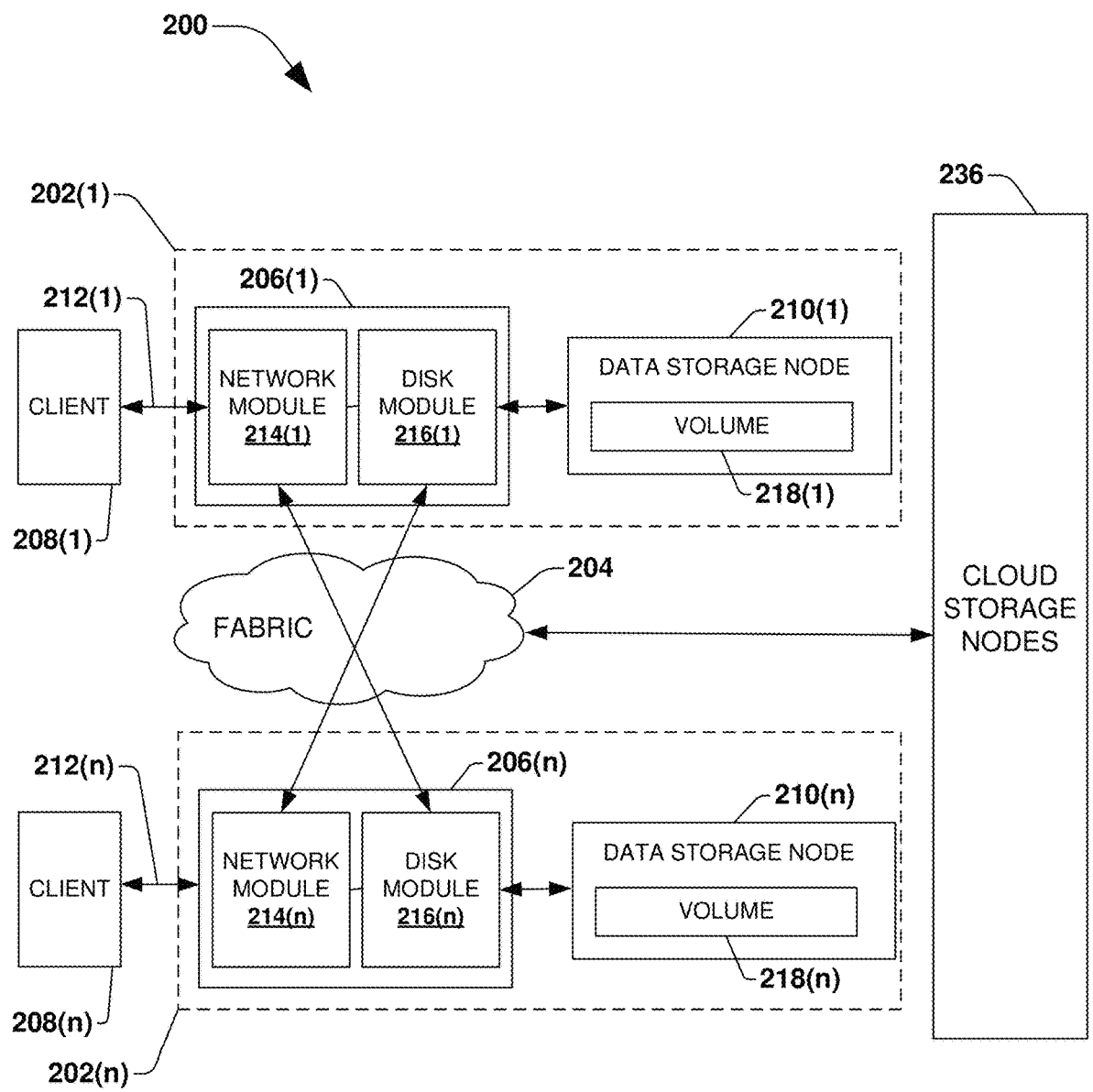
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet File system (CIFS) protocol or a Network File system (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more file systems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a file system may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
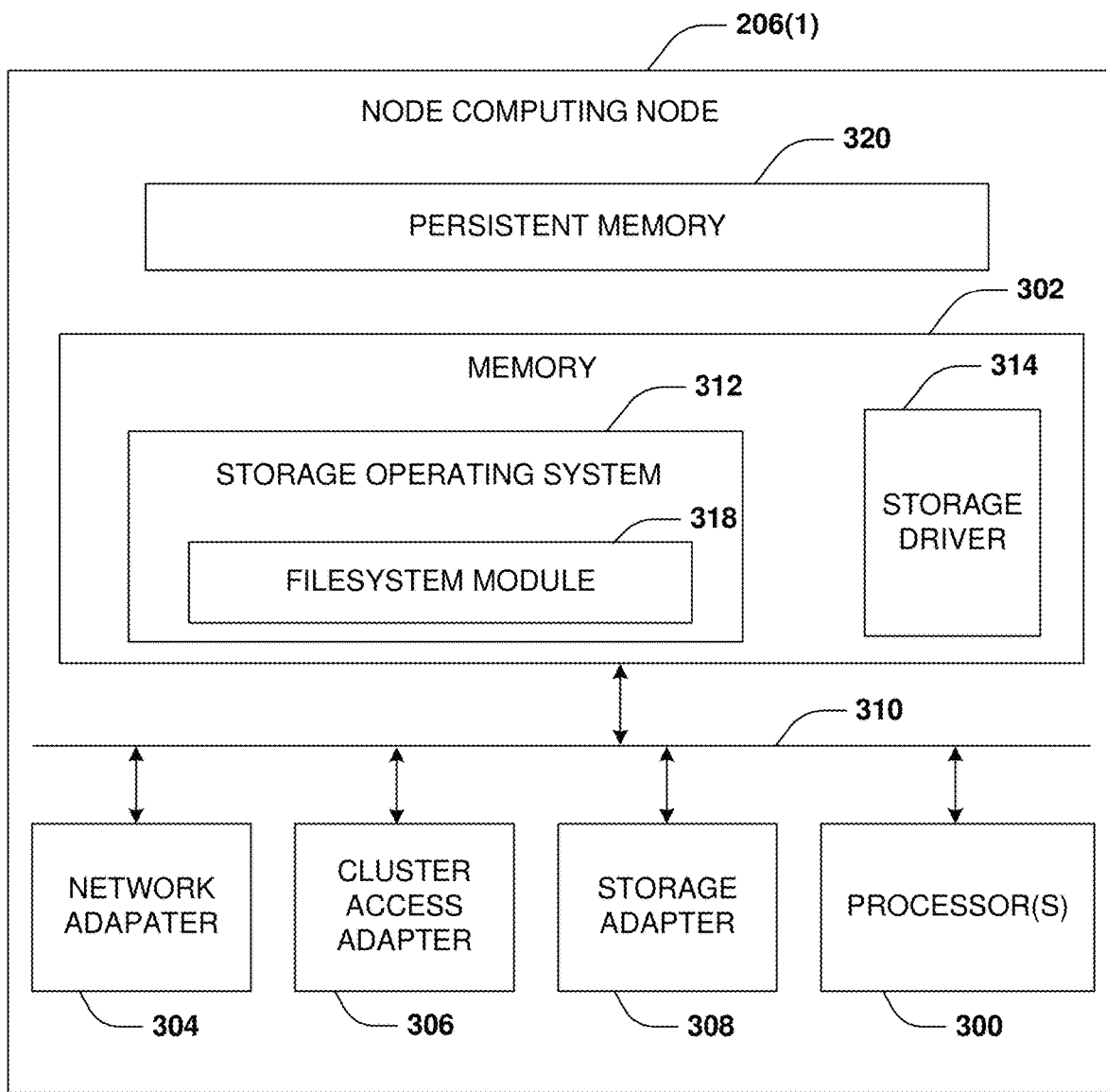
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1). In an example, a file system may be implemented for persistent memory.

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(n) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more file systems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a file system.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

In the example, the node computing device 206(1) comprises persistent memory 320. The persistent memory 320 comprises a plurality of pages within which data can be stored. The plurality of pages may be indexed by page block numbers.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
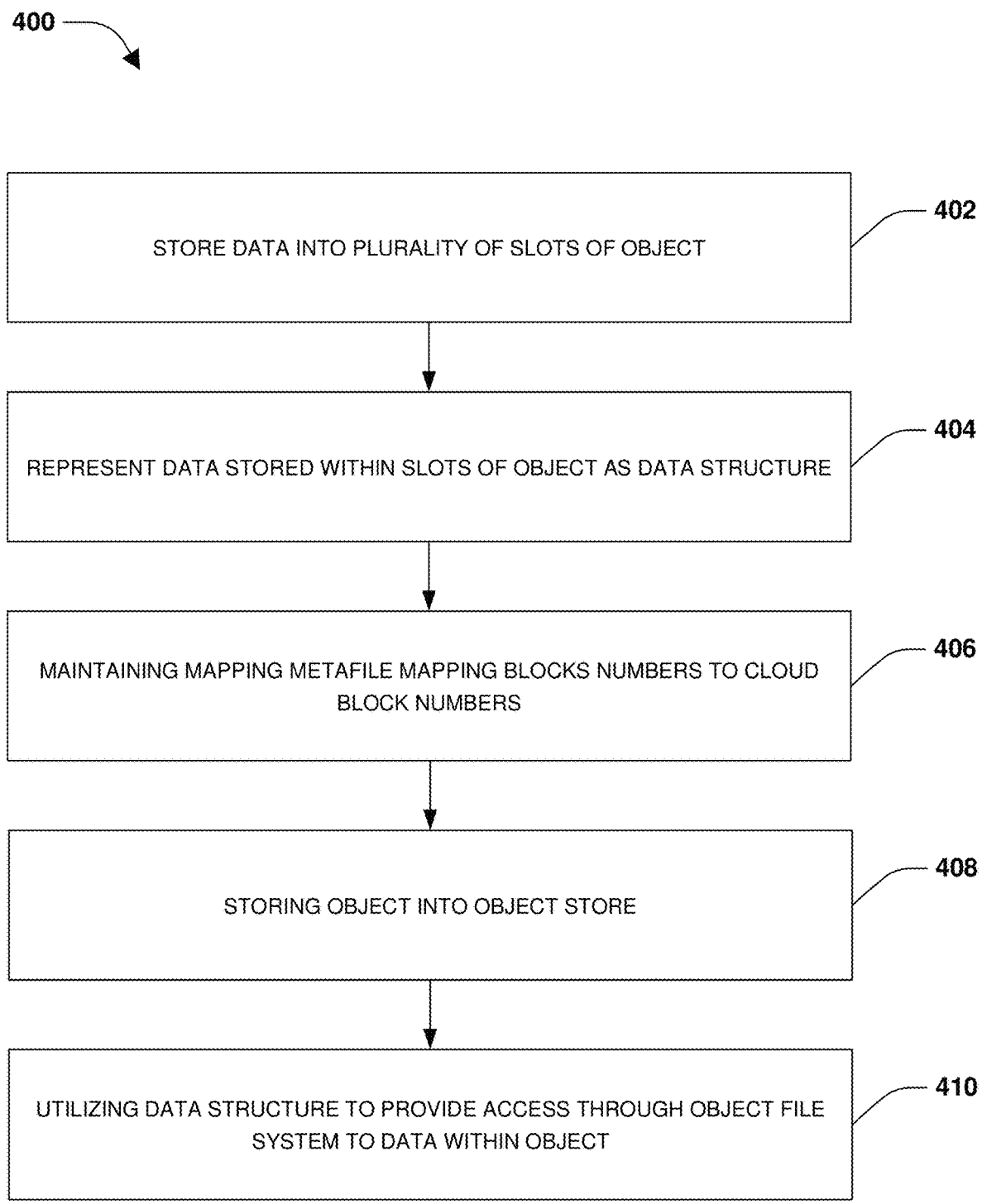
FIG. 4 is a flow chart illustrating an example method for managing objects within an object store using an object file system.
Figure 5A:
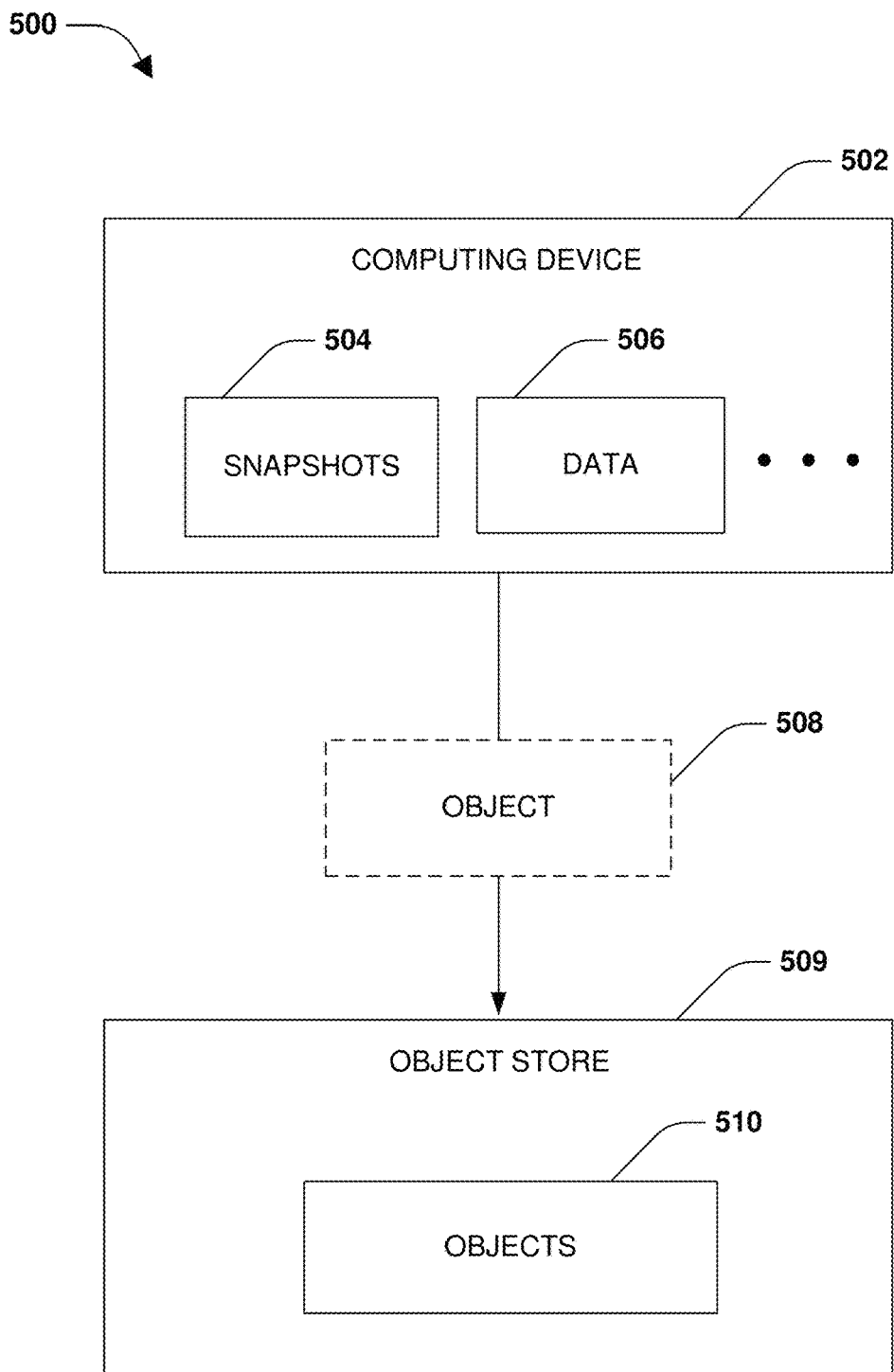
FIG. 5A is a component block diagram illustrating an example system for managing objects within an object store using an object file system.
Figure 5B:
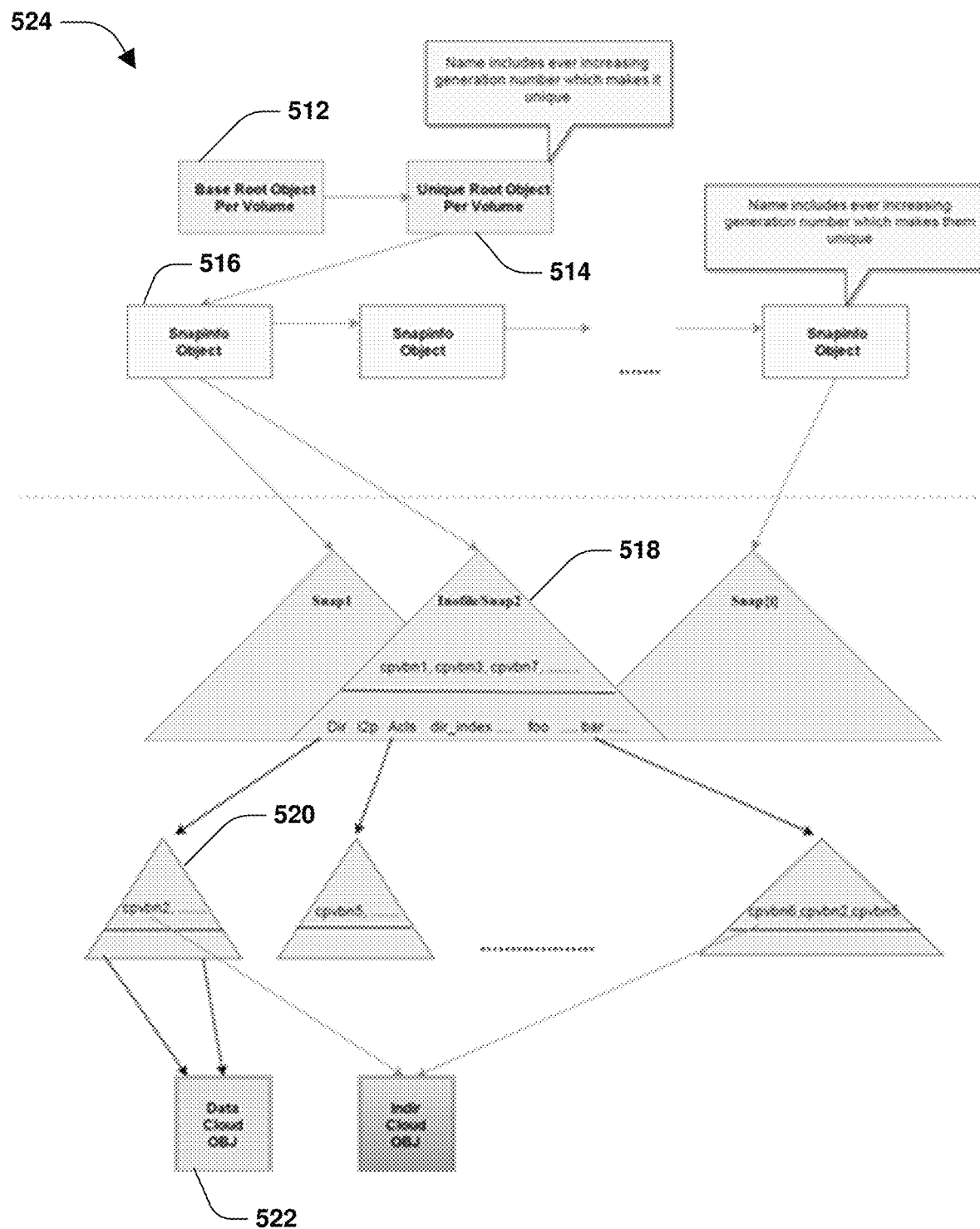
FIG. 5B is an example of a snapshot file system within an object store.
Figure 5C:
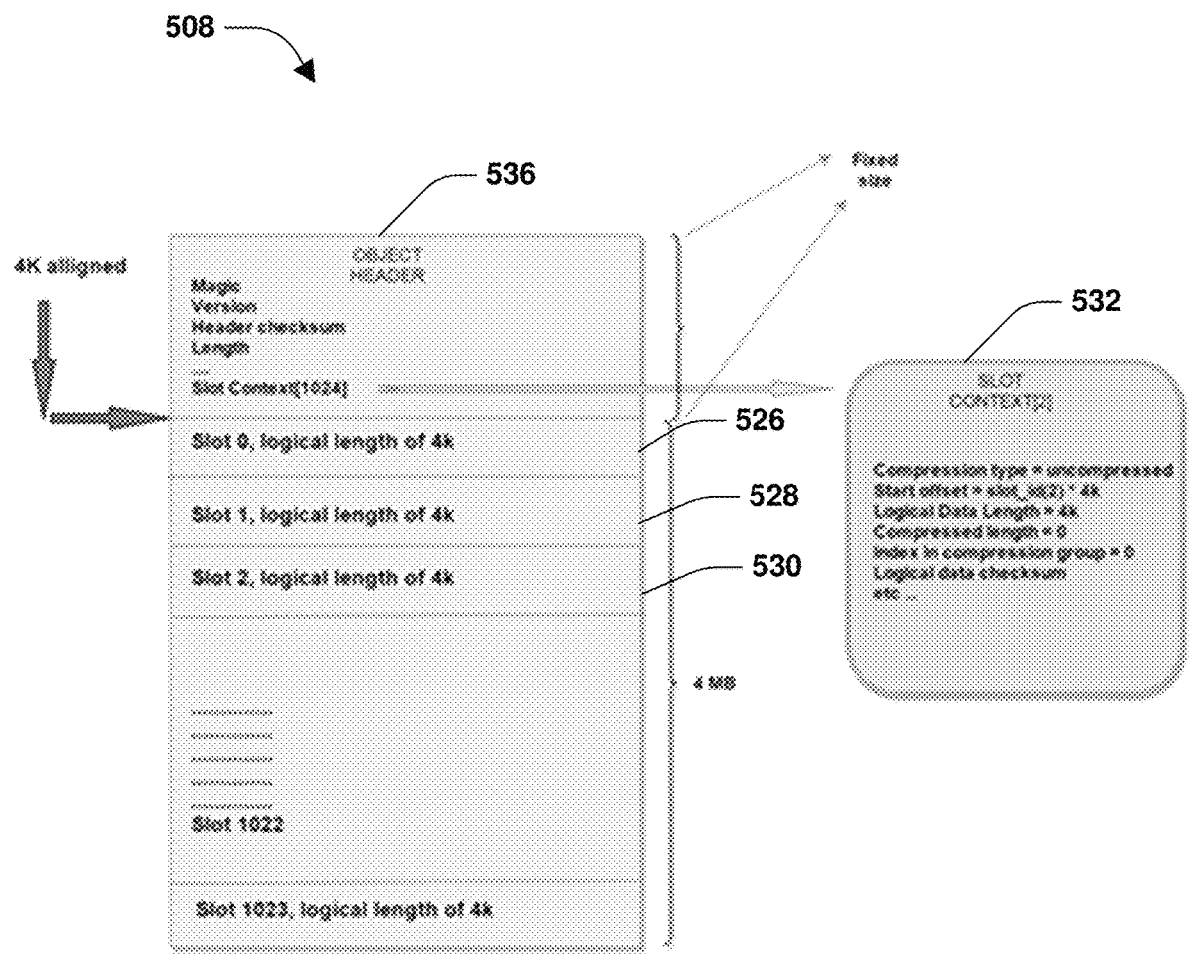
FIG. 5C is an example of an object stored within an object store.

One embodiment of managing objects within an object store using an object file system is illustrated by an exemplary method 400 of FIG. 4 and further described in conjunction with system 500 of FIG. 5A. It may be appreciated that a data mover and/or one or more data connector components may be configured to implement the techniques described with respect to FIGS. 4 and 5A-5C (e.g., create objects within an object store according to an object format, and implement requests such as management requests, data requests, and/or integrity verification upon objects, snapshots, and/or backup data within the object store).

A computing device 502 may comprise a node, a storage controller, a storage service, an on-premises computing device, a storage virtual machine, or any other hardware or software. The computing device 502 may store data 506 within storage devices (primary storage) managed by the computing device 502. The computing device 502 may provide client devices with access to the data 506, such as by processing read and write operations from the client devices. The computing device 502 may create snapshots 504 of the data 506, such as a snapshot of a file system of a volume accessible to the client devices through the computing device 502. The computing device 502 may be configured to communicate with an object store 509 over a network. The object store 509 may comprise a cloud computing environment remote to the computing device 502.

As provided herein, an object file system and object format is provided for storing and accessing data, such as snapshots, stored within objects in the object store 509. At 402, the data 506, maintained by the computing device, is stored into a plurality of slots of an object 508. Each slot represents a base unit of data of the object file system defined for the object store 509. For example, the object 508 comprises or any other number of slots (e.g., 1024 slots), wherein each slot comprises 5 kb of data or any other amount of data. It may be appreciated that objects may comprise any number of slots of any size. User data, directory blocks, metadata, and/or inofile blocks of an inofile comprising per inode metadata is stored into the slots of the object 508. In an example, snapshot data, of a snapshot created by the computing device 502 of a file system maintained by the computing device 502, is stored into the object 508. For example, the object 508 may be maintained as an independent logical representation of the snapshot, such that data of the snapshot is accessible through the object 508 without having to reference other logical copies of other snapshots stored within objects 510 of the object store 509. In an example, the data is converted from physical data into a version independent format for storage within the object 508.

In an example, the object 508 is created to comprise data in a compressed state corresponding to compression of the data within the primary storage of the computing device 502. In this way, compression used by the computing device 502 to store the data is retained within the object 508 for storage within the object store 509. The object 508 may be assigned a unique sequence number. Each object within the object store 509 is assigned unique sequence numbers.

An object header may be created for the object 508. The object header comprises a slot context for slots within the object 508. The slot context may comprise information relating to a type of compression used for compressing data within the object 508 (if any compression is used), a start offset of a slot, a logical data length, a compressed data length, etc. The slot context may be used to access compressed data stored within the object 508.

FIG. 5C illustrates an example of the object 508. The object 508 comprises an object header 536 and a plurality of slots, such as a slot 526, a slot 528, a slot 530, and/or any other number of slots. The object header 536 may have a size that is aligned with a start of the plurality of slots, such as having a 5 kb alignment based upon each slot having a logical length of 5 kb. It may be appreciated that slots may have any length. The object header 536 comprises various information, such as a version identifier, a header checksum, a length of the object 508, a slot context 532, and/or other information used to access and manage data populated into the slots of the object 508.

The slot context 532 comprises various information about the slots, such as a compression type of a slot (e.g., a type of compression used to compress data of slots into a compression group or an indicator that the slot does not comprise compressed data), a start offset of the slot within the object 508 (e.g., a slot identifier multiplied by a slot size, such as 5 kb), a logical data length of the slot (e.g., 5 kb), a compressed length (e.g., 0 if uncompressed), an index of the slot within a compression group of multiple slots (e.g., 0 if uncompressed), a logical data checksum, etc.

At 404, the data stored within the slots of the object 508 are represented as a data structure (e.g., a structure that is traversable by a data connector component). The data structure may comprise a tree structure or any other type of structure. For example, the data structure comprises the tree structure representing a file. The data structure may be populated with a plurality of nodes at various levels of the tree structure. The nodes may be represented by cloud block numbers. A cloud block number of a node may comprise a sequence number used to uniquely identify the object 508 and/or a slot number of a slot comprising a portion of the data represented by the node. User data, directory blocks, metadata, inofile blocks of an inofile, and/or other data stored within the slots of the object 508 may be represented by nodes within the data structure. In an example, user data is stored within leaf nodes of the data structure (e.g., nodes within a level 0 (L0) level of the tree structure). Pointers (indirects) may be stored within non-leaf nodes of the data structure (e.g., nodes within a level 1(L1), a level 2 (L2), and/or other levels of the tree structure). An inode object for the file may comprise pointers that point to non-leaf nodes within a top level of the data structure.

In an example of the tree structure, a 1 TB file may be represented by the tree structure. An inode of the file may comprise metadata and/or a flat list of 4845 pointers or any other number of pointers to nodes within a level 2 of the tree structure (e.g., there are 4845 nodes (4 kb blocks) within the level 2 of the tree structure). The level 2 comprises the 4845 nodes (4 kb blocks), each having 255 pointers or any other number of pointers to nodes within a level 1 of the tree structure (e.g., there are 980393 (4 kb blocks) within the level 1 of the tree structure. The level 1 comprises the 980393 (4 kb blocks), each having 255 pointers to nodes within a level 0 of the tree structure. The level 0 comprises 250,000,000 nodes (4 kb blocks) representing actual data, such as user data.

FIG. 5B illustrates a snapshot file system of data structures 524 (e.g., a tree structure that can be traversed by a data connector component) used to represent snapshots (e.g., snapshots of one or more volumes managed by the computing device 502) stored into the objects 510 of the object store 509. There is one base root object per volume, such as a base root object 512 for a volume of which the snapshots were captured. There is a unique root object per volume, such as a unique root object 514 for the volume. The base root object 512 may point to the unique root object 514. Names of the unique root objects may be derived from increasing generation numbers. The unique root object 514 may point to snapinfo objects, such as a snapinfo object 516 comprising information regarding one or more snapshots, such as a pointer to an inofile 518 of a second snapshot of the volume. The inofile 518 comprises cloud block numbers of slots within an object comprising data of the second snapshot, such as a pointer to an indirect 520 that points to data 522 of the snapshot. The inofile 518 may comprise or point to information relating to directories, access control lists, and/or other information.

At 406, a mapping metafile (a VMAP) is maintained for the object 508. The mapping metafile maps block numbers of primary storage of the computing device 502 (e.g., virtual volume block numbers of the data stored into slots of the object 508) to cloud block numbers of nodes representing portions of the data stored within the slots of the object 508. At 408, the object 508 is stored within the object store 509. In an example of storing objects into the object store 509, the plurality of snapshots 504, maintained by the computing device 502, are stored within objects 510 of the object store 509. Each snapshot is identifiable through a snapinfo object that has a unique generation number. As will be described later, the objects 510 within the object store 509 may be deduplicated with respect to one another (e.g., the object 508 is deduplicated with respect to the object 510 using the mapping metafile as part of being stored into the object store 509) and retain compression used by the computing device 502 for storing the snapshots 504 within the primary storage.

At 410, the mapping metafile and/or the data structure are used to provide access through the object file system to portions of data within the slots of the object 508 in the object store 509. In an example, the inode object and the data structure are traversed to identify a sequence number and slot number of requested data. The sequence number and the slot number are used to access the requested data within a corresponding slot of the object 508. In an example, a read request targets a 100,000th level 0 block stored within the object 508. The inode object is read to calculate which blocks in each level of the data structure will have 100,000 (e.g., 100,000/255 is a 493th block in level 1 and 493/255 is a $2^{nd}$ block in level 2). These blocks are read at each level to go to a next level through appropriate pointers (e.g., cloud block numbers) until the data is read from a block of user data within the level 0. The pointers are cloud block numbers, where a pointer comprises a sequence number of the object 508 and a slot number. The sequence number corresponds to an object name of the object 508 and the slot number is which slot the data is located within the object 508.

In an embodiment, an on-demand restore of data within a snapshot stored within objects of the object store 509 can be performed to a target computing device using the mapping metafile and/or the data structure. In an embodiment, the mapping metafile and/or the data structure may be used to free objects from the object store 509 based upon the objects comprising snapshot data of snapshots deleted by the computing device 502.

In an embodiment, the mapping metafile and/or an overflow mapping metafile are used to facilitate the copying of the snapshots to the object store 509 in a manner that preserves deduplication and compression, logically represents the snapshots as fully independent snapshots, and provides additional compression. In particular, the mapping metafile is populated with entries for block numbers (e.g., virtual volume block numbers, physical volume block numbers, etc. used by the node to reference data such as snapshot data stored by the node) of the snapshots 504 maintained by the computing device 502 and copied into the objects 510 of the object store 509 as copied snapshots. An entry within the mapping metafile is populated with a mapping between a block number of data within a snapshot at the computing device 502 (e.g., a virtual volume block number) and a cloud block number (e.g., a cloud physical volume block number) of a slot within an object into which the data was copied when the snapshot was copied to the object store 509 as a copied snapshot. The entry is populated with a compression indicator to indicate whether data of the block number is compressed or not (e.g., a bit set to a first value to indicate a compressed virtual volume block number and set to a second value to indicate a non-compressed virtual volume block number).

The entry is populated with a compression group start indicator to indicate whether the block number is a starting block number for a compression group of a plurality of block numbers of compressed data blocks. The entry is populated with an overflow indicator to indicate whether the data block has an overflow entry within the overflow mapping metafile. The overflow mapping metafile may comprise a V+ tree, such as a special B+ tree with support for variable length key and payload so a key can be sized according to a type of entry being stored for optimization. The key uniquely represents all types of entries associated with a block number (a virtual volume block number). The key may comprise a block number field (e.g., the virtual volume block number of a data block represented by the block number or a starting virtual volume block number of a first data block of a compression group comprising the data block), a physical length of an extent of the data block, if the corresponding entry is a start of a compression group, and other block numbers of blocks within the compression group. The payload is a cloud block number (a cloud physical volume block number). The entry may be populated with a logical length of an extent associated with the block number. The entry may be populated with a physical length of the extent associated with the block number.

The mapping metafile and/or the overflow mapping metafile may be indexed by block numbers of the primary storage (e.g., virtual volume block numbers of snapshots stored by the computing device 502 within the primary storage, which are copied to the object store as copied snapshots). In an example, the block numbers may correspond to virtual volume block numbers of data of the snapshots stored by the computing device 502 within the primary storage. In an example, a block number corresponds to a starting virtual volume block number of an extent of a compression group.

The mapping metafile and/or the overflow mapping metafile is maintained according to a first rule specifying that the mapping metafile and/or the overflow mapping metafile represent a comprehensive set of cloud block numbers corresponding to a latest snapshot copied to the object. The mapping metafile and/or the overflow mapping metafile is maintained according to a second rule specifying that entries within the mapping metafile and/or the overflow mapping metafile are invalidated based upon any block number in the entries being freed by the computing device 502.

The mapping metafile and/or the overflow mapping metafile is used to determine what data of the current snapshot is to be copied to the object store 509 and what data already exists within the object store 509 so that only data not already within the object store 509 is transmitted to the object store 509 for storage within an object. Upon determining that the current snapshot is to be copied to the object store 509, an invalidation phase is performed. In particular, a list of deallocated block numbers of primary storage of the computing device 502 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

After the invalidation phase, a list of changed block numbers corresponding to changes between the current snapshot of the primary storage being copied to the object store 509 and a prior copied snapshot already copied from the primary storage to the object store 509 is determined. The mapping metafile is evaluated using the list of changed block numbers to identify a deduplicated set of changed block numbers without entries within the mapping metafile. The deduplicated set of changed block numbers correspond to data, of the current snapshot, not yet stored within the object store 509.

An object is created to store data of the deduplicated set of changed block numbers. The object comprises a plurality of slots, such as 1024 or any other number of slots. The data of the deduplicated set of changed block numbers is stored into the slots of the object. An object header is updated with metadata describing the slots. In an example, the object is created to comprise the data in a compressed state corresponding to compression of the data in the primary storage. The object can be compressed by combining data within contiguous slots of the object into a single compression group. In this way, compression of the current snapshot maintained by the node is preserved when the current snapshot is stored in the object store as the object corresponding to a copy of the current snapshot.

The object, comprising the data of the deduplicated set of changed block numbers, is transmitted to the object store 509 for storage as a new copied snapshot that is a copy of the current snapshot maintained by the node. The object is stored as a logical copy of the current snapshot. Also, additional compression is applied to this logical data, and information used to uncompress the logical data is stored in the object header. Further, the object is maintained as an independent logical representation of the current snapshot, such that copied data, copied from the current snapshot, is accessible through the object without having to reference other logical copies of other copied snapshots stored in other objects within the object store 509. Once the object is stored within the object store 509, the mapping metafile and/or the overflow mapping metafile is updated with entries for the deduplicated set of changed block numbers based upon receiving an acknowledgment of the object being stored by the object store 509. An entry will map a changed block number to a cloud block number of a slot within which data of the changed block number is stored in the object.

In an embodiment, the object file system is used to provide various primary storage system services for the object store 509 in order to achieve efficient space and resource management, and flexible scaling in the object store 509 (e.g., a cloud computing environment). Additionally, pseudo read only snapshots are provided through the object store 509. Consumers of these snapshots may choose to derive just the logical data represented by these snapshots or can additionally derive additional metadata associated with the logical data if required. This additional metadata is created post snapshot creation and hence is not directly part of logical view of the snapshot. The present system provides flexible, scalable, and cost effective techniques for leveraging cloud storage for off-premises operations on secondary data, such as analytics, development testing, virus scan, load distribution, etc. Objects may be modified (e.g., a unit of storage within a cloud storage environment) without changing the meaning or accessibility of useable data in the objects (e.g., a cloud object comprising a snapshot copy of primary data maintained by the computing device 502). Objects may be modified to add additional metadata and information such as analytics data, virus scan data, etc. to useable data without modifying the useable data. Thus, an object is maintained as a pseudo read only object because in-use data is unmodifiable while unused or freed data is modifiable such as by a defragmentation and/or garbage collection process.

Changes in objects can be detected in order to resolve what data of the objects is the correct data. The present system provides the ability to perform defragmentation and garbage collection for objects by a cloud service hosted by the object store 509, such as a cloud storage environment. Defragmentation and garbage collection are provided without affecting access to other in-use data within objects (e.g., in-use snapshot data stored within an object that is used by one or more applications at various remote computers). This allows for more true distributed and infinite scale data management. The present system provides for the ability to run analytics on objects (e.g., read/write analytics of data access to data within an object) using analytic applications hosted within the cloud storage environment. The analytics can be attached to objects even though the objects are read only. The present system provides for deduplication of objects. In this way, objects can be modified while still maintaining consistency of in-use data within the objects (e.g., maintaining consistency of a file system captured by a snapshot that is stored within an object) and without compromising a read only attribute of the objects. Also, computationally expensive processes like garbage collection, analytics, and defragmentation are offloaded from on-premises primary storage systems, such as the computing device 502, to the object store 509 such as cloud services within the cloud storage environment.

In one embodiment, objects within the object store 509 (e.g., objects within a cloud computing environment) can be maintained with a read only attribute such that data within objects can be overwritten/modified/freed so long as in-use data within the objects is not altered. In particular, an object may be maintained within the object store 509, such as a cloud computing environment. The object comprises a plurality of slots, such as 1024 or any other number of slots. Each slot is used to store a unit of data. The data within each slot is read-only. In particular, the data is read only when in-use, such as where one or more applications are referencing or using the data (e.g., an application hosted by the computing device 502 is storing data of a snapshot of a local file system within a slot of an object, and thus the snapshot data is in-use until a particular event occurs such as the computing device 502 deleting the snapshot). In an example, the object comprises snapshot data of a file system, a volume, a logical unit number (LUN), a file, or any other data of the computing device 502. In this way, the object comprises a read only snapshot of data of the computing device 502. In one example, a plurality of objects corresponding to read only snapshots of the file system of the computing device 502 are stored within the object store 509. Each object is assigned a unique sequence identifier.

A first rule is enforced for the object. The first rule specifies that in-use slots are non-modifiable and unused slots are modifiable. An in-use slot is a slot that stores data actively referenced, used, and/or maintained by a computing device 502 (a primary storage system). For example, an in-use slot may be a slot that comprises snapshot data (e.g., secondary/replicated data) of a snapshot created by a computing device 502. The slot becomes an unused slot when the data is no longer actively referenced, used, and/or maintained, such as where the computing device 502 deletes the snapshot. Thus, if a slot is in-use, then the data within the slot cannot be modified. Otherwise, data in unused slots (e.g., stale data that is no longer referenced or used) can be modified, such as deleted/freed by garbage collection functionality or defragmentation functionality.

Additional information for the object may be generated. The additional information may comprise analytics (e.g., read/write statistics of access to the object), virus scan information, development testing data, and/or a variety of other information that can be generated for the object and the data stored therein. In an example, the additional data is generated by a cloud service or application executing within the cloud computing environment. This will offload processing and resource utilization that would otherwise be used by the computing device 502 (primary storage system) to perform such analytics and processing.

Metadata of the additional information is attached to an object header of the object. The object header is used to store metadata for each slot of the object. In one example, the metadata specifies a location of the additional information within the object, such as a particular slot into which the additional information is stored. In another example, the metadata may comprise the additional information, and thus the additional information is stored into the object header. The metadata is attached in a manner that does not change a meaning or accessibility of useable data within in-use slots of the object. In particular, applications that are allowed to merely access user data within the object (e.g., the applications are unaware or have no reason to access the additional information) are provided with only access to the user data and are not provided with access to the metadata or additional information. Thus, these applications continue to access user data within the object in a normal manner. For application that are allowed to access both the user data and the additional information, those applications are provided with access to the user data and the metadata for identifying and accessing a location of the additional information within the object. The first rule is enforced such that user data (in-use data) is retained in an unmodified state within the object notwithstanding the metadata and/or additional information being associated with the object.

In an example, a second rule is enforced for the object. The second rule specifies that related read operations are to be directed to a same version of an object. For example, an object corresponds to secondary/replicated snapshot data of a file system maintained by the computing device 502. Each time a new snapshot of the file system is created, a new version of the object is created to capture changes to the file system. In another example, since in-use data within the object is read only and unmodifiable, any modifications to slots with in-use data will result in a new version of the object being created with the modified data.

If multiple read operations are related, then those read operations should be executed upon the same version of the object for data consistency purposes. This is achieved by comparing timestamp data of the related read operations. If the timestamp data between the related read operations is mismatched, then the related read operations are retried because the related read operations were executed upon different versions of the same object. If the timestamp data between the read operations matches, then the related read operations are considered successful. In an example, a first related read operation reads the object header of the object to identify a slot from which data is to be read. A second related read operation is executed to read data from the slot. The two related read operations should be executed upon the same version of the object/slot (e.g., the operations can be executed upon different versions such as where data of a current version of the object is modified between execution of the operations, thus creating a new version of the object with the modified data since the object is read only and the original data is unmodifiable within the current version of the object). Thus, timestamp data of the two related read operations is used to determine whether the two related read operations were executed upon the same version of the object/slot and thus should be considered complete or should be retried.

In one embodiment, garbage collection is provided for objects within the object store 509. The objects have a read only state, such that enforcement of the first rule ensures that in-use data within slots of an object is not modifiable, thus making objects pseudo read only objects because only unused slots can be modified/freed of unused data. In an example, an object is used to store data of a snapshot of a file system hosted by the computing device 502. The snapshot may be determined as being deleted by the computing device 502, and thus slots comprising snapshot data of the deleted snapshot are now considered to be unused slots as opposed to in-use slots.

Each snapshot of the file system may be associated with a bitmap that identifies objects within the object store that correspond to a particular snapshot. Thus, the bitmaps can be evaluated to identify what objects comprise data of particular snapshots. For example, a bitmap of the deleted snapshot can be used to identify the object and other objects as comprising data of the deleted snapshot.

A garbage collection operation is executed to free objects (e.g. free unused data from unused slots) from the object store in order to reduce storage utilization of the object store that would otherwise be unnecessarily used to store stale/unused data. In an example, the garbage collection operation is executed by a cloud service in order to conserve resource consumption by the computing device 502 (primary storage system) otherwise used to execute the garbage collection operation. The garbage collection operation free objects from the object store 509 based upon the objects uniquely corresponding to deleted snapshots. That is, if an object stores data of only deleted snapshots and does not store data of active/undeleted snapshots, then the garbage collection process can free/delete that object. For example, the bitmaps describing objects within the object store 509 that are related to snapshots of the file system are evaluated to determine whether the object is unique to the deleted snapshot and/or unique to only deleted snapshots (e.g., the object does not comprise data of active/undeleted snapshots). If so, then the object is freed from the object store 509. However, if the object is not unique to only deleted snapshot(s) such as where the object also stores data of an active/undeleted snapshot, then the object is not freed.

In an embodiment, defragmentation is provided for fragmented objects within the object store 509. In an example, defragmentation is implemented by a cloud service or application executing in the object store 509 in order to conserve resources otherwise used by a computing device 502 (primary storage system) that would execute defragmentation functionality. An object within the object store 509 is determined to be a fragmented object based upon the object comprising at least one freed slot from which data was freed. For example, a freed slot may comprise an unused slot comprising unused data no longer referenced/used by the computing device 502 (e.g., data of a deleted snapshot). Accordingly, the fragmented object may comprise one or more in-use slots of in-use data currently referenced/used by a computing device 502 and one or more freed slots of freed data (e.g., unused slots comprising unused data).

The fragmented object is compacted to retain the in-use data and exclude the freed data (the unused data) as a written object. Because compacting may store the in-use data in new slots, an object header of the object is updated with new locations of the in-use data within the rewritten object. In this way, defragmentation is performed for objects within the object store 509.

The present system preserves deduplication and compression used by the computing device 502 for snapshots when storing copied snapshots to the object store 509 notwithstanding copied snapshots representing fully logical copies of data in the primary storage of the computing device 502. In particular, deduplication is preserved because data that is shared in a snapshot (e.g., a local or primary snapshot created and maintain by the node) is also shared in a copied snapshot in the object store 509. Deduplication of compression groups is maintained while logically representing the compression groups in a copied snapshot. Block sharing across multiple snapshots is also preserved so that merely changed blocks are transferred/copied to the object store 509 during incremental snapshot transfers.

The present system provides additional compression on a snapshot data copy. In particular, larger compression groups provide more space efficiency but with less read efficiency compared to smaller compression groups. Relatively smaller compression groups may be used by the computing device 502 of the storage system since access to the primary storage of the computing device 502 may be more read intensive, and thus read efficiency is prioritized over storage space efficiency. Because copied snapshots in the object store 509 are infrequently accessed (e.g., cold data that is infrequently read), relatively larger compression groups can be employed for improved storage space efficiency within the object store, which also reduces network bandwidth for snapshot copying to the object store 509.

In one embodiment, snapshots maintained by the computing device 502 are copied to the object store 509 as copied snapshots representing logical data of the snapshots. Data of the copied snapshots is stored into slots of objects that are deduplicated with respect to other objects stored within the object store 509 and retain compression used by the computing device 502 for the snapshots.

In an example, the computing device 502 stores data within primary storage. The computing device 502 may create snapshots of the data stored by the computing device 502. For example, the computing device 502 may create a snapshot of a file, a logical unit number, a directory, a volume, a storage virtual machine hosting a plurality of volumes, a file system, a consistency group of any arbitrary grouping of files, directories, or data, etc. The computing device 502 may deduplicate data between the snapshots so that instead of storing redundant data blocks multiple times, merely references are stored in place of the redundant data blocks and point to original data blocks with the same data. The computing device 502 may compress data within the snapshots, such as by creating compression groups of compressed data blocks.

The mapping metafile and/or the overflow mapping metafile is used to determine what data of the current snapshot is to be copied to the object store 509 and what data already exists within the object store so that only data not already within the object store is transmitted to the object store 509 for storage within an object. Upon determining that the current snapshot is to be copied to the object store, an invalidation phase is performed. In particular, a list of deallocated block numbers of primary storage of the computing device 502 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

It may be appreciated that a data mover and/or one or more data connector components may be configured to implement the techniques described with respect to FIGS. 4 and 5A-5C (e.g., create objects within an object store according to the object format, and implement requests such as management requests, data requests, and/or integrity checking, anomaly detection, and file system metadata analysis upon objects, snapshots, and/or backup data within the object store).

Figure 6:
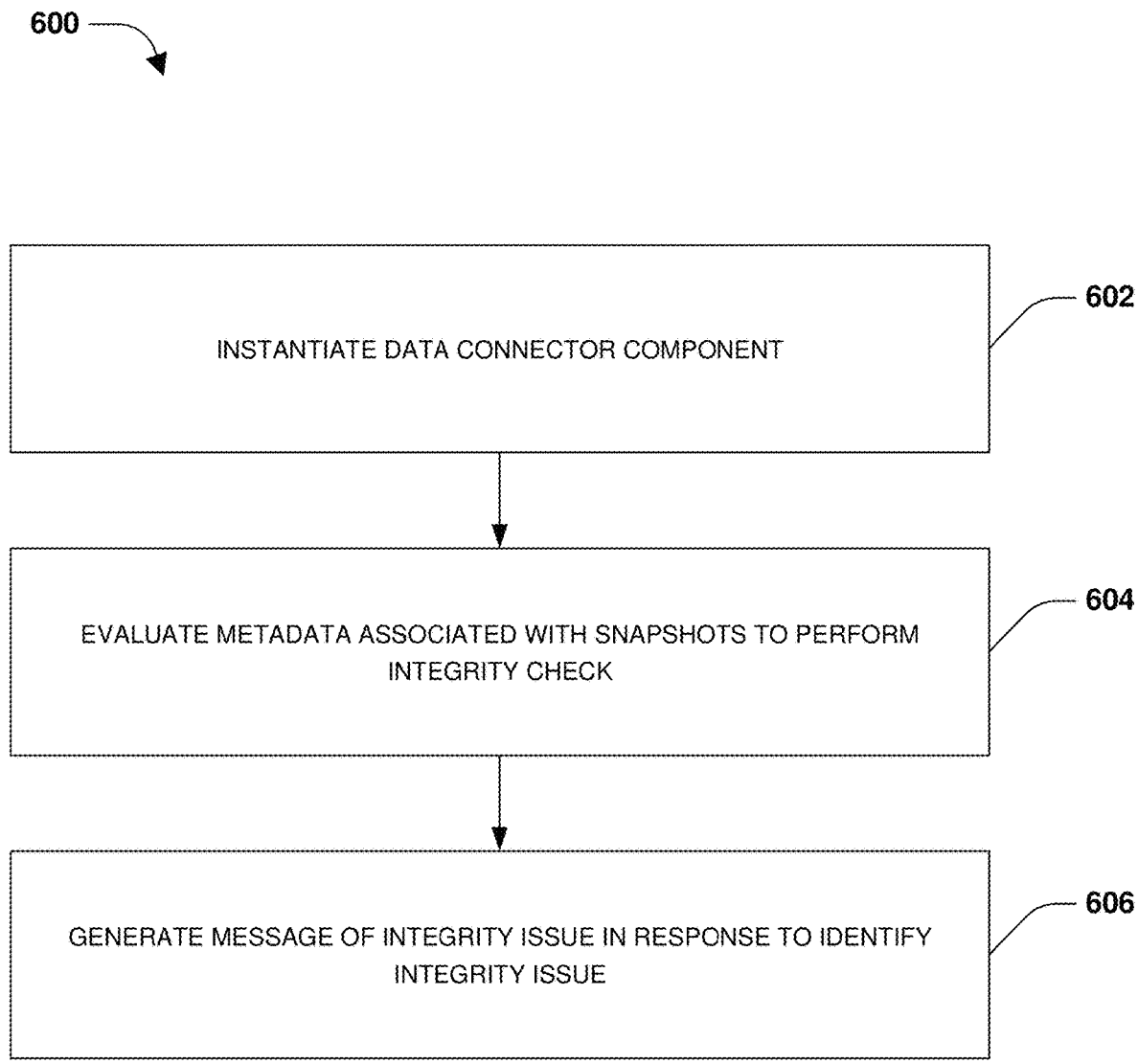
FIG. 6 is a flow chart illustrating an example method for implementing integrity checking, anomaly detection, and file system metadata analysis associated with objects stored within an object store.
Figure 7:
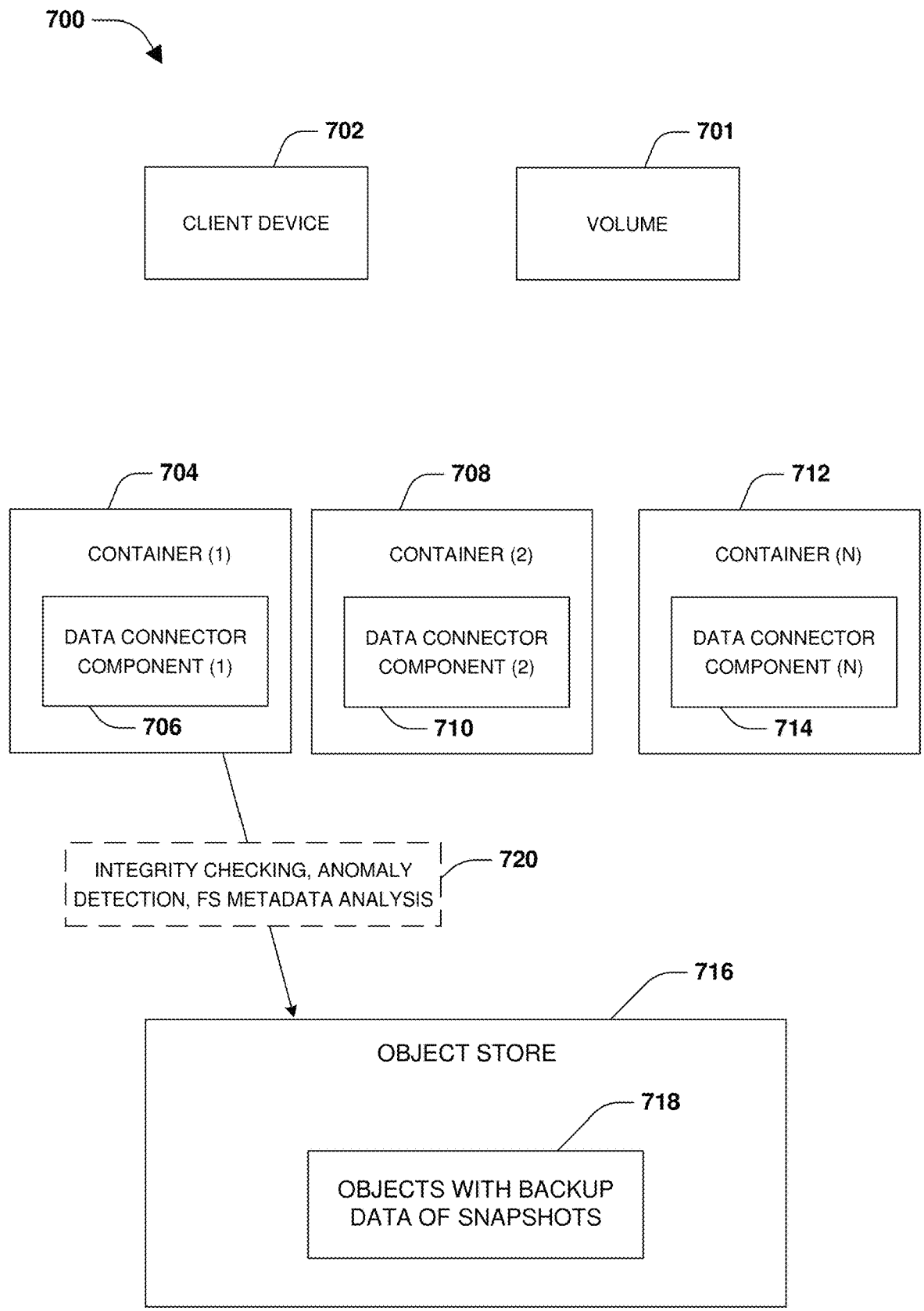
FIG. 7 is a component block diagram illustrating an example system for implementing integrity checking, anomaly detection, and file system metadata analysis associated with objects stored within an object store.

One embodiment of implementing integrity checking, anomaly detection, and file system metadata analysis for an object store is illustrated by an exemplary method 600 of FIG. 6 and further described in conjunction with system 700 of FIG. 7. A client device 702 may store data within a volume, such as a volume 701 hosted and managed by a storage operating system of a node. A data mover may utilize the techniques described in relation to FIGS. 4 and 5A-5C to create snapshots of the volume 701, store backup data of the snapshots within objects 718 that are then stored within an object store 716, such as a cloud computing environment. Each snapshot may be self-representing and is associated with a snapshot file system tree (tree structure) that can be traversed to identify, locate, and/or access files, directories, and/or metadata of a snapshot stored within one or more objects. Because snapshots may be incremental, data within an object may be shared by one or more snapshots or may be unique to a particular snapshot. An object (e.g., object 508 of FIG. 5C) may have a particular object format within which backup data of snapshots may be stored within slots of the object. A data connector component may be configured to understand the object format and/or traverse the snapshot file system tree structure so that the data connector component can access objects, snapshots, and/or backup data of the snapshots within the objects 718 stored within the object store 716 according to the object format so that the data connector component may implement integrity checking, anomaly detection, and file system metadata analysis. The ability of the data connector component to interpret the object format and/or traverse the snapshot file system tree structure was described in relation to FIGS. 4 and 5A-5C.

Data connector components may be instantiated through containers on an as need basis, and thus can be instantiated when integrity checking, anomaly detection, and/or file system metadata analysis is to be performed (e.g., instantiated on-demand in response to a determination that integrity checking, anomaly detection, and/or file system metadata analysis is to be performed). The data connector components may be deconstructed once the integrity checking, anomaly detection, and/or file system metadata analysis is finished, which can reduce the cost and/or compute of hosting the data connector components. Any number of data connector components may be instantiated so that multiple data connector components may performed integrity checking, anomaly detection, and/or file system metadata analysis in parallel upon objects, backup data, and/or snapshots in parallel. For example, a first data connector component 706 may be instantiated as a first container 704, a second data connector component 710 may be instantiated as a second container 708, and an nth data connector component 714 may be instantiated as an nth container 712. A data connector component and a container may be stateless, and thus containers may be onlined, offlined, upgraded, and/or have work transferred there between in a stateless manner.

In an embodiment, a request associated with a snapshot or backup data stored within the object store 716 as an object within a storage structure such as a bucket according to the object format may be received. For the example, the request may corresponding to a request to perform integrity checking, anomaly detection, and/or file system metadata analysis.

In response to the request, a data connector component may be instantiated as a container, such as where the first data connector component 706 is instantiated as the first container 704. In an embodiment, a plurality of data connector components may be instantiated as containers for parallel implementation of requests directed to the object store 716. Instances of containers of data connector components may be added or removed to scale up or down based upon current or expected future demand. The data connector component may be instantiated as the container as a stateless image, such that requests are to comprise state information corresponding to an identifier of a snapshot, an identifier of a storage structure storing an object comprising backup data of the snapshot (e.g., a bucket comprising the object), and/or credentials to access the object.

The request may be implemented upon the objects 718 stored within the object store 716 according to the object format interpretable by the data connector component. That is, the data connector component may be capable of reading an object header of an object, reading backup data from slots within the object, traversing a structure (e.g., data structures 524 of FIG. 5B) such as a snapshot file system tree structure of a snapshot to locate files, directories, and/or metadata of the snapshot for performing the request, as described in conjunction with FIGS. 4 and 5A-5C. In particular, a structure (e.g., data structures 524 of FIG. 5B, such as a snapshot file system tree structure) associated with an object/snapshot (e.g., object 508 of FIG. 5C) may be traversed to identify the snapshot, such as backup data of the snapshot upon which the request is to be executed. For example, if a particular file of the snapshot is to be accessed for integrity verification, then the structure may be traversed to locate the file, which may be stored as backup data within one or more slots in one or more objects within the object store 716. In this way, the data connector component may be capable of interpreting the object format and/or traversing the structure such as a snapshot file system tree to identify files, directories, and/or metadata of snapshots backed up as snapshot data on-demand for on-demand implementation of integrity checking, anomaly detection, and/or file system metadata analysis.

During operation 602 of method 600 of FIG. 6, a data connector component may be instantiated as a container for accessing the object store 716 within which the objects 718 comprising backup data of snapshots are stored within storage structures (buckets). Any number of data connector components may be instantiated in a scalable and on-demand manner. In an example, the first data connector component 706 is instantiated as the first container 704 for performing integrity checking, anomaly detection, and/or file system metadata analysis 720 associated with the objects, snapshots, and/or backup data (snapshot data) stored within the object store 716.

During operation 604 of method 600 of FIG. 6, the data connector component may evaluate data and/or metadata associated with snapshots whose backup data is stored within the objects 718 to perform an integrity check (e.g., integrity checking and/or anomaly detection) for the objects. In an embodiment, the integrity check may be performed in response to migration of one or more objects to verify that the one or more objects were successfully migrated.

In an embodiment of performing an integrity check, the data connector component may evaluate a bitmap for a snapshot. The bitmap may comprise bits represented objects. A value of a bit may indicate whether the object comprises backup data of the snapshot or not. In this way, the data connector component may evaluate the bitmap to determine whether objects comprising data of the snapshot are present within the object store 716. If not, then an integrity issue may be identified, and a message of the integrity issue may be generated, during operation 606 of method 600 of FIG. 6. In an example of verifying whether the objects are present in the object store 716, the data connector component may implement a head API test to determine whether an object is present within the object store 716. In an example of verifying whether the objects are present in the object store 716, the bitmap for the snapshot may be compared with a prior bitmap of a prior snapshot (e.g., the snapshot and the prior snapshot are backups of the same source volume) for which integrity checking was previously performed. The comparison is performed to identify a set of objects upon which a verification is to be performed for determining whether the set of objects are present within the object store 716. The set of objects may be identified based upon the set of objects not already being verified by a prior integrity check. Objects already checked by a prior integrity check may be skipped for verifying the integrity of the snapshot because the presence of the objects was already verified. This improves the efficiency of the integrity check for the snapshot because the integrity check is not re-evaluating already verified objects.

In an embodiment of performing an integrity check, a verification may be performed to verify whether a value of a magic entry and/or other header information (e.g., a local verification of information regarding a type of object specified by the magic entry and/or other information within the object header, such as version, length, etc.) within an object header of a header of an object comprises an expected value (e.g., magic within object header 536 of object 508 of FIG. 5C). In an embodiment of performing an integrity check, a verification may be performed to verify whether checksums stored within the object header of the object for slots within the object (e.g., header checksum within object header 536 of object 508 for slots 526, 528, 530, etc. of FIG. 5C) match calculated checksums for the slots.

In an embodiment of performing an integrity check, a snapshot file system tree, such as the data structure 524 of FIG. 5B, of a snapshot comprising backup data stored within one or more objects within the object store 716 is traversed to verify a number of local aspects (e.g., verification of object header information) and/or a number of distributed aspects of the snapshot file system tree. The distributed aspects may correspond to an expected number of directories, files, and/or data blocks associated with the snapshot. In an embodiment of performing an integrity check, the snapshot file system tree may be traversed to verify that the snapshot file system tree is intact and/or that one or more objects represent expected levels within the snapshot file system tree.

In an embodiment of performing an integrity check, the integrity check may be performed to implement anomaly detection. In an example of anomaly detection, the integrity check may be performed to determine whether a number of files modified in a snapshot during a timeframe conforms to an expected average of modifications to files, which may be calculated based upon historic access patterns by an anomaly detection algorithm. In an example of anomaly detection, the integrity check may be performed to determine whether an unexpected file operation has been performed with respect to a snapshot, such as an unexpected delete operation. In an example of anomaly detection, the integrity check may be performed to determine whether unexpected file encryption has been performed with respect to one or more objects, which may be indicative of ransomware or other malicious activity. In this way, if an anomaly is detected and/or other integrity issue is detected, then an alert may be generated and/or automated recovery actions may be performed such as re-baselining and/or reinitializing a snapshot and/or mirroring relationship used to backup snapshots of a source volume as snapshots to the object store 716.

In an embodiment, file system metadata analysis may be performed. For example, file attributes of files within the objects 718 and/or other metadata may be mined to generate various views. In an example, a view may be derived from file modify time attributes, file creation times of files, sizes of files, types of files, rates of change modifications, entities that accessed the objects, times of the entities accessing the objects, and/or space consumed by the objects. In an example, a view may depict an amount of data change with respect to the objects 718. In an example, a view may identify access patterns to files and/or directories over a time period. In an example, a physical view of data within an object may be generated for verifying an object format of the object. In an example, a logical view corresponding to how a client views the data within the object a files and directories may be generated. In this way, the views may be provided to a user, such as displayed through a user interface, for further action.

In some embodiments, a file system may be used to store and organize data within a volume or other data container. A snapshot may be created to capture a state of the volume at a particular point in time. In some embodiments, the snapshot may be a read only snapshot. The snapshot may be a baseline snapshot that captures the entirety of the data and file system at that point in time. Subsequently, one or more incremental snapshots may be created to capture changes to the data and file system since a prior snapshot. In order to more efficiently manage and store these snapshots, snapshot data of the snapshots may be stored within objects according to an object format, such as the object format that was described in relation to FIGS. 4 and 5A-5C. For example, FIG. 5C illustrates an example of an object 508 comprising an object header 536 followed by slots 526, 528, 530 within which snapshot data is stored. The objects may be stored on-premise, within an object store such as a cloud computing environment of a cloud provider, or at any other computing environment.

Various functionality may be implemented for the objects and/or snapshots stored within the objects, such as integrity checking functionality. This functionality can be implemented by a data connector component that is capable of interpreting the object format of the objects. In some embodiments of implementing functionality for processing objects, instances of the data connector component may be hosted within any number of containers that may be created on-demand in a scale out manner. These containers can be created, onlined, deleted, suspended (offlined), resumed, and/or upgraded on-demand because the containers are stateless.

If there is high demand for processing objects, then additional containers may be created on-demand to host instances of the data connector component for processing the objects. If there is low demand, then some of the containers may be deleted or suspended in order to converse resource consumption and/or reduce cost associated with hosting the containers. In some embodiments of implementing functionality for processing objects, serverless threads of a serverless architecture may be utilized to process the objects. A serverless thread may correspond to computing resources of the serverless architecture that are utilized on-demand on an as needed basis for executing code. In an example, each operation to be performed as part of integrity checking may be executed by a single serverless thread (e.g., through a Lamba function provided by a cloud service provider). Because an integrity checking operation may be broken down into numerous separate operations, a relatively large number of serverless threads may be utilized for parallel processing of the operations (e.g., hundreds of thousands to millions of serverless threads). This greatly improves the efficiency of implementing functionality such as data integrity checking functionality upon the objects because such a large number of operations can be performed in parallel.

With this object format, snapshot data is stored within objects according to a snapshot file system tree structure, such as the data structures 524 of FIG. 5B. Because the snapshot data is stored within the objects according to the snapshot file system tree structure, the snapshot file system tree structure can be efficiently traversed to identify, access, and perform operations upon particular snapshots and/or snapshot data. This snapshot file system tree structure of the object format enables the ability for different portions of the snapshot file system tree structure (e.g., different branches) to be processed by separate containers and/or serverless threads in parallel. Being able to process different portions of an object in parallel enables the ability to scale out instances of containers and/or serverless threads for parallel processing. For example, any number of containers and/or serverless threads may be utilized to process different portions of objects during integrity checking in order to greatly reduce the amount of time it takes to perform the integrity checking. Also, instead of having to process an entire object, merely a select portion of the object may be identified through the snapshot file system tree structure so that the select portion can be processed.

In some embodiments, one or more data connector components may be instantiated through containers and/or serverless threads for performing integrity checks upon objects storing snapshot data of snapshots. A data connector component is capable of performing integrity checks upon objects or portions of objects because the data connector component is capable of interpreting the object format of the objects. For example, the data connector component may be capable of traversing a snapshot file system tree structure representing/organizing snapshot data of a snapshot stored within an object. In this way, the data connector component can traverse the snapshot file system tree structure to identify files, directories, and/or other data entities of a snapshot that are stored within the object in order to perform integrity checking upon the data entities.

The data connector component can also evaluate the snapshot file system tree structure in order to identify relationships between the object and other objects. For example, a relationship may indicate that the object corresponds an incremental snapshot that was created subsequent a prior incremental snapshot stored within another object. In this way, the data connector component can interpret the object format of objects in order to perform integrity checking upon the objects. Without the data connector component, integrity checking could not be performed because there may be no way to interpret the objects and/or identify snapshot data of a snapshot within the objects. The data connector component may be capable of implementing integrity checking functionality of objects stored within an object store, objects stored within a storage device such as on-premise storage, objects associated with a portable operating system interface (POSIX) file system, etc.

In some embodiment of implementing integrity checking, local integrity checks may be performed. In an example, the data connector component may implement a local integrity check to determine whether an object is accessible and/or readable, or whether the object is lost. This local integrity check can be performed by executing an access operation to access and/or read data within the object. In another example, the data connector component may perform a local integrity check to determine whether a slot within the object comprises valid and/or expected data. In particular, the object may comprise an object header, such as the object header 536 of FIG. 5C. The object header contains a magic entry describing the type of object and also has checksum for each slot. The data connector component may perform a local integrity check that will use the information within the object header such as the magic entry and the checksums to determine whether the data within the slots of the object match the information. If there is a mismatch between the information in the object header and data within a slot, then the data may be determined to be corrupt.

In some embodiments of implementing integrity checking, distributed integrity checks may be performed. Each snapshot may be represented by a snapshot file system tree structure, and an object may have relationships with other objects. The data connector component may perform a distributed integrity check to determine whether a relationship from a first object to a second object is healthy or broken. The data connector component can implement this distributed integrity check by verify whether pointers from the first object as a parent object to the second object as a child object exist. For example, bookkeeping metadata for the objects may indicate that the first object should have 6 pointers, but the distributed integrity check merely identified 5 pointers. If there is a missing pointer, then a relationship between the first object and the second object (e.g., the first object being a parent of the second object) represented by the pointer may be broken.

The data connector component may provide various levels of views of integrity checking information. A view may correspond to integrity checking information of objects themselves, such as a physical view of the objects, a health of the objects, a completeness of objects that make up a snapshot, etc. This view may provide insight into whether there are any missing, lost, or corrupt objects. Another view corresponds to a logical view of objects. This view corresponds to whether a user's logical view of the data within the objects is correct, such as whether the user can view the data as valid files and file data.

In some embodiments, scalable on-demand integrity checking is provided by using containers to host instances of a data connector component. In order to provide scalable on-demand integrity checking, containers hosting instances of a data connector component are configured to be stateless.

That is, functionality, code, and/or data utilized by a container is loaded into memory without having to persist state information of the container to storage. This allows the container to be instantiated into an executing state (onlined), offlined, paused, resumed, deleted, upgraded, and/or rebooted on-demand without having to save state information and restore the saved state information.

Any number of data connector components can be instantiated through containers on-demand on an as needed basis. If there is no longer work to be performed by a container, then the container can be deleted on-demand to conserve resources and reduce cost. For load balancing purposes, processing being performed by a data connector component of a container can be easily moved to a different data connector component of a different container because containers are stateless. For example, processing being performed by a relatively overburdened container may be transferred to a newly created container (e.g., a container created on-demand) or an existing container with available compute resources. Thus, any number of data connector components can be instantiated on-demand through containers in order to balance the load of processing being performed amongst the data connector components. This is enabled because the object format represents an object as a snapshot file system tree structure that can be divided into branches that can be individually processed by different data connector components in parallel in order to speed up the processing of the object. For example, if integrity checking is to be performed upon a large snapshot stored within one or more objects, then any number of containers can be created to host instances of a data connector component to process portions of the snapshot stored within branches of the one or more objects.

Integrity checking can be implemented in a scale out manner for efficiently processing objects. For example, containerization of data connector components may be implemented within a cluster environment, such as a kubernetes cluster that allows for any number of containers to be created on-demand for hosting instances of data connector components. A client device may connect to the cluster environment in order to request the execution of integrity checking functionality. A wrapper controller may be implemented for the request from the client device to the cluster environment. The wrapper controller may be used to determine what functionality is being requested by the client device and an amount of work to be performed by the functionality (e.g., whether integrity checking is to be performed on a relatively large amount of snapshot data or a relatively small amount of snapshot data). The wrapper controller can use this information to determine a number of instances of a data connector component to instantiate for efficiently performing the work (e.g., a single instance, 10 instances, 100 instances, etc.). In this way, a corresponding number of containers are created on-demand in a scale out manner to host the instances of the data connector component in order to perform the work in a divide and conquer manner.

Scaling out is performed in order to improve performance because any number of containers can be created and onlined for parallel processing of objects. This is because each container may have relatively low resource requirements because resources can be delegated in an amount that is tailored to just what resources are needed by a container to execute the work that the container is to perform. In an example, certain operations such as browsing snapshots stored in objects, deleting snapshots by deleting objects comprising only data unique to the deleted snapshots, and/or other metadata specific operations may have relatively smaller caching requirements, and thus less cache memory may be delegated to containers performing such metadata operations. In contrast, data access operations may have relatively larger caching requirements, and thus more cache memory may be delegated to containers performing such data operations. In an example of delegating a tailored amount of resource, a requestor that is requesting a container to host an instance of the data connector component may specify within a request what resources are to be allocated to the container, which may be done by a wrapper controller. In this way, memory and compute resources may be allocated in an efficient manner based upon what types of operations a container is to perform.

Integrity checking can be scaled out in an efficient manner because containers hosting data connector components are stateless, and also because the containers hosting data connector components are configured to operate in a non-locking manner. If a container hosting an instance of a data connector component implements a lock while performing an operation upon an object, then the lock would block other containers from being able to perform work upon the object. This would significantly hinder the ability to scale out. Accordingly, containers hosting data connector components are configured to operate in the non-locking manner because each container can operate on a different portion of an object (e.g., operate on non-overlapping snapshot data within the object). This is because the object format represents an object as a snapshot file system tree structure that can be treated as separate branches that can be individually processed by different containers in parallel. Also, because containers are stateless, if work is not being performed in a timely manner, then additional containers can be created on-demand to host new instances of the data connector component in a scaled out manner. In this way, pending work can be easily transferred to these new containers because there is no state information associated with the pending work that would need to be transferred to the new containers.

Because containers are stateless, container versions may be easily upgraded. For example, when a new container version of a container used to host an instance of a data connector component is available, one or more containers may be taken offline. In an example, some other containers may remain online in order to perform requests for integrity checking. The offlined containers may be upgraded to the new container version. The upgraded containers can be onlined for performing requests for integrity checking. Next, other containers may be offlined, upgraded, and onlined. In this way, containers can be easily offlined, upgraded, onlined, and have work transferred between containers because there is no state information to track, store, restore, and/or transfer amongst containers.

In some embodiments, the object format of the objects enables the ability to perform integrity checking through a serverless architecture. The serverless architecture may support the execution of serverless threads that can use resources as an on-need basis to perform work associated with functionality implemented by a data connector component. Because the object format represents an object according to a snapshot file system tree structure, branches of the snapshot file system tree structure may be individually processed by serverless threads in parallel. This parallel processing of an object greatly improves the efficiency of performing the data integrity checking upon the object. In an example, the number serverless threads can be scaled out on-demand to hundreds of thousands of serverless threads that can process an object within a relatively short amount of time compared to a single data connector component processing the object. Because the serverless architecture is being leveraged to perform the scale out, as opposed to a client device, clients are able to easily scale-up massive parallel jobs without having to manage their own compute instances or virtual machines because the serverless architecture handles such management overhead.

Integrity checking, such as by the serverless threads or by containers, can be event based. For example, if corruption of an object is detected, then this event may trigger the creation of one or more serverless threads and/or containers to perform integrity checking upon other objects that may also be affected. In another example, if an object store encounters a global issue (e.g., a cloud service provider failure), then this event may trigger the creation of one or more serverless threads and/or containers to perform integrity checking upon objects that could have been affected by the global issue.

In some embodiments, multiple modes of integrity checking may be implemented. A first mode of integrity checking may correspond to periodic full scans of objects, such as yearly scans. The first mode of integrity checking may be implemented because storage devices, storing the objects, may fail. The first mode of integrity checking may also be implemented because the objects may be migrated and/or redistributed such as for scaling purposes, and thus a full scan may be performed to ensure the integrity of the objects after migration.

A second mode of integrity checking may correspond to incremental scans of objects. That is, once a base snapshot of a file system or volume is created, then incremental snapshots may be created. An incremental snapshot may correspond to a difference between the incremental snapshot and a prior snapshot (e.g., the base snapshot or a prior incremental snapshot), as opposed to all data of the file system or volume. Due to the incremental nature of snapshots, the second mode of integrity checking can be used to implement incremental integrity checks. For example, an integrity scan may be performed for the prior snapshot. When a subsequent integrity scan is to be performed for the incremental snapshot, merely the difference between the incremental snapshot and the prior snapshot is scanned. This incremental scan is performant and efficient because the already scanned data that is the same between the prior snapshot and the incremental snapshot is not rescanned, and only the unscanned data corresponding to the difference between the snapshots is scanned.

Instead of having to list and compare all of the data of the two snapshots in order to identify the difference between the snapshots, which could take hours, a difference operation may be performed to quickly identify the difference between the snapshots. The difference operation can quickly identify the difference between the snapshots because the difference operation can quickly traverse the tree structure of the incremental snapshot to identify nodes and branches that have changed and should be evaluated, and skip nodes and branches that have not changed. For example, if a top/root node of a branch indicates that nothing has changed, then the entire branch can be skipped by the difference operation. Also, if an object has an integrity issue, then merely that object and children of the object are scanned. In this way, the difference operation may be able to identify the difference between the snapshots within seconds as opposed to hours because a full traversal is not performed.

In some embodiments, a data connector component may be implemented to manage objects hosted within a single cloud provider, across a hybrid cloud, and/or across a multi-cloud environment. In an example, an object comprising snapshot data of a snapshot may be copied from a first bucket of an object store to a second bucket within the object store. The object may be copied to the second bucket because the second bucket may have desired characteristics for storing the snapshot (e.g., improved latency, improved storage data protection, lower cost, etc.) and/or for load balancing purposes. In another example, the object within the first bucket may be copied to make a copied object within the first bucket for backup and/or redundancy purposes. In another example, the object may be migrated from the object store to a different object store, thus enabling the ability to migrate between different object store providers. This is enabled because the data connector component and the object format may be object store provider agnostic. The data connector component may be object store provider agnostic because the data connector component can be instantiated through any container and can interpret the object format of the objects regardless of where the objects are stored.

In some embodiments, machine learning functionality may be incorporated into a data connector component. The machine learning functionality may be trained as the data connector component implements integrity checking for objects. During training, parameters of a machine learning model implementing the machine learning functionality may be adjusted with varying weights to give more weight to parameters that resulted in integrity checking functionality correctly identifying a data integrity issue and less weight to parameters that resulted in integrity checking functionality incorrectly identifying a data integrity issue. In this way, accuracy of the data connector component to correctly identify data integrity issues may be improved over time by training the machine learning model. Once trained, the data connector component may be used to re-check previously checked objects to see if the prior integrity checking results were correct or not.

In some embodiments, integrity checking results and/or machine learning information can be stored within objects. For example, a base object may store snapshot data of a snapshot according the snapshot file system tree structure of the object format, such as where a first 10 bytes are populated with the snapshot data. A sibling object (a metadata sibling object) can be created and populated with integrity checking results and/or machine learning information (e.g., information regarding whether data within the base object was identified as being corrupt; values and/or weights of parameters of a machine learning model used to detect the corruption; etc.). A pointer or other reference to the sibling object may be add to the base object, such as into an 11th byte. In this way, the integrity checking results and/or machine learning information in the sibling object can be accessed through the base object. Additionally, the snapshot data of the base object remains intact so that the base object still represents the snapshot.

In some embodiments, read ahead and prefetching may be implemented by a data connector component. For example, when the data connector component reads snapshot data of a snapshot from an object within the object store, the data connector component may predict what additional data of the object and/or other objects to read. This prediction may be based upon prior access patterns (e.g., integrity checking may routinely be performed upon an entire snapshot, and thus data from other objects that also comprise snapshot data of the snapshot may be retrieved). In an example, the more data that is retrieved at one time from an object store, the overall cost per data unit is less compared to performing multiple read operations to the object store for the same amount of data. Thus, prefetching additional data that has been predicted to have a threshold likelihood of being accessed will reduce the overall cost. Similarly, if a particular portion of an object is being read, then a certain additional amount of data of the object may be retrieved by a read ahead operation so that the additional data is readily available for processing.

In some embodiments, a data connector component is implemented as a plugin for on-demand integrity checking for remote object stores. The plugin may be used to connect to a remote file system of a remote object store. The plugin may be employed as containers in a scale out and on-demand manner, which can be seamlessly integrated into kubernetes clusters. This provides the ability to perform file system metadata analysis. Additionally, read-only operations may be offload to the containers for implementation (e.g., offloaded from a storage operating system of a client device or node hosted outside of the remote object store). Because snapshots and volumes hosted by the remote object store can grow over time, frequent calls to manage these snapshots and volumes can be burdensome on systems that are actively processing client I/O. Thus, the management, integrity checking, and collection of statistics may be offloaded from these systems processing client I/O to the containers in order to free up resources of the systems for processing the client I/O, which can reduce latency.

Figure 9:
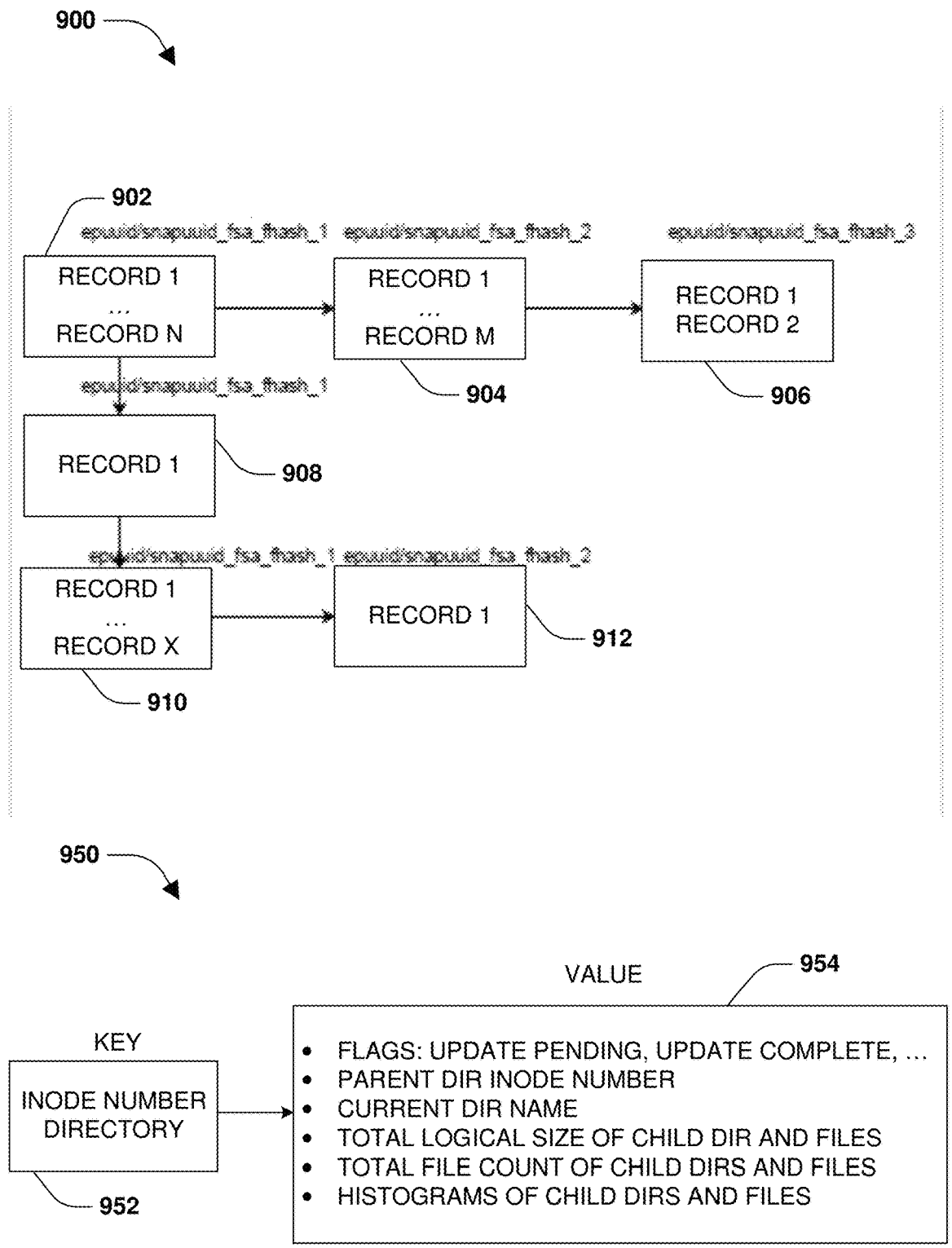
FIG. 9 is an example of an analysis metafile object format and a record entry for a directory.

In an embodiment, it may not be desirable to enable file system analysis in a primary volume being accessed by clients due to performance and other reasons. In such cases, a data connector component can generate an analysis metafile from scratch and will keep the analysis metafile updated as when new snapshots appear. To share the analysis metadata and/or code associated therewith, it may be desirable to keep the metafile format the same as a V+ metafile and to teach the data connector component to read and write the V+ metafile. However, a V+ metafile may work if there is adequate storage (either in-memory or on-disk) to load and will process the whole V+ metafile, such as because manipulation of records can cause rebalancing that may change various parts of the V+ metafile. In cases where there are tens of thousands of directories, the V+ metafile can grow to tens of GBs and will not fit well within data connector component constraints (e.g., ~1 GB in-memory) and no on-disk state. Accordingly, as provided herein, an analysis metafile object format (a flat object format) is provided that will work within the constraints of the data connector component and the object store 716. The analysis metafile object format may be utilized when the data connector component is to generate an analysis metadata. An example of an analysis metafile object format 900 is illustrated by FIG. 9.

Rules for the analysis metafile object format may include: Objectname will be of format—epuuid/Analysis_fhash_seqnumber; fhash will be generated using inum and dirname (not fullpath) and a max_obj_seed. Max_obj_seed will allow the ability to control the max number of hash_root_objects. If desired, more inputs can be added to hash. The first object created using fhash is called hash_root_object and will start with seqnumber (sequence number) of 1. The size of each object may be no more than a threshold (e.g., 4 MB) with following exceptions. A last record may go beyond the threshold. Additions to existing records will be allowed to grow the size of object beyond the threshold. New records will be attempted to accommodate in hash_root_objects if there is enough space. If an existing object does not have enough space, the next connecting object will be tried. If the last object in the horizontal chain does not have space as well, a new object will be created with a sequence number one greater than the previous sequence number in the chain.

In an embodiment of generating an analysis metafile for the first time, a new scanner is written that will pick up a snapshot preferably the latest and will crawl the directory tree recursively (e.g., a snapshot file system tree structure). Certain account and updates may be performed upon analysis records in a depth first fashion where accounting for a directory in level X will not be marked as complete until all the child directory and files below level X are marked as scan completed. The objects that are filled per the object format rules will be written down to the object store 716. The parent directory record will be picked up by recursion and will be updated and marked scan complete. This will be repeated until the record for root directory is updated. If an object is not present in-memory, then the object will be read/modified and overwritten. Overwrites can cause eventual consistency and can be solved by writing to scratch spaces and maintaining temporary mappings in data connector component in-memory. In an example, it may be desirable to have more entries to individual records than the entries that are supported by analysis for primary volumes, which may be supported.

In an embodiment of updating the analysis metafile for a new snapshot, the analysis metafile may be updated when new snapshots arrive to provide the latest view of the metadata to clients. Until the new updated analysis metafile is generated, the access to analysis (e.g., the ability to analyze file system metadata) will continue happening from the version in base snapshot. At this time, the scanner will do a directory diff between the base snapshot scanned and the new snapshot and do the follow: Identify a child directory which has been added. Add the record for new child and update all parents all the way till a root. Identify a child directory which has been added. Remove all the entries from the parent and the parent's parent all the way up to a root for this directory from the previous version. Identify a child directory which has been modified. Remove all the entries from the parent and it's parent all the way up to root for this directory from the previous version. Now, scan the new directory and update the record for new child and update all parents all the way till the root. Write the new analysis metafile. New analysis metafile objects will have incremental snapuuid in the name. The older analysis metafile version which had the base snapshot uuid in it's name will be freed as part of garbage collection when the base snapshot will be deleted in future.

In an embodiment of accessing records via APIs, access to the records is enabled via data connector component REST APIs. The REST APIs include giving break down of logical space or file count for each directory and all it's children. Also if the primary volumes have connectivity to the object store 716, existing storage operating system REST APIs can provide the analysis report by the data connector component for last snapshot scanned.

Figure 8:
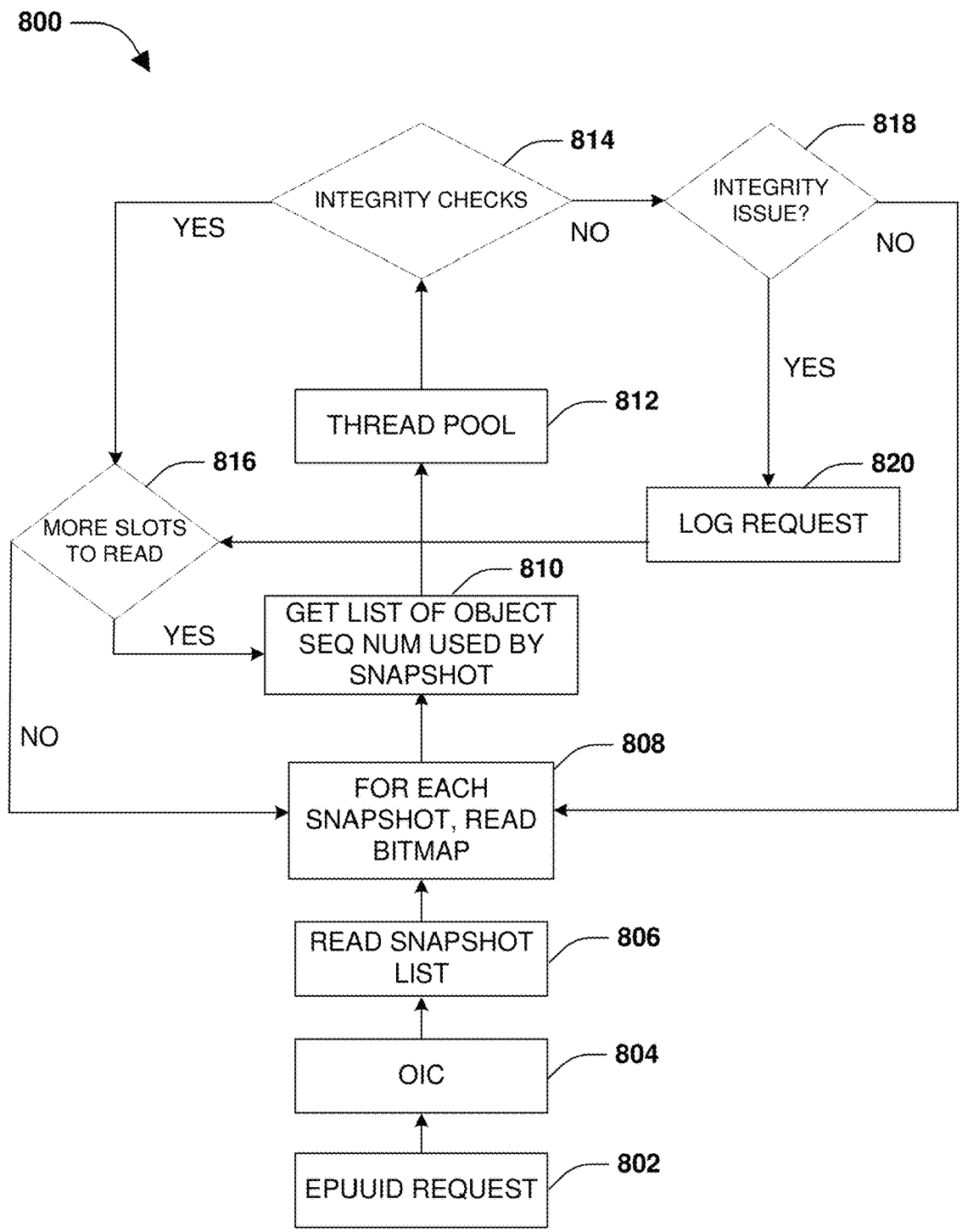
FIG. 8 is a flow chart illustrating an example method for implementing integrity checking, anomaly detection, and file system metadata analysis associated with objects stored within an object store.

FIG. 8 illustrates an example 800 of performing integrity checks such as whether an object exists, performing object local checks, performing filesystem checks, etc. For example, a request 802 may be received such as by an object integrity checker (OIC) 804. A read snapshot list operation 806 may be performed. A bitmap for each snapshot may be evaluated 808 to obtain 810 a list of objects and sequences numbers of the objects used by a snapshot. A thread pool 812 may be used to perform the integrity checks 814, which may involve reading data within slots of objects if a decision 816 indicates that there are slots to read. If an integrity issue is found during decision 818, then the integrity issue may be logged 820.

FIG. 9 illustrates an example of how analysis can be performed upon a directory and files of the directory in order to provide a file system statistical usage view to a user. The analysis may utilize an analysis metafile object format 900. The analysis metafile object format 900 may comprise a first object 902 corresponding to a record entry 1 through record entry (N). The analysis metafile object format 900 may comprise a second object 904 corresponding to a record entry (1) through record entry (M). The analysis metafile object format 900 may comprise a third object 906 corresponding to record entry 1 and record entry 2. The analysis metafile object format 900 may comprise a fourth object 908 corresponding to a record entry 1 instance. The analysis metafile object format 900 may comprise a fifth object 910 corresponding to record entry 1 through record entry (X). The analysis metafile object format 900 may comprise a sixth object 912 correspond to a record entry 1.

A record entry such as a record entry 950 for a directory may comprise a key 952, such as an inode number directory. The key 952 may be paired with a value 954. The value 954 may comprise various data associated with the directory, such as flags (e.g., an update pending flag, an update complete flag), a parent directory inode number of a parent directory, a current directory name of the directory, a total logical size of child directories and files of the directory, a total file count of child directories and files of the directory, histograms of child directories or files of the directory, etc.

In an example of the object format for analysis metafiles, an object name may be epuuid/analysis_flash_seqnumber. fhash may be generated using an inode number and directory name (but not a full path), and a max_obj_seed used to control a maximum number of hash_root_objects. More inputs can be added to the hash if needed. A first object created using fhash is called hash_root_object with a starting sequence number of 1. A size of each object may be limited to a particular size limit such as 4 mb. Exceptions to this may allow a last record to exceed the size limit. Also, additions to existing records may be allowed to let the size of the object exceed the size limit. New records may be accommodated in the hash_root_objects if there is enough space. If an existing object does not have enough space, then a next connecting object may be tried. If a last object in a horizontal chain (e.g., the third object 906) does not have enough space, then a new object (e.g., the fourth object 908) will be created with a sequence number one greater than the sequence number in the previous chain.

Figure 10:
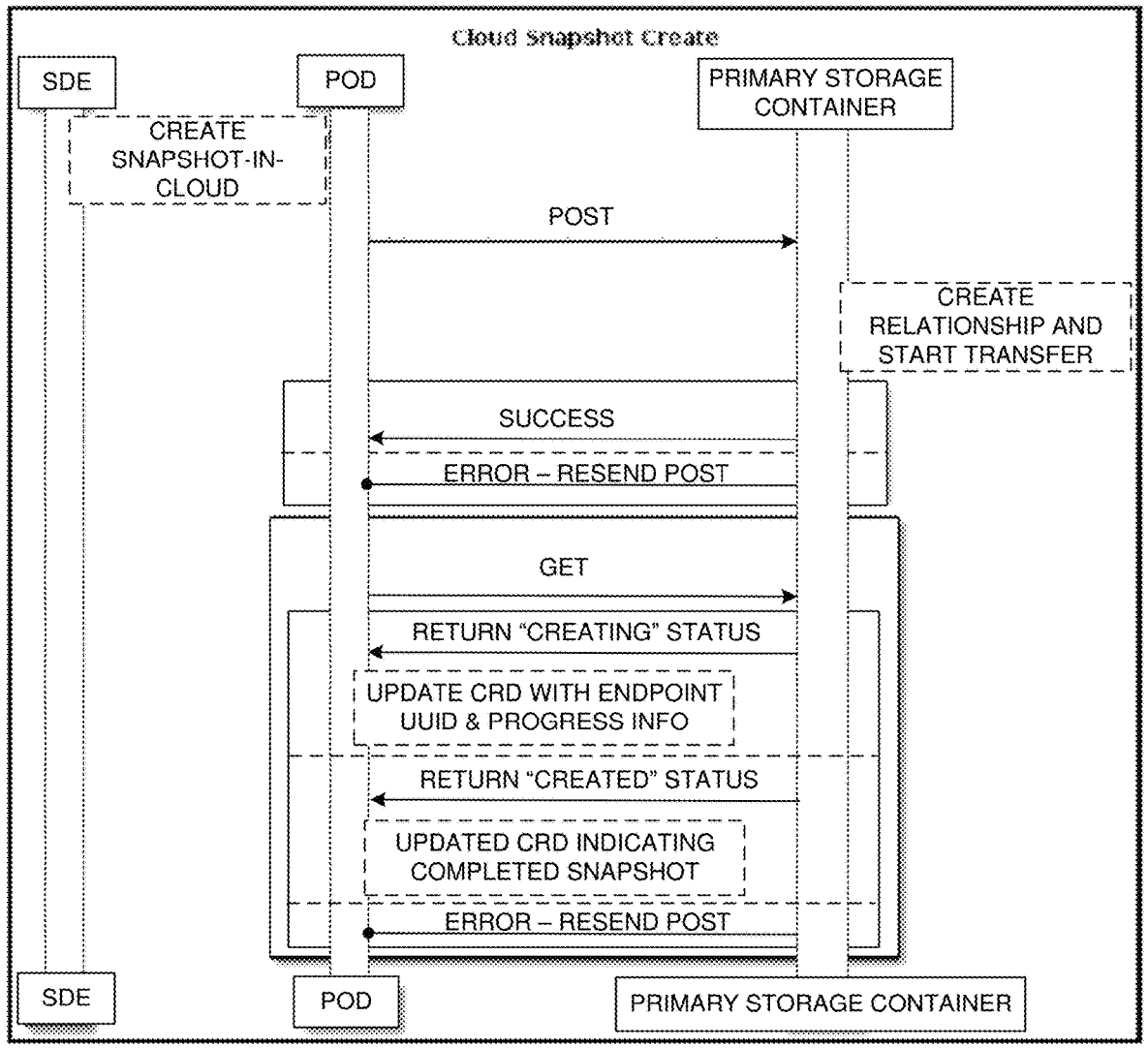
FIG. 10 is a flow chart illustrating an example method for implementing requests associated with objects stored within an object store.
Figure 11:
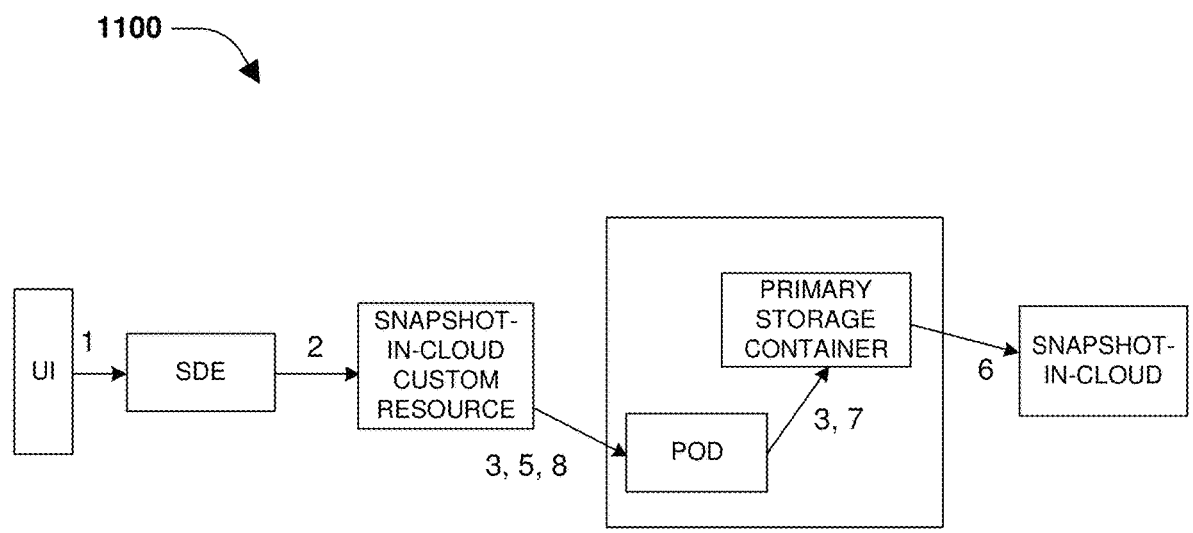
FIG. 11 is a component block diagram illustrating an example system for implementing requests associated with objects stored within an object store.

FIGS. 10 and 11 depict examples 1000, 1100 of snapshot creation. In an embodiment, a user selects a volume, and requests creation of a snapshot-in-cloud. An SDE (e.g., a client) creates a CR for the snapshot-in-cloud (e.g., a custom resource (CR) records the snapshot-in-cloud UUID provided by SDE). Pod (e.g., a component/module implemented by software, hardware, or combination there) picks up the custom resource (CR) for Cloud Snapshot creation and sends a POST to a primary storage container to start the transfer. A POST payload includes the following: cloud bucket info and credentials (bucket info, secret/access) and Snapshot UUID. The primary storage container does the following upon receiving the request: creates a mirroring relationship if not present; creates or recreates object store configuration if not present or if information has changed; triggers a 'mirror update' or 'mirror initialize' depending on whether this was the first time snapshot-in-cloud was created or this is a subsequent creation; any failure in the above steps will return an error to POST response. The Pod updates CR with some indication that transfer is 'in progress' so that the Pod will now start sending a GET. A mirror transfer is started and automatically creates a Snapshot on the source volume to replicate to the cloud bucket. UUID for the Snapshot is supplied by SDE, and the Snapshot on the volume will be stamped with this same UUID. Once a snapshot-in-cloud is created for a volume, there will be a single Snapshot on the source volume while transfer is idle, and two such Snapshots while the transfer is running. The Snapshot (Volume Snapshot) is stamped with the same UUID. The Pod polls a primary storage container using a GET which returns: Status Creating, created or an error, bytes transferred, transfer progress in % (to be stored in CRD), endpoint UUID (to be stored in CRD), logical space (to be stored in CRD). When transfer completes, the Pod updates the CRD indicating Snapshot-in-cloud is created.

Figure 12:
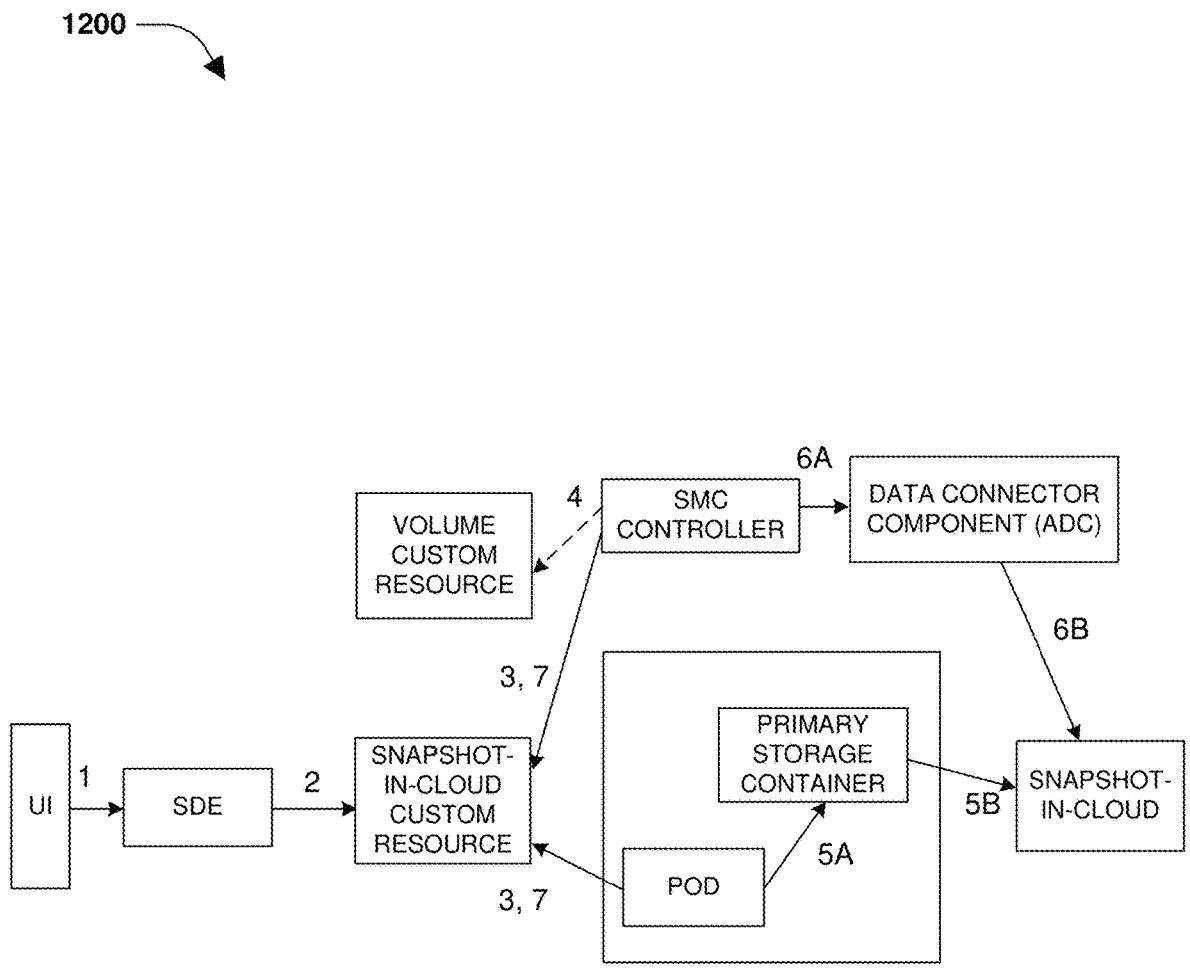
FIG. 12 is a component block diagram illustrating an example system for implementing requests associated with objects stored within an object store.

FIG. 12 depicts an example 1200 of snapshot management utilizing a data connector component (ADC), such as deleting a snapshot. In an embodiment, a user selects a Snapshot-in-cloud to delete from the UI. An SDE (via NVC Client) deletes the Snapshot-in-cloud CR. The Pod and SMC Controller detects the Snapshot-in-cloud CR deletion. The SMC Controller checks to see whether the Volume CR is present or not. If the Volume CR is present, this indicates that the Pod is still alive and allows Pod to handle the Snapshot-in-cloud deletion. If the Volume CR is gone, SMC Controller handles the deletion. If the Volume CR is present: Pod repeatedly sends DELETE REST request to primary storage container until complete (i.e., return HTTP Status 404); and primary storage container asynchronously deletes the objects associated with individual Snapshot-in-cloud or the endpoint from the bucket. If the Volume CR not is present: SMC Controller sends DELETE REST request to data connector component (ADC) until complete (i.e., returns HTTP Status 404); and the ADC either marks the Snapshot-in-cloud as deleted or asynchronously deletes the endpoint (all objects) from the bucket. Once the Pod or SMC Controller receives a NOT FOUND response from primary storage container/ADC respectively, the finalizer is removed from the Snapshot-in-cloud CR, allowing the CR to be completely removed.

Figure 13:
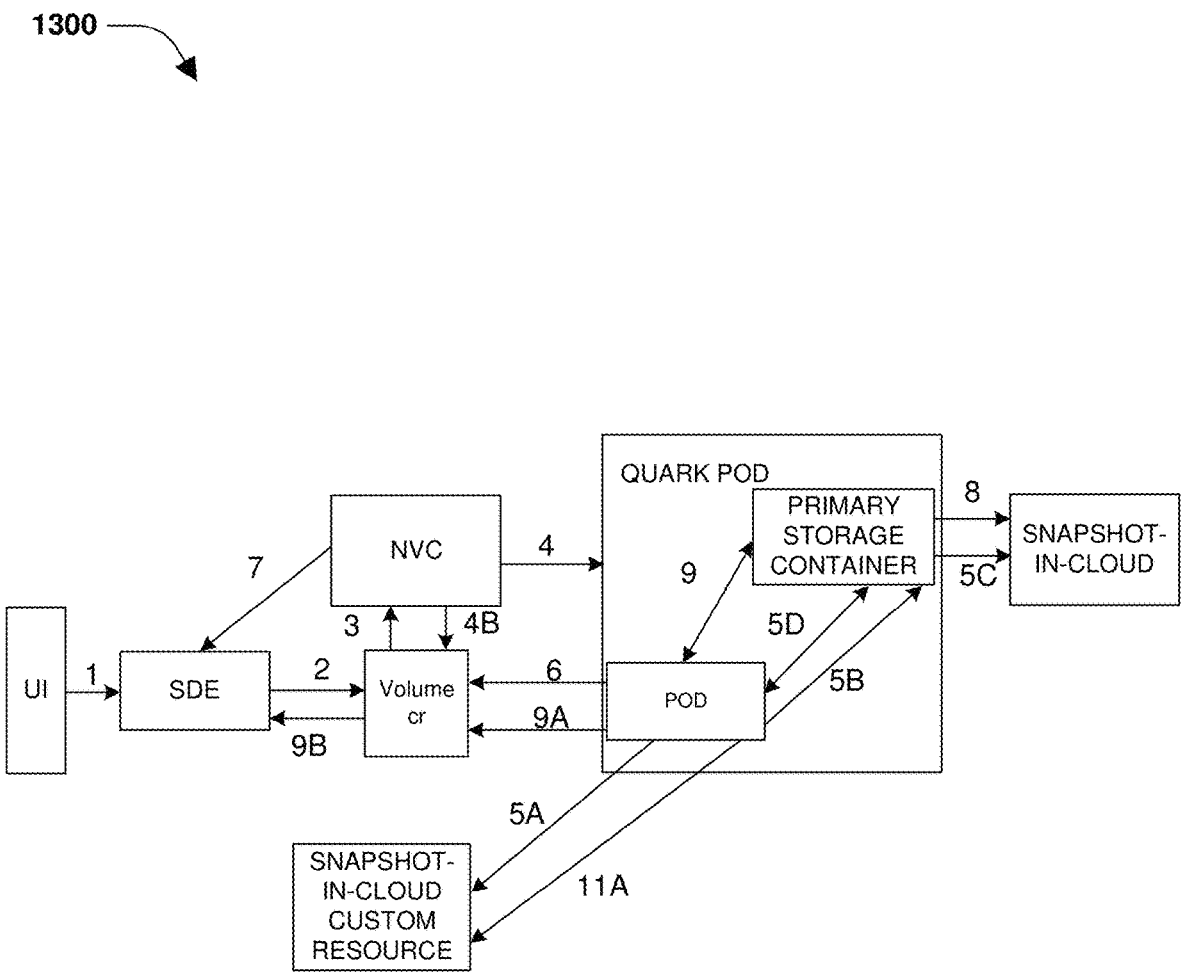
FIG. 13 is a component block diagram illustrating an example system for implementing requests associated with objects stored within an object store.

FIG. 13 depicts an example 1300 of snapshot management, such as performing a snapshot restore. In an embodiment, a user selects the cloud snapshot in the front end which is to be restored. The SDE creates a Volume Custom Resource (CR) to be used for Cloud Snapshot Restore. This CR stores the cloud snapshot UUID. NVC picks up the Volume CR to be used to create the Quark POD. In an example, the space needed for the restored primary storage container is 30% more than the logical space of the cloud snapshot. NVC creates a new Quark POD based on the Volume CR. Based on the Snapshot-in-cloud UUID present in the Volume CR, the primary storage container volume will be created as a DP volume used for OnDemand restore. NVC updates the volume status in the Volume CR after the POD creation is successful. In an example, the volume is not usable by the clients at this point. Volume GET returns 'offline' state at this point.

Pod (from the POD created), picks up the endpoint details from the Snapshot-in-cloud CR and issues REST calls to the primary storage container to start Ondemand restore. The pod updates the Snapshot-in-cloud CR by incrementing a refcount to prevent deletion of the CR. The pod sends a PATCH request to a primary storage container with an endpoint and cloud snapshot details (REST API details). The primary storage container issues Ondemand restore to the DP volume from the cloud snapshot. The pod keeps polling the primary storage container for Ondemand restore progress using GET calls.

While restore is in the setup phase, a state of 'preparing' will be return. Once this changes to 'restoring', the volume is considered mountable by the client. The pod updates the Ondemand restore progress in the Volume CR. Once GET returns a 'restoring' state, the pod updates the Volume CR to indicate that volume is ready to be mounted. The pod sets 'restoring' and 'online' state in Volume CR. The primary storage container converts the DP volume to Read-Write. The volume can be used by the clients. The volume remains an Ondemand volume and clients may observe lower performance. NVC client creates a VolumeOnline event which is picked up by the SDE and the volume is shown as online in the front end UI. Primary storage container starts the phase 2 scanner (data pull) automatically. Pod polls the primary storage container using REST calls to get the phase 2 scanner progress and updates the Volume CR. Once all the data is pulled, primary storage container converts the Ondemand volume to a normal volume. The performance limitations no longer apply and the volume performs like any read/write volume. Once the transfer completes the pod is assigned a 'restored' state. The pod decrements the refcount from the Snapshot-in-cloud CR.

Figure 14:
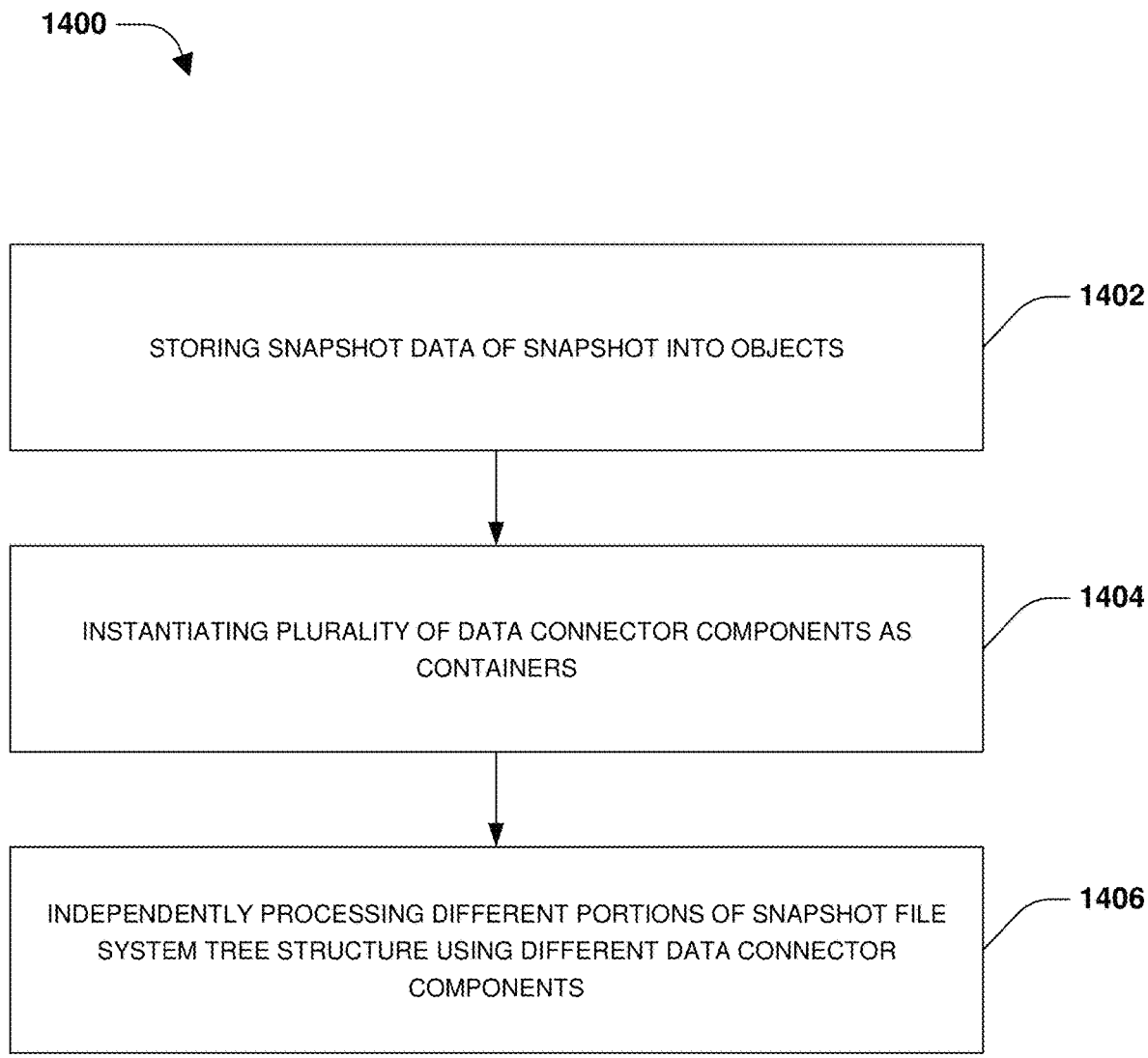
FIG. 14 is a flow chart illustrating an example method for parallel processing of an object using containers.
Figure 15:
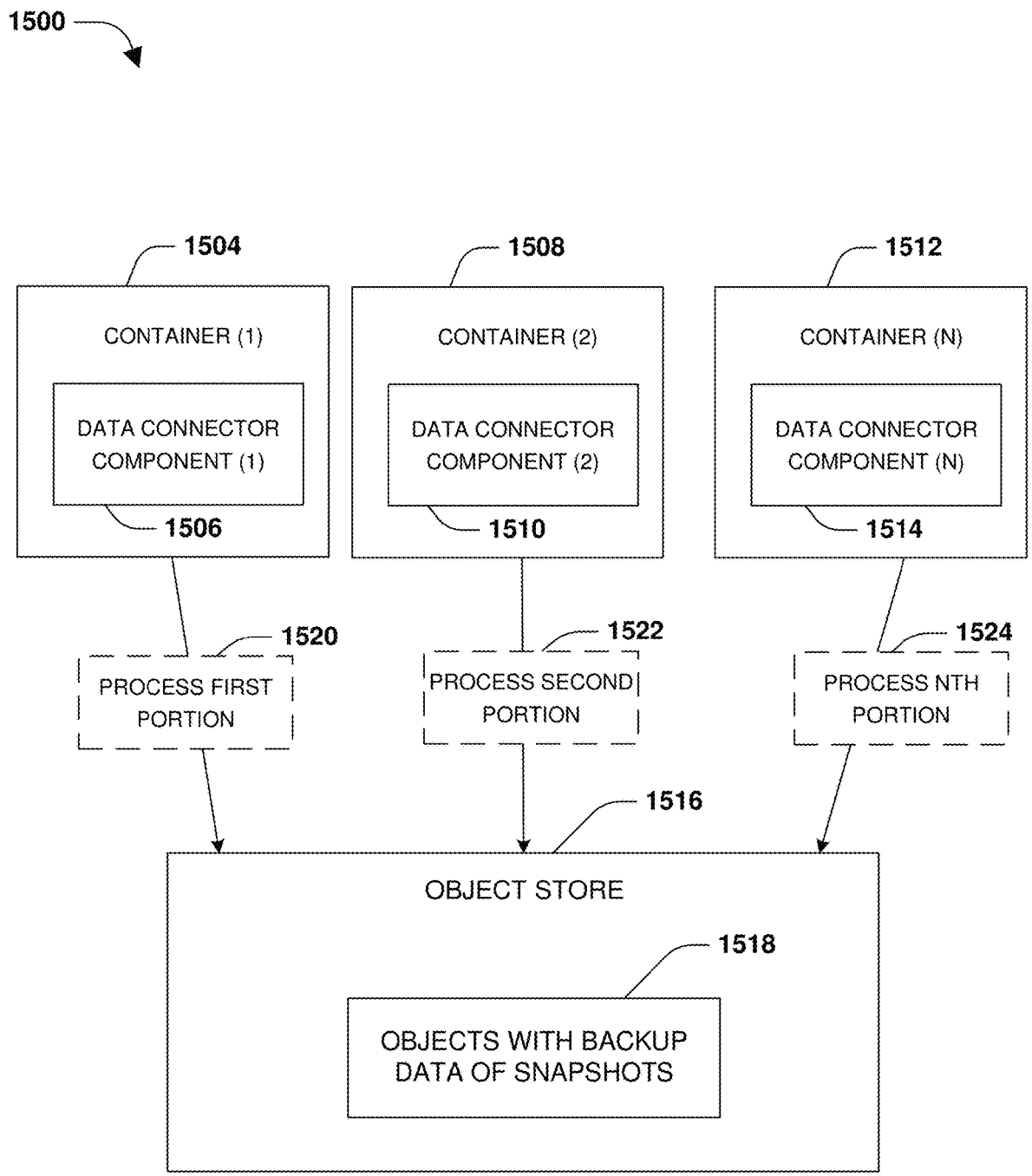
FIG. 15 is a component block diagram illustrating an example system for parallel processing of an object using containers.

One embodiment of parallel processing of an object using containers is illustrated by an exemplary method 1400 of FIG. 14 and further described in conjunction with system 1500 of FIG. 15. Snapshots may be created as point in time representations of volumes, file systems, or other storage structures. The snapshots may comprise snapshot data of files, directories, and/or metadata of the volumes, file systems, or other storage structures. In an example, a snapshot may be created using snapshot functionality of a storage operating system of a node used to store data on behalf of a client. An object store, such as a cloud computing environment, may provide relatively more cost effective and scalable storage compared to the node. Thus, it may be beneficial to store the snapshot data of the snapshots into one or more object stores, such as object store 1516.

During operation 1402 of method 1400 of FIG. 14, snapshot data of a snapshot may be stored into one or more objects 1518 according to an object format, such as the object format described in relation to object 508 of FIG. 5C. For example, the snapshot may be represented as the object format where the snapshot data is structured according to a snapshot file system tree structure, such as the data structures 524 of FIG. 5B. The snapshot file system tree structure may comprise a root node, intermediate nodes, and leaf nodes. Snapshot data may be stored within the leaf nodes at a bottom level of the snapshot file system tree structure. The intermediate nodes may be within one or more intermediate levels of the snapshot file system tree structure, and may comprise references or pointers to nodes within lower levels. The intermediate nodes provide levels of indirection for the snapshot file system tree structure. In this way, the snapshot file system tree structure may form a tree structure of nodes that may be traversed from the root node, down through the intermediate nodes, to the leaf nodes for locating and accessing snapshot data.

The snapshot file system tree structure of a snapshot may comprise branches that may be separately processed by different containers and/or serverless threads in parallel without the need for locking an entire object because the different branches will each correspond to different snapshot data that does not overlap. The ability to separately process different branches allows for parallel processing of an object by any number of data container component instances hosted within containers and/or by any number of serverless threads of a serverless thread architecture. In this way, the work of performing an operation such as performing integrity checking for the objects within the object store 1516 can be broken up and performed in parallel to traverse through the different branches of the snapshot file system tree structure for processing the different branches in parallel. This greatly reduces the time to perform operations, such as integrity checking for snapshots, snapshot data, and objects. In an embodiment, the containers and/or serverless threads are not hosted and/or managed by a client, but are instead hosted and/or managed by a serverless thread architecture and/or a cloud computing environment such as the object store 1516 or other environment that can provide largescale scale-up of parallel jobs without a client having to manage its own compute instances or virtual machines to perform such work.

A determination may be made that an operation is to be performed. In an example, a request may be received to perform the operation, such as an integrity check operation received as part of an integrity checking policy and schedule indicating that an integrity check of the one or more objects 1518 is to be performed. In another example, an event may trigger the performance of the operation, such as where the object store 1516 experiences an operational issue or another object is identified as being corrupt and thus the one or more objects 1518 may also be corrupt.

In response to the determination that the operation is to be executed for the snapshot, a plurality of data connector components may be instantiated as containers on-demand, during operation 1404 of method 1400 of FIG. 14. In an example, a model that is object store provider agnostic may be used to create any number of data connector components as containers. These containers are object store provider agnostic plugins that can access any type of object store and natively interpret the object format of objects stored through any type of object store provider. For example, a container may be created to host an active data connector component as an object store provider agnostic plugin. The data connector component may be used to connect to a first type of object store provider in order to access a first type of object store, natively interpret objects stored within the first type of object store, and/or perform operations upon the objects such as integrity checking. The data connector component may also be used to connect to a second type of object store provider in order to access a second type of object store, natively interpret objects stored within the second type of object store, and/or perform operations upon the objects such as integrity checking. The first type of object store provider and first type of object store may be different than the second type of object store provider and second type of object store, such as where different APIs, commands, and/or functionality are implemented. In this way, the model can be used to create any number of instances of a data connector component within containers as object store provider agnostic plugins for accessing any type of object store and natively interpreting the object format of objects in order to manage and perform operations upon the objects.

In an embodiment, a determination may be made as to how many instances of the data connector component to create (e.g., how many containers to create on-demand where each container hosts a single instance of the data connector component). The determination may be made based upon an amount of work to be performed to complete the operation, and how the operation can be split into separate jobs (separate work) for parallel execution. The determination may be made based upon a number of branches that can be processed in parallel. In an example, the snapshot file system tree structure may be traversed to identify branches as different portions of objects that can be separately processed in parallel by different instances of the data connect component. For example, a first branch may comprise first snapshot data of the snapshot, a second branch may comprise second snapshot data of the snapshot different than the first snapshot data, etc. Because each branch may correspond to different snapshot data than other branches, the branches can be processed in parallel without having the lock the entire object/snapshot because no container would be concurrently processing the same snapshot data since different branches may be assigned to different containers for processing by data connector components hosted by the containers.

In an embodiment, a first container 1504 is created on-demand to host a first data connector component instance 1506. A second container 1508 is created on-demand to host a second data connector component instance 1510. In this way, any number of containers may be created on-demand to host instances of a data connector component for parallel execution of the operation upon different portions/branches of the snapshot file system tree structure, such as a container (N) 1512 hosting an nth data connector component instance 1514.

During operation 1406 of method 1400 of FIG. 14, different portions (branches) of the snapshot file system tree structure may be independently processed by different data connector components for parallel execution of the operation upon the one or more objects 1518 storing snapshot data of the snapshot upon which the operation is to be executed. The first data connector component instance 1506 of the first container 1504 may process 1520 a first portion of the snapshot file system tree structure, such as first snapshot data of the snapshot represented by the first portion of the snapshot file system tree structure. The second data connector component instance 1510 of the second container 1508 may process 1522 a second portion of the snapshot file system tree structure, such as second snapshot data of the snapshot represented by the second portion of the snapshot file system tree structure. The nth data connector component instance 1514 of the nth container 1512 may process 1524 an nth portion of the snapshot file system tree structure, such as nth snapshot data of the snapshot represented by the nth portion of the snapshot file system tree structure. The first snapshot data, the second snapshot data, and/or other snapshot data may be processed in parallel by the first data connector component instance 1506 of the first container 1504, second data connector component instance 1510 of the second container 1508, and/or other data connector component instances. The first snapshot data, the second snapshot data, and/or other snapshot data may be stored within the same object or across different objects. In this way, largescale scale-up of containers can be performed on-demand for parallel processing of an operation.

In an embodiment, bitmaps may be created for snapshots whose data is stored into objects within the object store 1516. The bitmaps may indicate which objects within the object store 1516 comprise snapshot data of snapshots. For example, a bitmap may be created for the snapshot whose snapshot data is stored within the one or more objects 1518 within the object store 1516. The bitmap may comprise bits that are set to values indicating whether objects within the object store 1516 comprise snapshot data of that snapshot. The bitmap may be utilized to identify the objects, such as the one or more objects 1518, as comprising the snapshot data of the snapshot. In an example, the snapshot file system tree structure of the snapshot may be traversed and/or bitmaps of snapshots may be evaluated to identify any objects comprising only unique snapshot data that is unique to the snapshot and not shared with other snapshots. An operation may be performed upon these objects, such as garbage collection if the snapshot has been deleted and snapshot data within the objects are no longer referenced because the snapshot has been deleted. In another example, the bitmap may be used to identify a list of the objects that represent the snapshot so that the objects can be easily identifiable for performing an operation associated with the snapshot.

Because a data connector component can understand the object format of objects and the snapshot file system tree structure of snapshots whose data is stored within the objects, the data connector component can perform various migration and copy operations for snapshots and objects. In an example, the data connector component may migrate the one or more objects 1518 from being stored within the object store 1516 to being stored within a different object store of a different object store provider. In another example, the data connector component may copy objects comprising snapshot data of a snapshot to create copied objects representing a replicated copy of the snapshot. In another example, the one or more objects 1518 may be stored within one or more storage structures of the object store 1516, such as within buckets or regions of the object store 1516. The data connector component may migrate the one or more objects 1518 from a first storage structure to a second storage structure. This migration may be performed based upon load balancing consideration, a proximity of a region comprising the second storage structure with respect to an operation to be performed upon the one or more objects 1518 (e.g., migrate the one or more objects 1518 to a closer region proximate a client), or a characteristic of the second storage structure (e.g., a desired latency, cost, data protection, etc.).

Once the operation is complete and/or if there is a reduced demand/load, one or more of the data connector component instances may be deconstructed on-demand. Containers hosting the one or more data connector component instances may also be deconstructed to reduce overhead and/or cost otherwise incurred by maintaining the containers.

Figure 16:
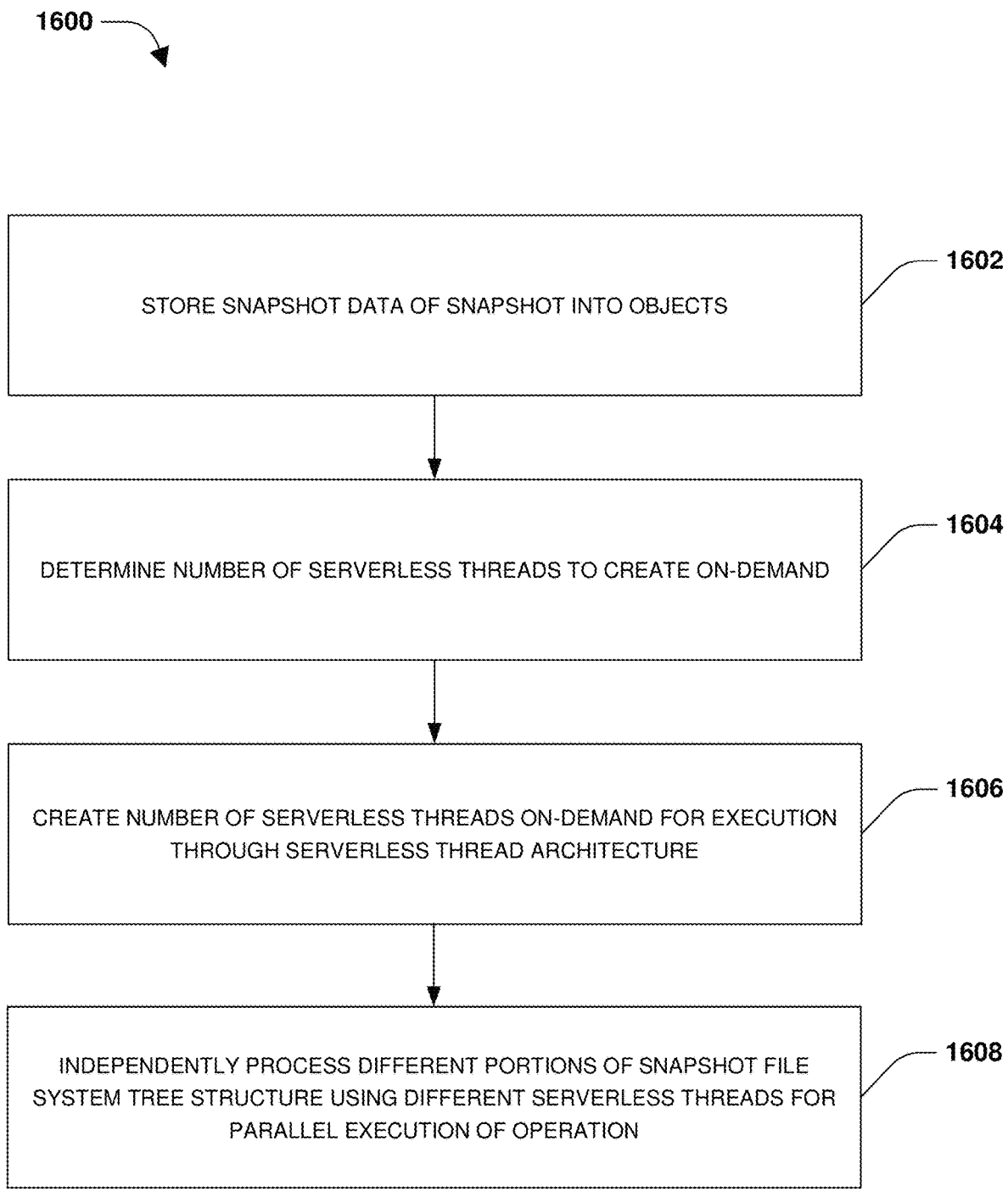
FIG. 16 is a flow chart illustrating an example method for parallel processing of an object using serverless threads.
Figure 17:
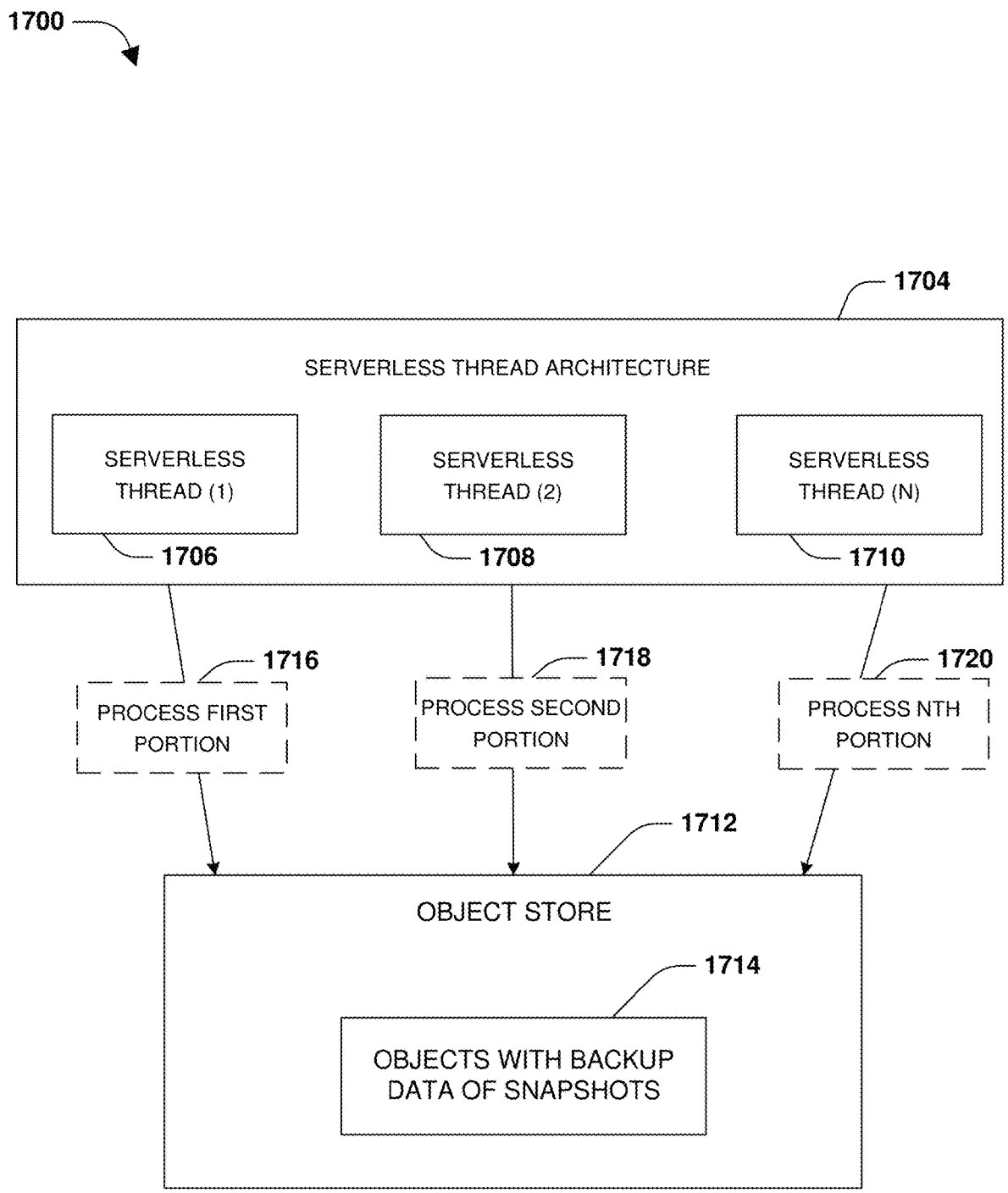
FIG. 17 is a component block diagram illustrating an example system for parallel processing of an object using serverless threads.

One embodiment of parallel processing of an object using serverless threads is illustrated by an exemplary method 1600 of FIG. 16 and further described in conjunction with system 1700 of FIG. 17. During operation 1602 of method 1600 of FIG. 16, snapshot data of a snapshot may be stored into one or more objects 1714 according to an object format, such as the object format described in relation to object 508 of FIG. 5C. For example, the snapshot may be represented as the object format where the snapshot data is structured according to a snapshot file system tree structure, such as the data structures 524 of FIG. 5B. The snapshot file system tree structure may comprise a root node, intermediate nodes, and leaf nodes. Snapshot data may be stored within the leaf nodes at a bottom level of the snapshot file system tree structure. The intermediate nodes may be within one or more intermediate levels of the snapshot file system tree structure, and may comprise references or pointers to nodes within lower levels. The intermediate nodes provide levels of indirection for the snapshot file system tree structure. In this way, the snapshot file system tree structure may form a tree structure of nodes that may be traversed from the root node, down through the intermediate nodes, to the leaf nodes for locating and accessing snapshot data.

The snapshot file system tree structure of a snapshot may comprise branches that may be separately processed by different serverless threads in parallel without the need for locking an entire object or objects comprising snapshot data of a snapshot because the different branches will each correspond to different snapshot data that does not overlap. The ability to separately process different branches allows for parallel processing of an object by any number of serverless threads of a serverless thread architecture 1704. In this way, the work of performing an operation such as performing integrity checking for the objects within the object store 1712 can be broken up and performed in parallel to traverse through the different branches of the snapshot file system tree structure for processing the different branches in parallel. This greatly reduces the time to perform operations, such as integrity checking for snapshots, snapshot data, and objects. In an embodiment, the serverless threads are not hosted and/or managed by a client, but are instead hosted and/or managed by the serverless thread architecture that can provide largescale scale-up of parallel jobs without a client having to manage its own compute instances or virtual machines to perform such work.

A determination may be made that an operation is to be performed. In an example, a request may be received to perform the operation, such as an integrity check operation received as part of an integrity checking policy and schedule indicating that an integrity check of the one or more objects 1714 is to be performed. In another example, an event may trigger the performance of the operation, such as where the object store 1712 experiences an operational issue or another object is identified as being corrupt, and thus the one or more objects 1714 may also be corrupt.

In response to the determination that the operation is to be executed for the snapshot, a number of serverless threads to create on-demand for processing the operation for the snapshot may be determined, during operation 1604 of method 1600 of FIG. 16. The determination may be made based upon an amount of work involved with performing the operation, a number of tasks/jobs into which the operation can be divided, a number of different portions/branches of the snapshot file system structure that can be processed in parallel, etc.

During operation 1606 of method 1600 of FIG. 16, the number of serverless threads are created on-demand for execution through the serverless thread architecture 1704. For example, a first serverless thread 1706, a second serverless thread 1708, and/or any other number of serverless threads such as an nth serverless thread 1710 (e.g., hundreds of thousands to millions of serverless threads, or any other number of serverless threads) may be created on-demand for execution through the serverless thread architecture 1704. The serverless thread architecture 1704 may manage the serverless threads so that clients do not have to manage their own compute instances or virtual machines for performing the operation.

In an embodiment, the on-demand creation of the serverless threads (or the creation of containers that are to host instances of a data connector component for performing the operation) may be triggered based upon various events. In an example, the creation of the serverless threads may be triggered to perform an integrity check upon an object based upon an event corresponding to a failure associated with the object store 1712. The object may be identified for integrity checking based upon the object having a probability of being corrupt above a threshold probability based upon the failure of the object store 1712 (e.g., the failure may occur while the object was being accessed such as by being written to by a write operation that may not have successfully completed). In another example, the creation of the serverless threads may be triggered to perform an integrity check upon a first object based upon an event corresponding to a determination that a second object was identified as being corrupt. The first object may be identified for the integrity check based upon the first object having a probability of being corrupt above a threshold probability based upon the second object being corrupt (e.g., the first object may correspond to an incremental snapshot that may share snapshot data with the second object that is corrupt).

During operation 1608 of method 1600 of FIG. 16, different portions/branches of the snapshot file system tree structure may be independently processed using different serverless threads for parallel execution of the operation by the serverless threads upon the one or more objects 1714 comprising the snapshot data of the snapshot upon which the operation is to be performed. For example, the first serverless thread 1706 may process 1716 a first portion/branch of the snapshot file system tree structure, such as first snapshot data of the snapshot represented by the first portion of the snapshot file system tree structure. The second serverless thread 1708 may process 1718 a second portion/branch of the snapshot file system tree structure, such as second snapshot data of the snapshot represented by the second portion of the snapshot file system tree structure. The nth serverless thread 1710 may process 1720 an nth portion/branch of the snapshot file system tree structure, such as nth snapshot data of the snapshot represented by the nth portion of the snapshot file system tree structure. In this way, work associated with executing the operation may be broken down into jobs that can be performed on-demand on a largescale by any number of serverless threads processing different portions of an object (e.g., different branches of the snapshot file system tree structure). This greatly reduces the time to perform operations, thus enabling large scale-out of massively parallel jobs.

These serverless threads may perform a variety of operations, such as integrity checking, cataloging snapshots stored within objects in the object store 1712, etc. Once the operation is complete and/or there is lower demand/load, one or more of the serverless threads may be deconstructed to reduce overhead and/or cost otherwise incurred by maintaining the containers (e.g., once a serverless thread completes tasks assigned to the serverless thread, then the serverless tread can be terminated).

Figure 18:
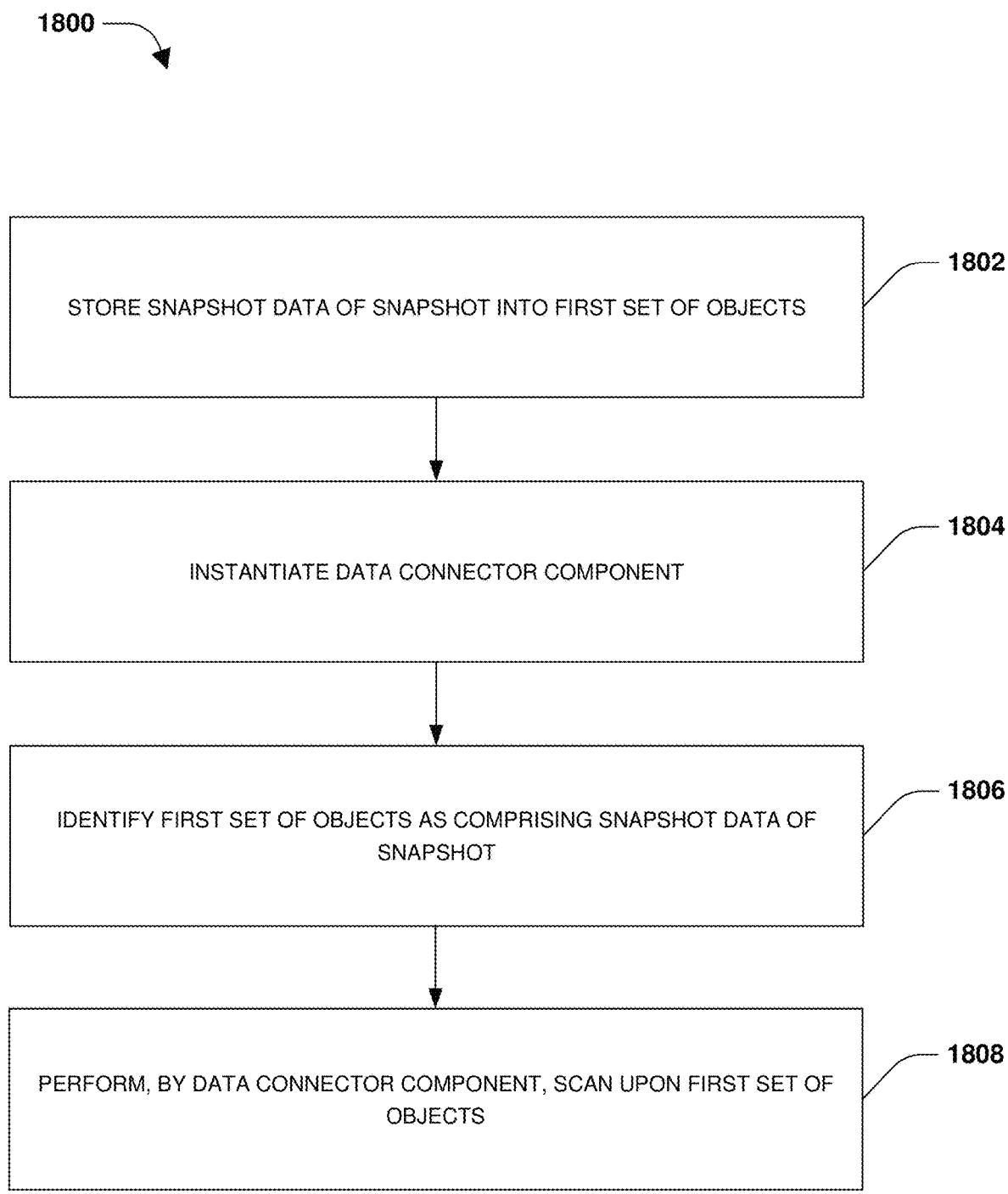
FIG. 18 is a flow chart illustrating an example method for scanning an object.
Figure 19A:
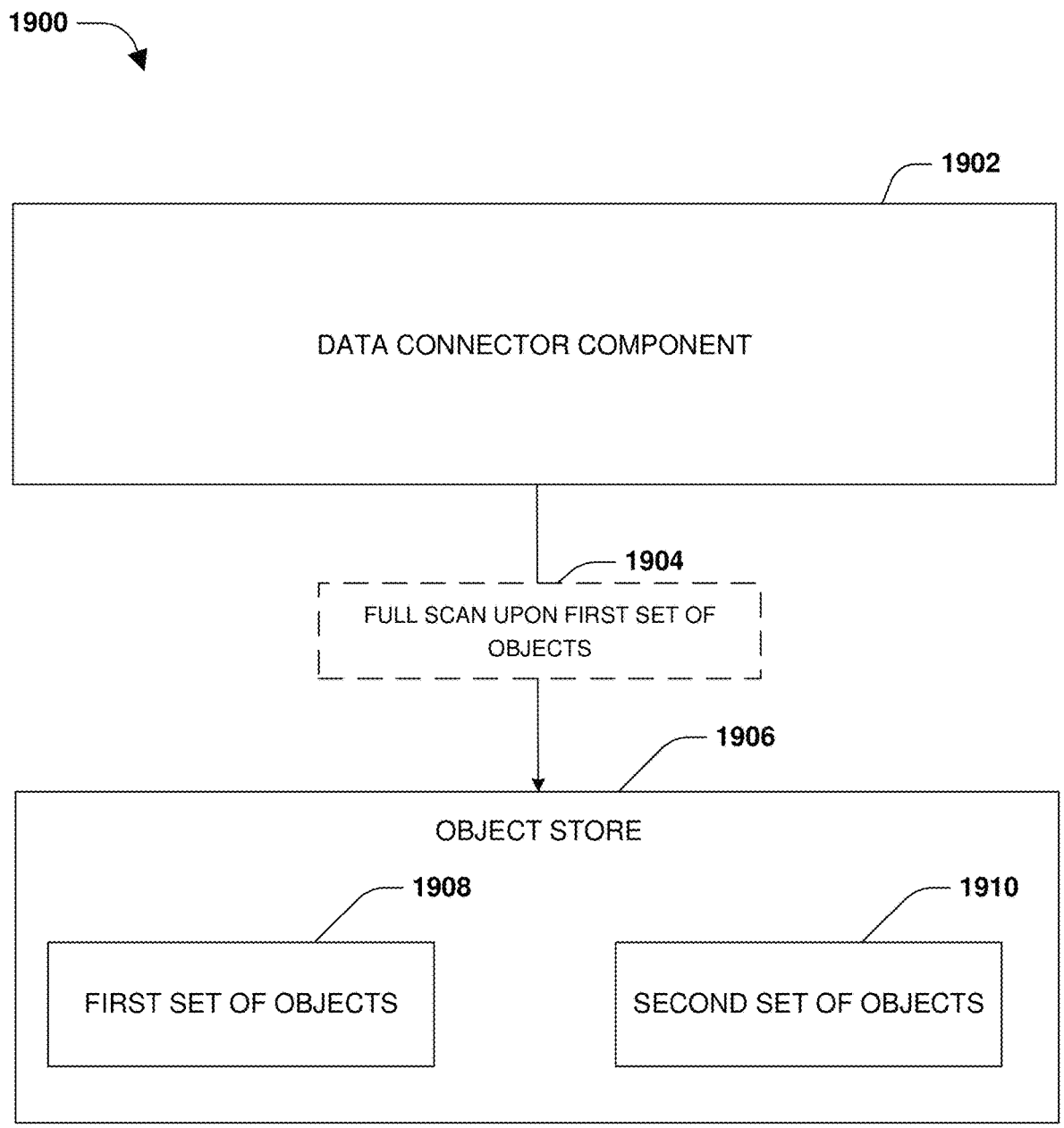
FIG. 19A is a component block diagram illustrating an example system for scanning an object.
Figure 19B:
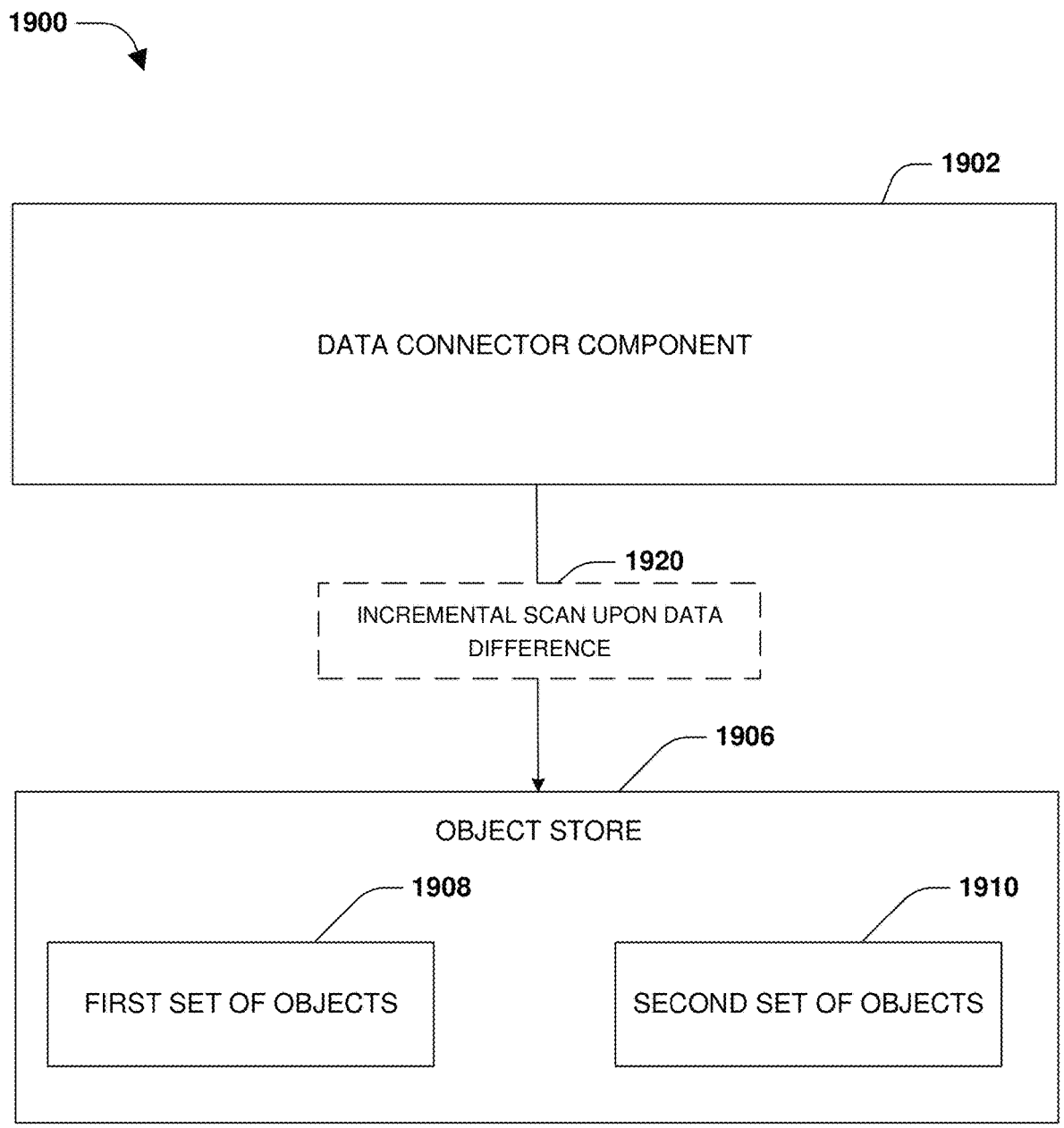
FIG. 19B is a component block diagram illustrating an example system for scanning an object.

One embodiment of scanning objects is illustrated by an exemplary method 1800 of FIG. 18 and further described in conjunction with system 1900 of FIGS. 19A and 19B. During operation 1802 of method 1800 of FIG. 18, snapshot data of a snapshot may be stored into a first set of objects 1908 in an object store 1906 according to an object format, such as the object format described in relation to object 508 of FIG. 5C. For example, the snapshot may be represented as the object format where the snapshot data is structured according to a snapshot file system tree structure, such as the data structures 524 of FIG. 5B. The snapshot file system tree structure may comprise a root node, intermediate nodes, and leaf nodes. Snapshot data may be stored within the leaf nodes at a bottom level of the snapshot file system tree structure. The intermediate nodes may be located within one or more intermediate levels of the snapshot file system tree structure, and may comprise references or pointers to nodes within lower levels. In this way, the snapshot file system tree structure may form a tree structure of nodes that may be traversed from the root node, down through the intermediate nodes, to the leaf nodes for locating and accessing snapshot data.

A bitmap may be maintained for the snapshot. The bitmap may comprise bits that are set to values to indicate whether objects within the object store 1906 comprise the snapshot data of the snapshot. For example, bits associated with the first set of objects 1908 may be set to a value indicating that the first set of objects 1908 comprise the snapshot data of the snapshot. Bit associated with other objects may be set to a different value to indicate that those other objects do not comprise snapshot data of the snapshot.

During operation 1804 of method 1800 of FIG. 18, a data connector component 1902 may be instantiated to perform a scan operation for the snapshot. It may be appreciated that any number of data connector components may be instantiated for parallel processing of the scan operation, such as where each data connector component processes a different portion/branch of an object. In an example, the data connector component 1902 and/or any other data connector components instantiated to perform the scan operation may be instantiated through containers or functionality of the data connector component 1902 may be executed by one or more serverless threads. In an example, the scan operation may correspond to a full scan 1904 of the snapshot (e.g., a full integrity check scan), such that the data connector component 1902 and/or any other data connector components instantiated to perform the scan operation process the first set of objects 1908.

During operation 1806 of method 1800 of FIG. 18, the first set of objects 1908 may be identified as comprising the snapshot data of the snapshot upon which the full scan 1904 is to be performed. In an example, the bitmap may be evaluated to identify bits, associated with objects, which are set to a value indicating that the objects such as the first set of objects 1908 comprise the snapshot data of the snapshot. During operation 1808 of method 1800 of FIG. 18, the data connector component 1902 and/or any other data connector components instantiated to perform the scan operation may perform the full scan 1904 upon the first set of objects 1908 to implement the scan operation for the snapshot, as illustrated by FIG. 19A. In an example, the full scan 1904 corresponds to an integrity check to identify any data corruption or other issues with respect to the snapshot, snapshot data, and/or first set of objects 1908.

In an embodiment, an incremental snapshot may be created to capture differences (a data difference) of a file system or volume at a point in time when the incremental snapshot is created and a prior point in time when a prior snapshot of the file system or volume (e.g., the snapshot whose snapshot data was stored within the first set of objects 1908 within the object store 1906) was created. Incremental data of the incremental snapshot (e.g., the data difference corresponding to the differences of the file system or volume) may be stored within a second set of objects 1910 within the object store 1906.

The data connector component 1902 may perform an incremental scan 1920 for the incremental snapshot, as illustrated by FIG. 19B. The incremental scan 1920 corresponds to the data difference between the snapshot data of the snapshot within the first set of objects 1908 and the incremental snapshot data of the incremental snapshot within the second set of objects 1910. A difference operation may be performed to identify the data difference to scan by the incremental scan 1920. The difference operation may traverse a snapshot file system tree structure of the snapshot and a file system tree structure of the incremental snapshot to identify differences between the snapshot file system tree structures as the data difference. The incremental scan 1920 skips common snapshot data that is common to both the snapshot and the incremental snapshot, and thus the incremental scan 1920 is efficient and may be performed quickly compared to the full scan 1904. For example, an integrity check performed by the incremental scan 1920 may skip over the common snapshot data (e.g., snapshot data of the first set of objects 1908) that may have been previously scanned by a prior integrity scan (e.g., the full scan 1904) and merely scan the data difference (e.g., snapshot data of the second set of objects 1910).

Figure 20:
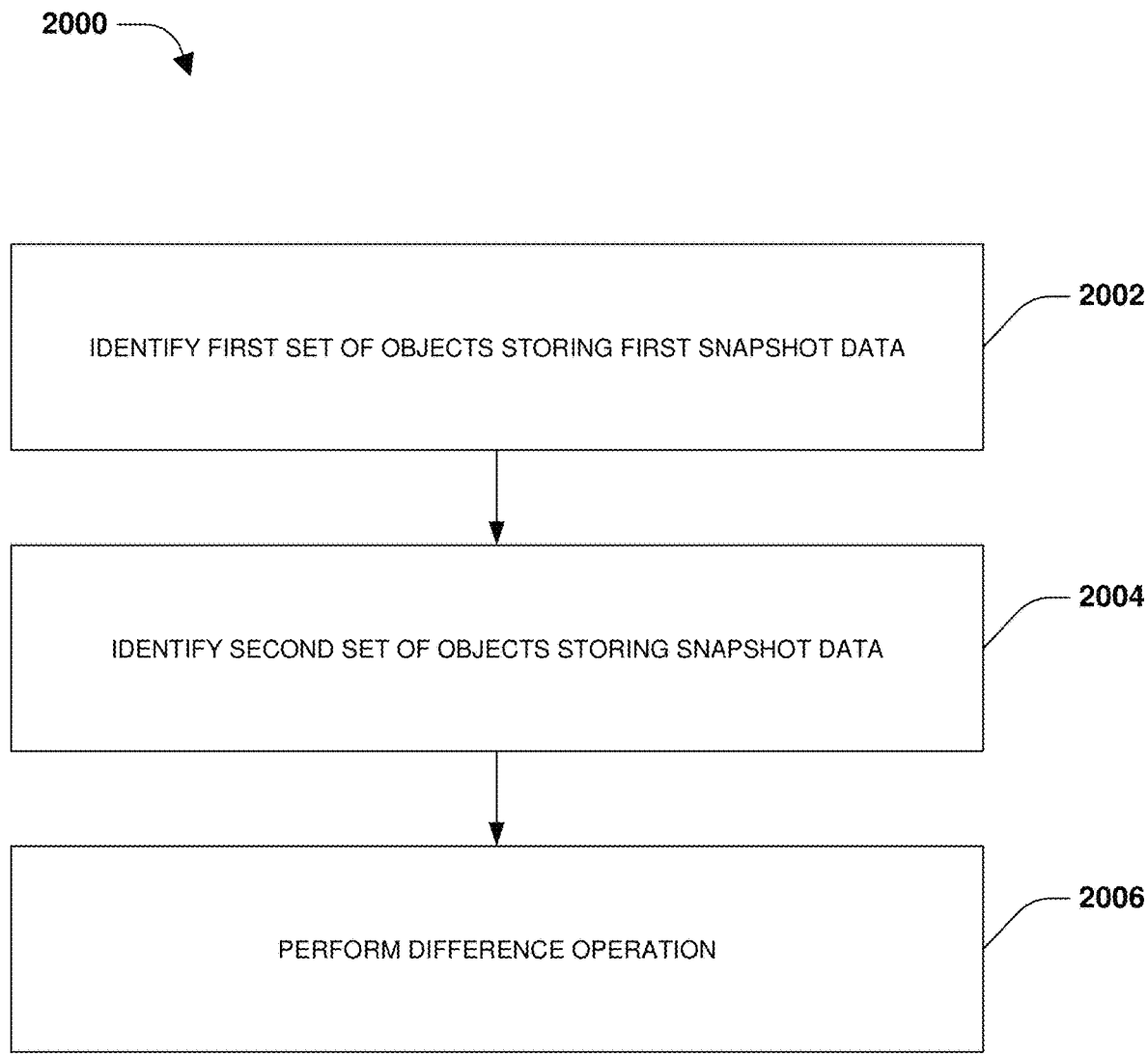
FIG. 20 is a flow chart illustrating an example method for performing a data difference operation.

One embodiment of performing a difference operation is illustrated by an exemplary method 2000 of FIG. 20. During operation 2002 of method 2000 of FIG. 20, a first set of objects storing first snapshot data of a first snapshot may be identified, such as by a data connector component. The first set of objects may store the first snapshot data according to an object format where the first snapshot data is structured according to a first snapshot file system tree structure. During operation 2004 of method 2000 of FIG. 20, a second set of objects storing second snapshot data of a second snapshot may be identified, such as by the data connector component. The second set of objects may store the second snapshot data according to the object format where the second snapshot data is structured according to a second snapshot file system tree structure.

During operation 2006 of method 2000 of FIG. 20, a difference operation is performed by the data connector component instantiated within a container. The data connector component may perform the difference operation to traverse the first snapshot file system tree structure and the second snapshot file system tree structure to identify a data difference between the first snapshot and the second snapshot. In an embodiment, the difference operation is performed in a forward time manner where the data difference corresponds to new data not included within the first snapshot created prior to the second snapshot. In an embodiment, the difference operation is performed in a reverse time manner where the data difference corresponds to old data not included within the second snapshot created subsequent to the first snapshot.

The difference operation may be performed to identify branches within the second snapshot file system tree structure that have not been modified in relation to the first snapshot file system tree structure. For example, a branch of the second snapshot file system tree structure may be identified as corresponding to snapshot data of the second snapshot that has not been modified since the first snapshot (e.g., data common to the first snapshot and the second snapshot) based upon a root node of the branch indicating that no modifications have occurred to the branch. Thus, the snapshot data of the branch is not part of the data difference. If a root node of a second branch indicates that the second branch has been modified, then snapshot data of the second branch may be identified as part of the data difference.

In an embodiment, an incremental scan may be performed by the data connector component to process the data difference between the first snapshot and the second snapshot. The incremental scan may skip data that is common to the both the first snapshot and the second snapshot. For example, the incremental scan may skip the snapshot data of the branch identified as not being modified. In an example, the incremental scan performs an integrity check for the data difference between the first snapshot and the second snapshot, and skips data common between the snapshots that may have been previously scanned during a prior integrity check in relation to the first snapshot.

Figure 21:
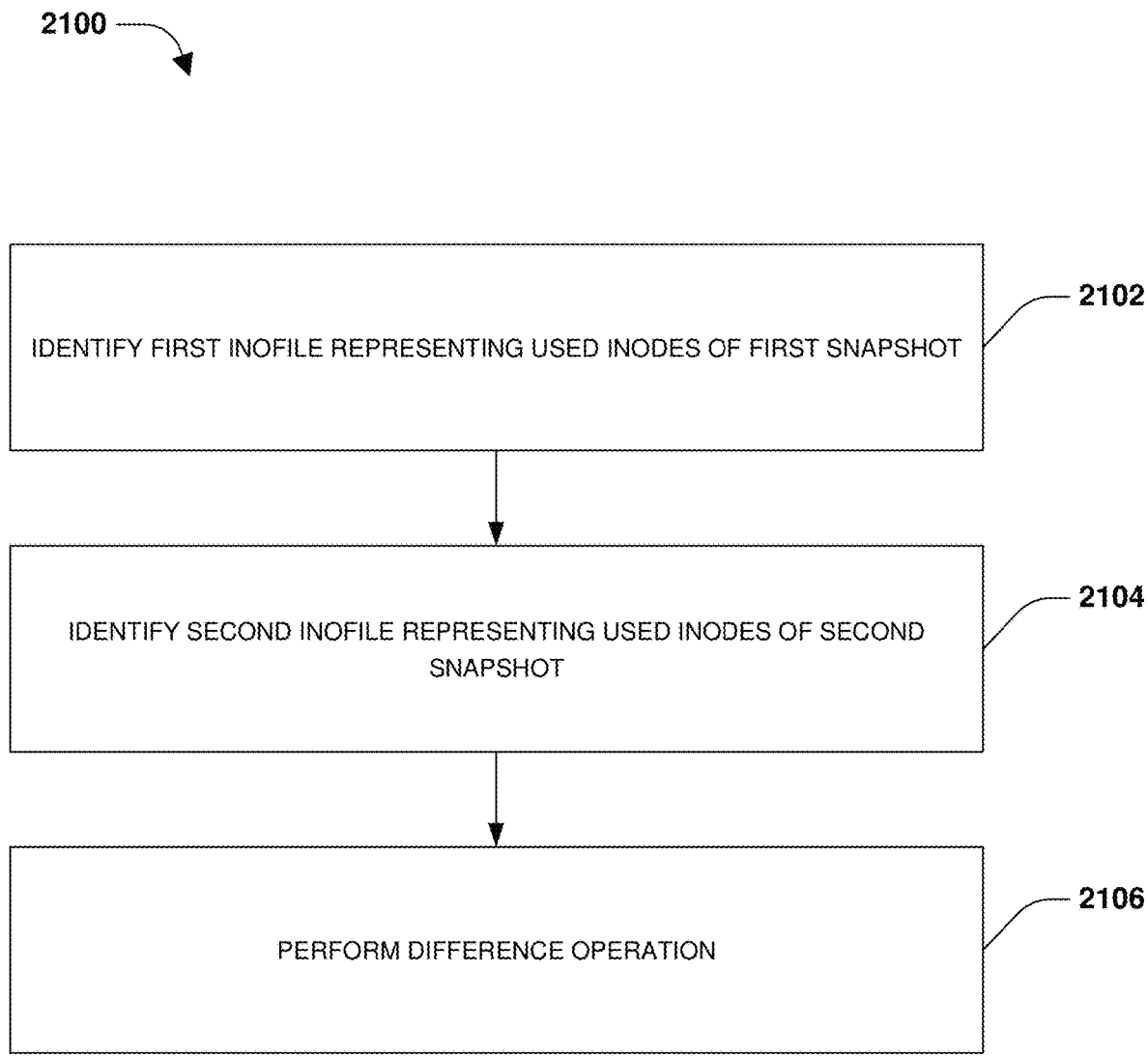
FIG. 21 is a flow chart illustrating an example method for performing a data difference operation.

One embodiment of performing a difference operation is illustrated by an exemplary method 2100 of FIG. 21. A first set of objects storing first snapshot data of a first snapshot may be stored within an object store. The first set of objects may store the first snapshot data according to an object format where the first snapshot data is structured according to a first snapshot file system tree structure. A first inofile (e.g., the inofile 518 of FIG. 5B) may represent used inodes of the first snapshot (e.g., inodes associated with the first snapshot data of the first snapshot). A second set of objects storing second snapshot data of a second snapshot may be stored within the object store. The second set of objects may store the second snapshot data according to the object format where the second snapshot data is structured according to a second snapshot file system tree structure. A second inofile (e.g., the inofile 518 of FIG. 5B) may represent used inodes of the second snapshot (e.g., inodes associated with the second snapshot data of the second snapshot).

During operation 2102 of method 2100 of FIG. 21, the first inofile is identified as representing the used inodes of the first snapshot comprising the first snapshot data stored within the first set of objects according to the object format where the first snapshot data is structured according to the first snapshot file system tree structure. During operation 2104 of method 2100 of FIG. 21, the second inofile is identified as representing the used inodes of the second snapshot comprising the second snapshot data stored within the second set of objects according to the object format where the second snapshot data is structured according to the second snapshot file system tree structure.

During operation 2106 of method 2100 of FIG. 21, a difference operation may be performed by a data connector component instantiated within a container. The difference operation may be performed upon the first inofile and the second inofile to obtain a list of modified inodes corresponding to a data difference between the first snapshot and the second snapshot. A full path of modified files corresponding to the list of modified inodes may be built. The full path may be used to identify and access the files, corresponding to a snapshot data difference between the first snapshot and the second snapshot (e.g., files modified between a point in time when the first snapshot was created and a subsequent point in time when the second snapshot was created), within one or more objects stored within the object store. In an example, the full path may comprise one or more hard links used to access modified data (the snapshot data difference).

The difference operation may be executed to perform various functions, which may for example, operate upon snapshot data differences between to snapshots whose data is stored within objects in the object store. For example, the difference operation may be implemented to manage a catalog of snapshots stored as objects within the object store. In another example, the difference operation may be implemented to perform a delete file operation, an add file operation, a modify file operation, a move file operation, or perform an integrity check operation.

Figure 22:
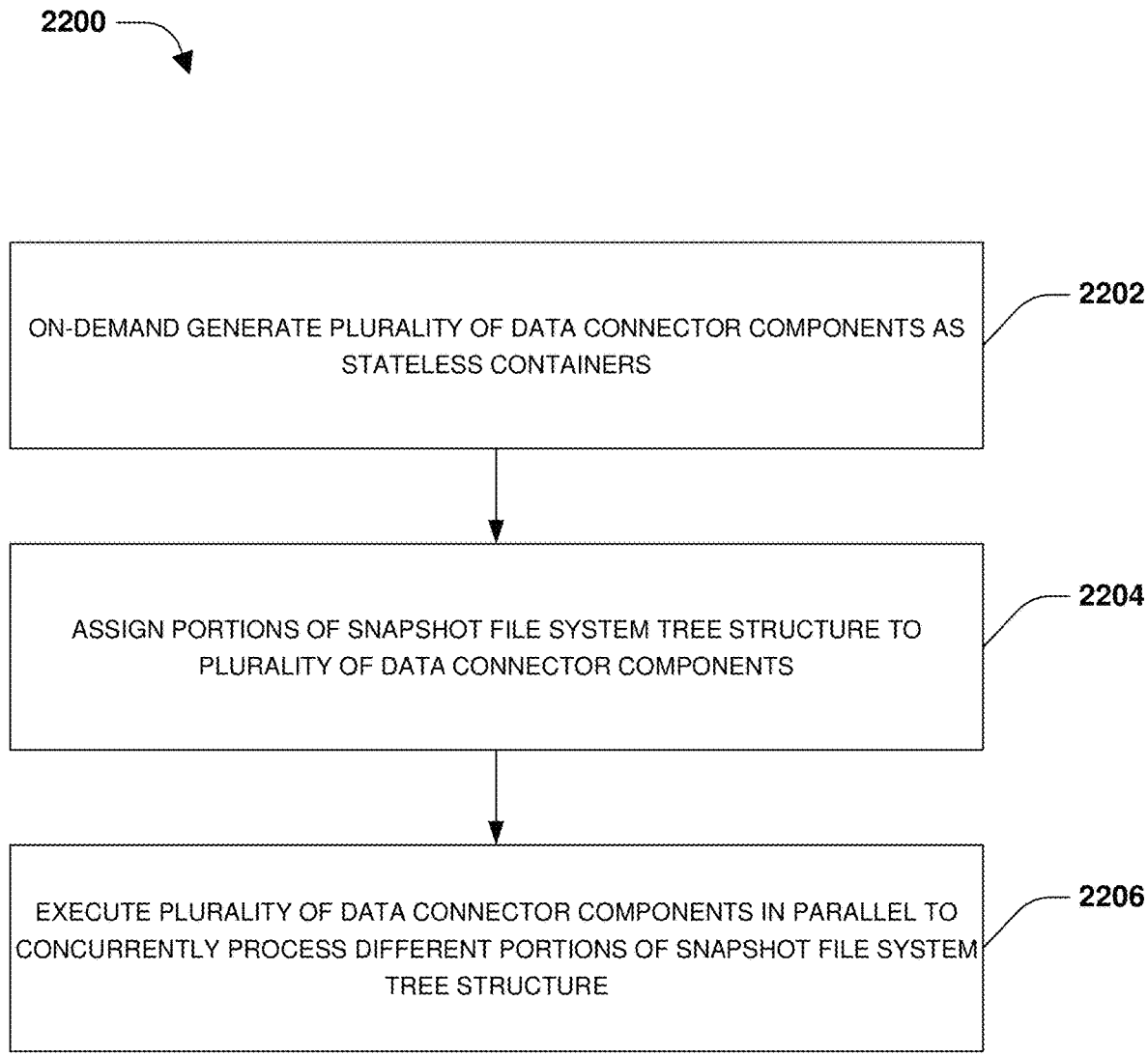
FIG. 22 is a flow chart illustrating an example method for on-demand generation of data connector components as stateless containers.
Figure 23:
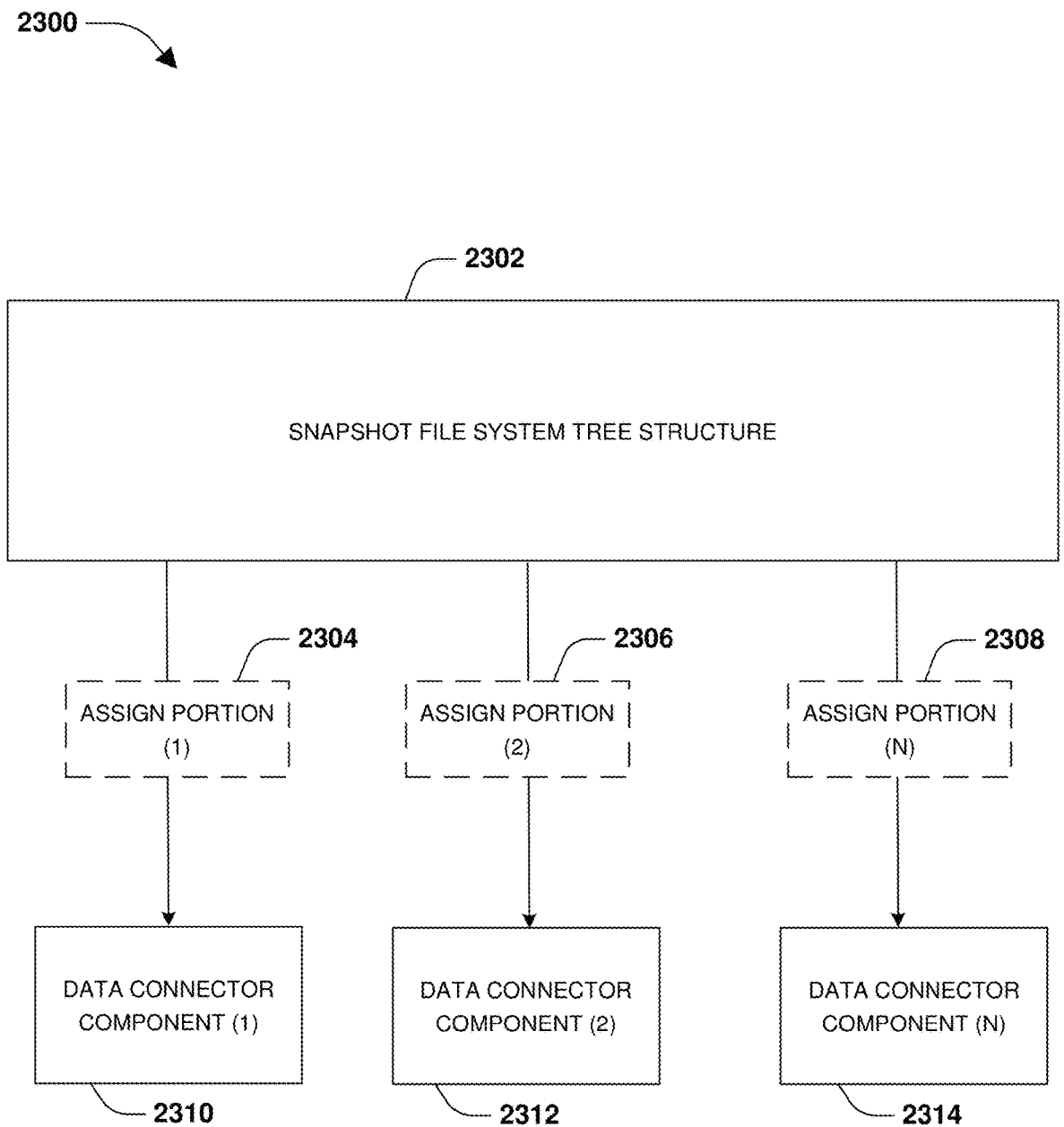
FIG. 23 is a component block diagram illustrating an example system for on-demand generation of data connector components as stateless containers.

One embodiment of on-demand generation of data connector components as stateless containers is illustrated by an exemplary method 2200 of FIG. 22 and further described in conjunction with system 2300 of FIG. 23. Snapshots may be created as point in time representations of volumes, file systems, or other storage structures. The snapshots may comprise snapshot data of files, directories, and/or metadata of the volumes, file systems, or other storage structures. In an example, a snapshot may be created using snapshot functionality of a storage operating system of a node used to store data of a client. An object store, such as a cloud computing environment, may provide relatively more cost effective and scalable storage compared to the node. Thus, it may be beneficial to store the snapshot data of the snapshots into one or more object store, such as object store.

Snapshot data of a snapshot may be stored into one or more objects according to an object format, such as the object format described in relation to object 508 of FIG. 5C. For example, the snapshot may be represented as the object format where the snapshot data is structured according to a snapshot file system tree structure 2302, such as the data structures 524 of FIG. 5B. The snapshot file system tree structure 2302 may comprise a root node, intermediate nodes, and leaf nodes. Snapshot data may be stored within the leaf nodes at a bottom level of the snapshot file system tree structure 2302. The intermediate nodes may be located within one or more intermediate levels of the snapshot file system tree structure 2302, and may comprise references or pointers to nodes within lower levels. In this way, the snapshot file system tree structure 2302 may form a tree structure of nodes that may be traversed from the root node, down through the intermediate nodes, to the leaf nodes for locating and accessing snapshot data.

The snapshot file system tree structure 2302 of a snapshot may comprise branches that may be separately processed by different containers and/or serverless threads in parallel without the need for locking an entire object or objects comprising snapshot data of a snapshot because the different branches will each correspond to different snapshot data that does not overlap. The ability to separately process different branches allows for parallel processing of an object by any number of data container component instances hosted within containers. In this way, the work of performing an operation such as performing integrity checking for the objects within the object store can be broken up and performed in parallel to traverse through the different branches of the snapshot file system tree structure 2302 for processing the different branches in parallel. This greatly reduces the time to perform operations, such as integrity checking for snapshots, snapshot data, and objects.

A determination may be made that an operation for the snapshot is to be performed. During operation 2202 of method 2200 of FIG. 22, a plurality of data connector components are generated on-demand as stateless containers. For example, a first data connector component 2310 is generated within a first stateless container, a second data connector component 2312 is generated within a second stateless container, and/or any other number of data connector components may be generated within stateless containers such as an nth data connector component 2314 that is generated within an nth stateless container. The data connector components are stateless such that the stateless containers and the data connector components hosted therein can be offlined, upgraded, onlined, created/instantiated, and/or have work transferred between stateless containers in a stateless manner on-demand where there is no need to track, save, and/or restore the state of a stateless container. For example, work being performed by one stateless container can be directly transferred to another stateless container without having to save and transfer the state of the one stateless container to the other stateless container. In an example, a data connector component may be instantiated through a container as a stateless image, such that requests are to comprise state information corresponding to an identifier of a snapshot, an identifier of a storage structure storing an object comprising snapshot data of the snapshot (e.g., a bucket comprising the object), and/or credentials to access the object.

During operation 2204 of method 2200 of FIG. 22, portions of the snapshot file system tree structure 2302 may be assigned to the plurality of data connector components in a manner that allows for parallel processing of the portions of the snapshot file system tree structure 2302. The portions of the snapshot file system tree structure 2302 may be processed in parallel without having to lock the object within which snapshot data representing by the portions of the snapshot file system tree structure 2302 is stored. This is because the portions represent different non-overlapping portions of the snapshot file system tree structure 2302. Otherwise, if the object was locked by a data connector component, then merely that data connector component could access the object such as write to the object because other data connector components may be locked out from accessing the object. In an example, a first portion 2304 of the snapshot file system tree structure 2302 may be assigned to the first data connector component 2310 to process. A second portion 2306 of the snapshot file system tree structure 2302 may be assigned to the second data connector component 2312 to process. An nth portion 2308 of the snapshot file system tree structure 2302 may be assigned to the nth data connector component 2314 to process.

Depending on the type of operation to be performed and/or other factors (e.g., a number of portions into which the snapshot file system tree structure 2302 can be split for separate parallel processing by different data connector components), certain resources may be allocated for the data connector components. These factors may also be used to determine how many data connector components to generate on-demand. In an embodiment, a wrapper controller may be implemented (e.g., at a client device) to preprocess operations to be executed by data connector components upon objects within the object store. For example, the wrapper controller may determine that the operation is to be performed for the snapshot. The wrapper controller may determine an amount of resources to assign to an instance of a data connector component for processing the operation. For example, if the operation is a metadata operation such as an operation to browse snapshots, delete a snapshot, or other metadata specific operation, then a first resource allocation may be determined by the wrapper controller as the amount of resources to allocate. The first resource allocation may correspond to a relatively smaller memory allocation because little to no caching may be used to process the metadata operation. If the operation is a data operation, then a second resource allocation may be determined by the wrapper controller as the amount of resources to allocate. The second resource allocation may correspond to a relatively larger memory allocation compared to the first resource allocation because caching may be used for efficient resource allocation when processing the data operation. In this way, the wrapper controller may modify a request, from the client device to perform the operation, to include the amount of resources to allocate to the data connector component.

During operation 2206 of method 2200 of FIG. 22, the plurality of data connector components are executed in parallel to concurrently process the different portions of the snapshot file system tree structure 2302. For example, the first data connector component 2310 may process the first portion 2304 of the snapshot file system tree structure 2302 in parallel with the second data connector component 2312 processing the second portion 2306 of the snapshot file system tree structure 2302. Even if the different portions of the snapshot file system tree structure 2302 correspond to a same object, the different portions can be processed in parallel while the object is in a non-locked state to allow for multiple data connector components to read and/or write to the object because the object is not locked. This is enabled because the object format uses the snapshot file system tree structure 2302 to represent different snapshot data through different branches of the snapshot file system tree structure 2302 so that each branch (portion) corresponds to non-overlapping snapshot data that can be independently processed in parallel.

If a data connector component is to read data from an object within the object store as part of processing a portion of the snapshot file system tree structure 2302, the data connector component may perform a read-ahead to read additional data from the object that is predicted to have a threshold likelihood of being processed by the data connector component. Because the object store may charge more to retrieve the same amount of data but through multiple access operations, it may be cost effective to use less access operations to retrieve the same amount of data. The data connector component may also pre-fetch data from the object based upon the data being predicted to have a threshold likelihood of being processed by the data connector component. Thus, the data is readily available for processing on-demand without having to wait to retrieve the data from the data store, thus reducing latency and processing time.

A processing time of the data connector components processing the operation may be tracked. A determination may be made that the processing time of the operation exceeds a threshold amount of time. Accordingly, one or more additional data connector components may be instantiated as new stateless containers for processing the object in parallel with respect to the plurality of already instantiated data connector components. In this way, additional data connector components can be generated on-demand on an as needed basis during execution of an operation in order to more quickly complete execution of the operation. If processing by one of the already instantiated data connector components is taking too long because that already instantiated data connector component is overloaded, then a stateless transfer of work from that already instantiated data connector component to another data connector component (e.g., one of the new additional data connector components) may be performed for execution of the work by this other data connector component. That stateless transfer of the work can be performed because the data connector components are generated as stateless containers where state information does not need to be tracked, saved, or restored.

Demand and load for processing objects within the object store may be monitored. A determination may be made that demand/load for processing objects is below a threshold. Accordingly, one or more of the data connector components and stateless containers hosting the data connector components may be deconstructed to save resources and cost otherwise associated with hosting the stateless containers and data connector components.

Because data connector components are hosted through stateless containers, various management functionality may be implement for the stateless containers and/or data connector components in a stateless manner without having to track, save, and/or restore state information. For example, a stateless container may be offlined, upgraded, and/or onlined to resume processing in a stateless manner. Also, work may be transferred between stateless containers and data connector components hosted within the stateless containers in a stateless manner.

Figure 24:
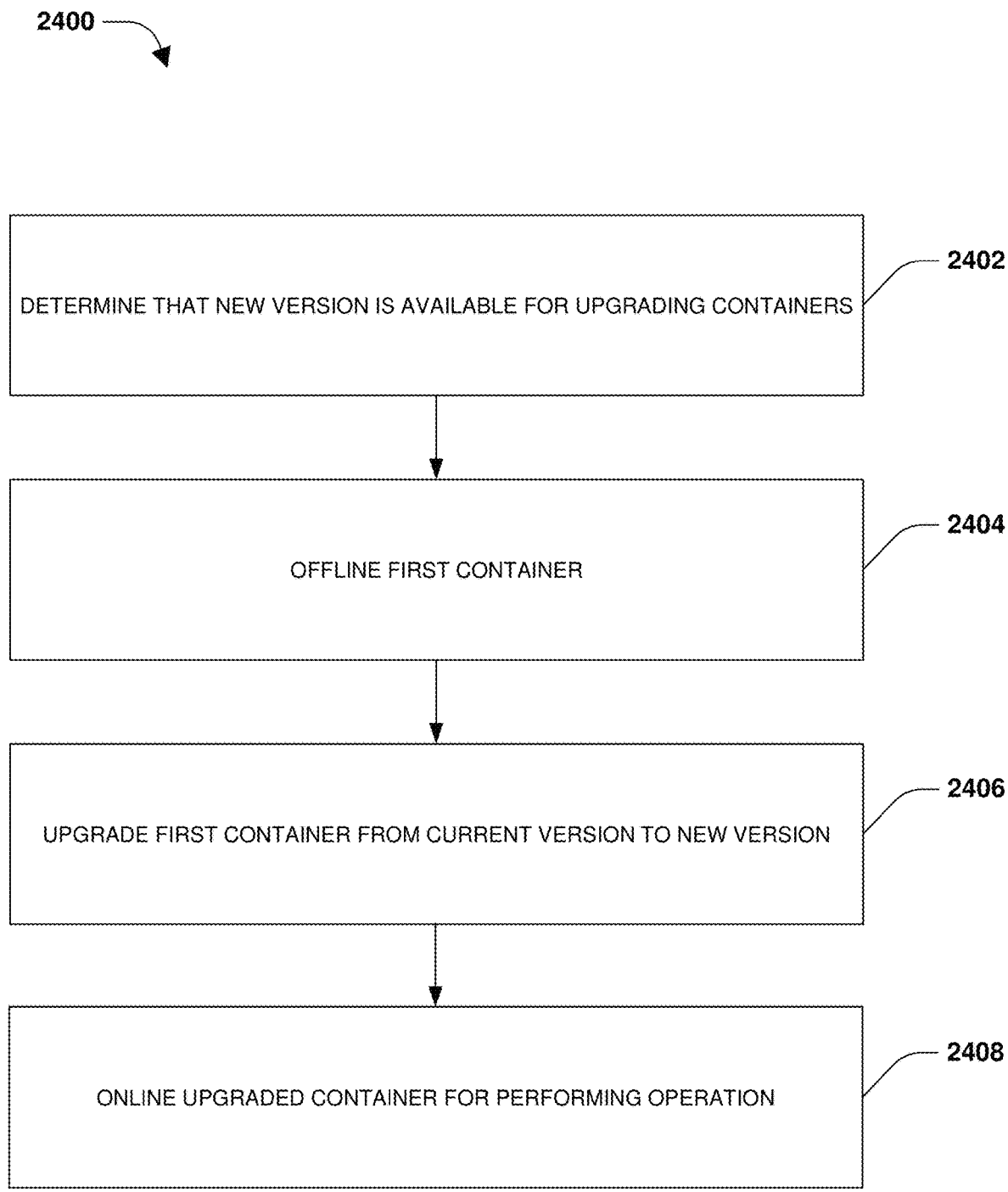
FIG. 24 is a flow chart illustrating an example method for upgrading a container.

One embodiment of upgrading stateless containers is illustrated by an exemplary method 2400 of FIG. 24. Data connector components may be instantiated through containers, such as stateless containers, for performing operations associated with snapshots whose data is stored within objects within an object store according to an object format. During operation 2402 of method 2400 of FIG. 24, a determination may be made that a new version of a container is available for upgrading containers used to host instances of data connector components configured to interpret the object format of the objects used to store the snapshot data of snapshots represented by a snapshot file system tree structure. The new version may add function, change existing functionality, or remove functionality implemented by the data connector components through the containers.

During operation 2404 of method 2400 of FIG. 24, a first container may be offlined. The first container may be offlined in a stateless manner without having to track, save, or restore a state of the first container. During operation 2406 of method 2400 of FIG. 24, the first container is upgraded from a current version to the new version as an upgraded container. The first container may be upgraded in a stateless manner. During operation 2408 of method 2400 of FIG. 24, the upgraded container may be onlined for resuming operation. The upgraded container may be onlined in a stateless manner without having to restore a state to the upgraded container. In an example, the upgraded container is onlined to resume performance of an operation that the container was performing before being upgraded. In an example, before the first container is upgraded, any processing of the operation that is to be performed the first container may be transferred in a stateless manner to a different container and data connector component for processing while the first container is being upgraded. Once the first container is upgraded, the processing of the operation may be transferred back to the upgraded container.

In an embodiment, in response to onlining the upgraded container, work associated with an operation to be executed by a second container may be transferred to the upgraded container in a stateless manner without having to transfer state information from the second container to the upgraded container. The second container may be offlined and upgraded from a current version to the new version as an upgraded second container. In this way, some containers may be upgraded while other containers continue processing operations for non-disruptive upgrade of containers.

In an embodiment, data connector components may be upgraded in a stateless manner. A data connector component within a stateless container may be offlined in a stateless manner. The data connector component may be upgraded from a first version (current version) to a second version (new version) as an upgraded data connector component in a stateless manner. The upgraded data connector component may be onlined in a stateless manner, such as by being instantiated within a stateless container without having to restore a state of the upgraded data connector component.

Figure 25:
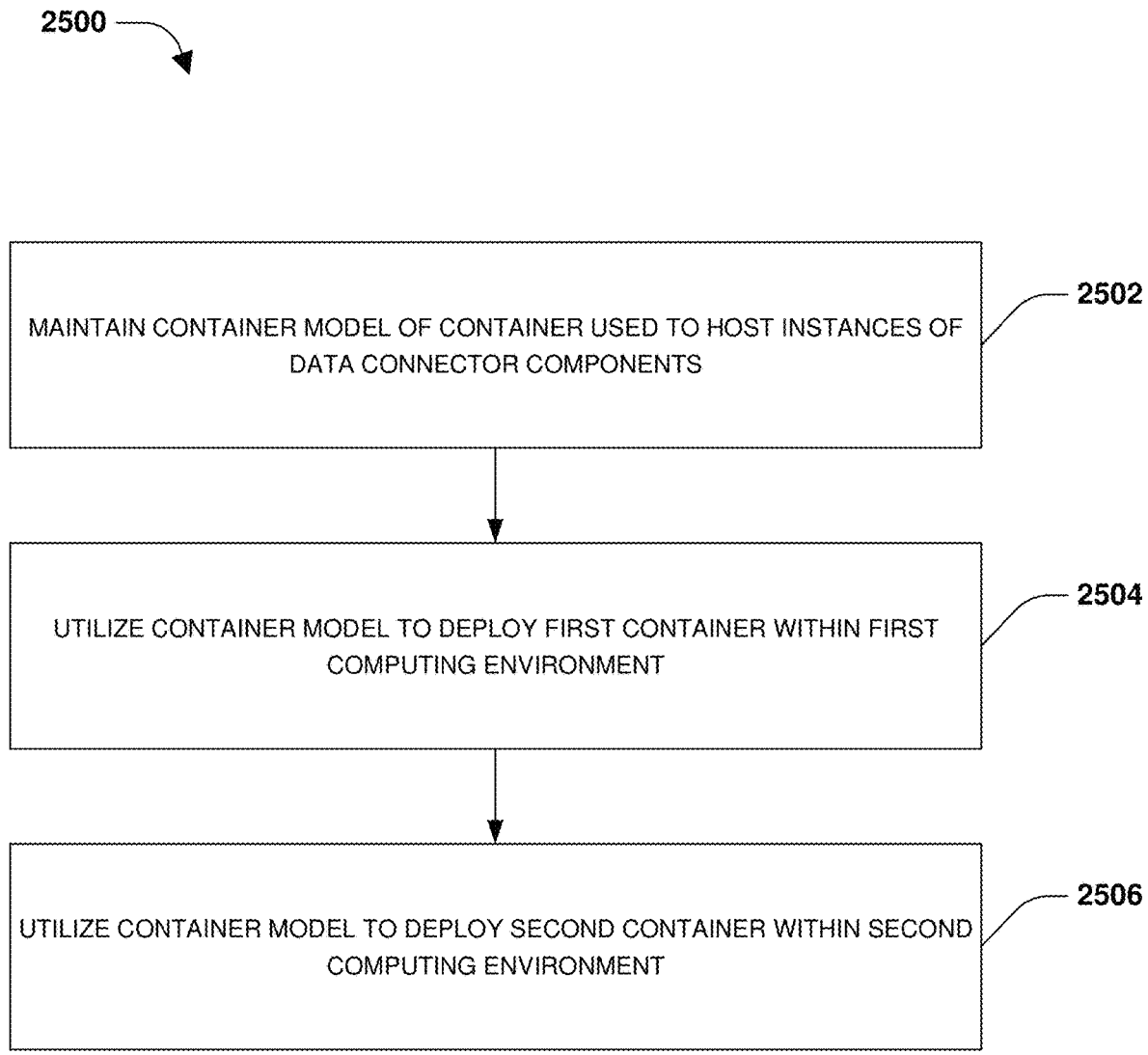
FIG. 25 is a flow chart illustrating an example method for utilizing a model to deploy containers to different computing environments.

One embodiment of deploying containers is illustrated by an exemplary method 2500 of FIG. 25. A container model may be generated for deploying containers such as stateless containers that can be easily integrated into any type of orchestrator and computing environment, such as into an elastic compute cloud virtual machine (e.g., EC2 VM), a kubernetes cluster (e.g., K8), a short lived software instance hosting environment, etc. During operation 2502 of method 2500 of FIG. 25, the container model of containers may be maintained for use in hosting instances of a data connector component within containers for interpreting an object format of objects used to store snapshot data of snapshot according to a snapshot file system tree structure. During operation 2504 of method 2500 of FIG. 25, the container model is utilized to deploy a first container to host the data connector component within a first computing environment. During operation 2506 of method 2500 of FIG. 25, the container model is utilized to deploy a second container to host the data connector component within a second computing environment different than the first computing environment.

Figure 26:
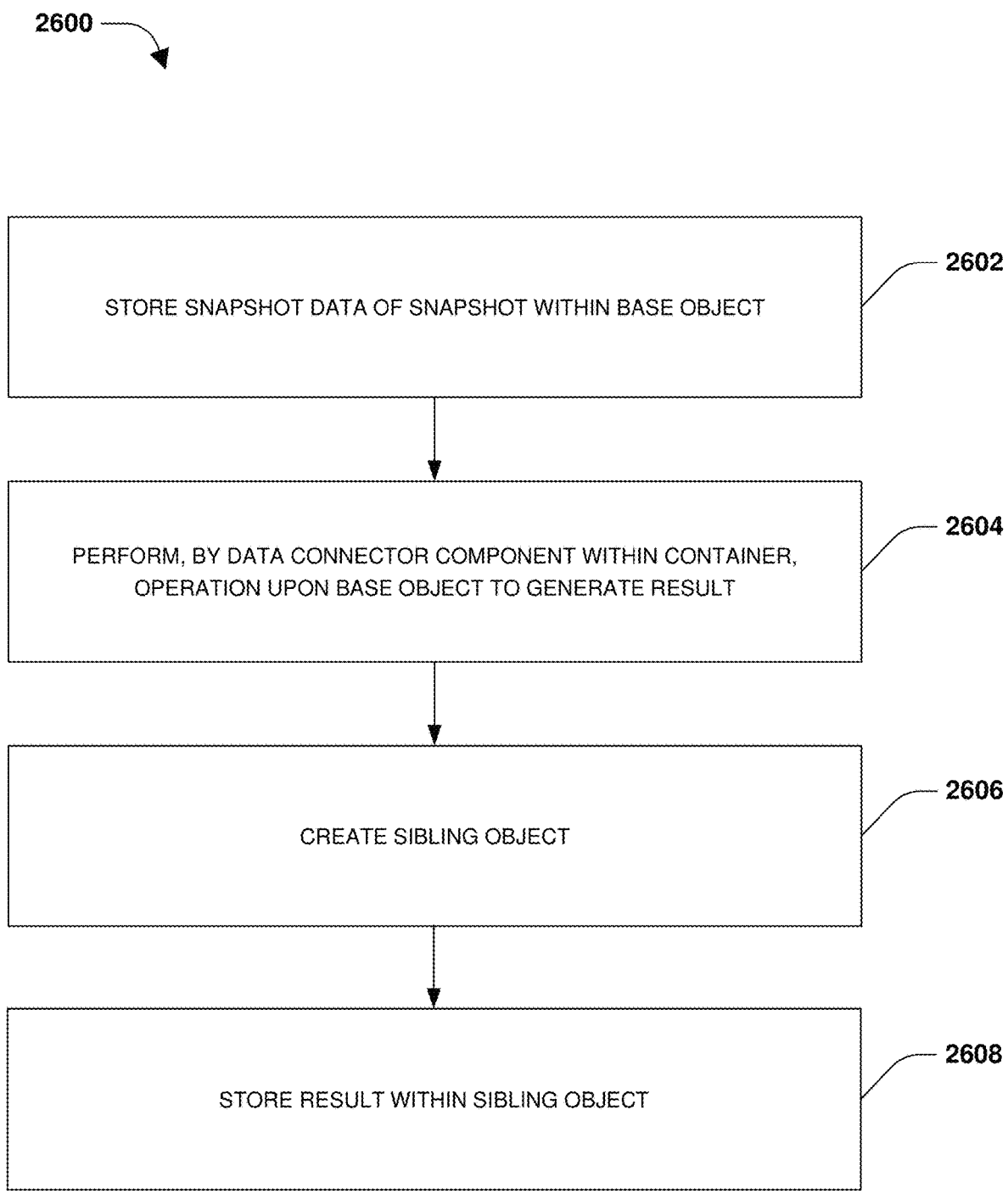
FIG. 26 is a flow chart illustrating an example method for storing results of an operation within a sibling object.
Figure 27:
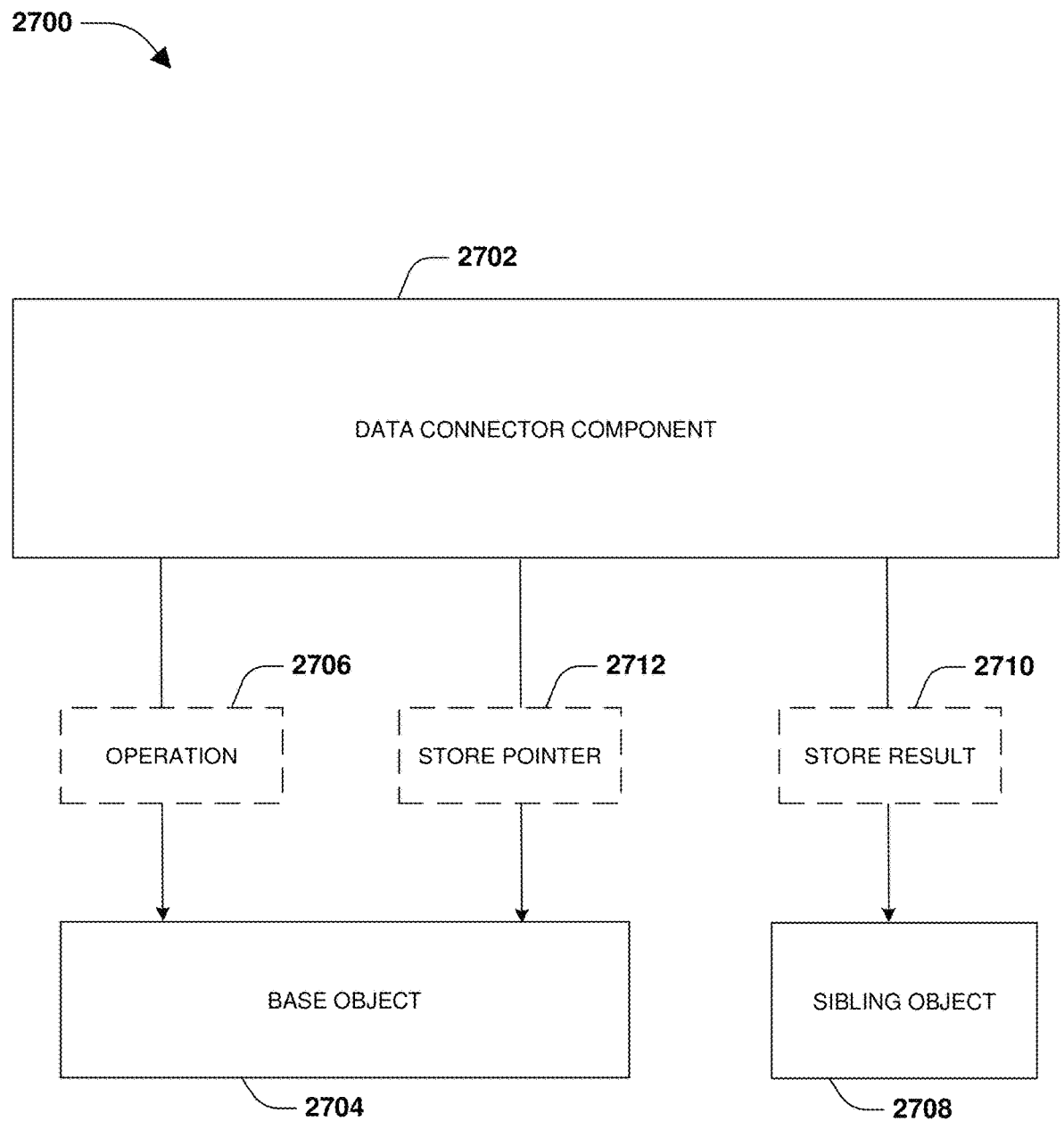
FIG. 27 is a component block diagram illustrating an example system for storing results of an operation within a sibling object.

One embodiment of storing results of an operation within a sibling object such as a sibling metadata object is illustrated by an exemplary method 2600 of FIG. 26 and further described in conjunction with system 2700 of FIG. 27. During operation 2602 of method 2600 of FIG. 26, snapshot data of a snapshot may be stored within a base object 2704 according to an object format where the snapshot data is structured according to a snapshot file system tree structure. A data connector component 2702 may be instantiated within a container for performing operations associated with the snapshot, the snapshot data, and/or the base object 2704. During operation 2604 of method 2600 of FIG. 26, the data connector component 2702 may perform an operation 2706 upon the base object 2704 to generate a result. In an example, the operation 2706 may correspond to an integrity check operation to determine whether there is any corruption with respect to the base object 2704. The result of the operation 2706 may correspond to whether an integrity issue was identified by the integrity checking operation. In an example, the operation 2706 may correspond to machine learning functionality. The machine learning functionality may utilize a machine learning model to evaluate the base object 2704, such as to determine whether a branch of the snapshot file system tree structure associated with snapshot data within the base object 2704 comprises corrupt data.

During operation 2606 of method 2600 of FIG. 26, a sibling object 2708 having the object format may be created. The sibling object 2708 may comprise a new metadata sibling object created within the object store. During operation 2608 of method 2600 of FIG. 26, the result of the operation 2706 being performed by the data connector component 2702 may be stored 2710 within the sibling object 2708. A pointer or other reference to the sibling object 2708 may be stored 2712 within the base object 2704. The pointer may point to the sibling object 2708, and thus may be used to access the result within the sibling object 2708 from the base object 2704. In an example, the snapshot data of the snapshot is stored within a set of fields (slots, bytes, etc.) within the base object 2704 (e.g., a first 10 fields/bytes may represent the snapshot data). The pointer may be stored 2712 within a separate field within the base object 2704. The separate field may be separate from the set of fields storing the snapshot data so that the storage 2712 of the pointer within the separate field does not affect the storage and representation of the snapshot data. In this way, the pointer within the base object 2704 may be utilized to access the results stored 2710 within the sibling object 2708.

In an embodiment, a request to access the snapshot data within the set of fields of the base object 2704 may be received. The request may be executed to access the snapshot data within the set of fields, while ignoring the separate field storing the pointer to the result within the sibling object 2708. Thus, storage of the pointer within the base object 2704 does not affect normal access to the snapshot data within the base object 2704. In this way, snapshot operations may be provided with selective access to the set of fields and may be blocked from accessing the separate field, pointer, sibling object 2708, and/or the result within the sibling object 2708. In an example, a first application may be provided with access to the snapshot data within set of fields in the base object 2704, and may be restricted from accessing the pointer within the base object 2704 and/or restricted from accessing the result within the sibling object 2708 based upon a first access privilege of the first application. A second application (or a data connector component) may be provided with access to the pointer within the base object 2704 based upon a second access privilege of the second application. The second application may use the pointer to access to the result within the sibling object 2708. The second application may be provided with access to the snapshot data within the base object 2704 or may be restricted from accessing the snapshot data within the base object 2704 based upon the second access privilege.

In an embodiment, the data connector component 2702 may utilize the machine learning model to implement the machine learning functionality to evaluate objects within the object store. The machine learning model may be trained based upon feedback corresponding to whether the machine learning functionality correctly or incorrectly identified data integrity issues (corrupt data) with respect to portions of an object (branches of a snapshot filesystem tree structure). A weight assigned to a parameter of the machine learning model may be reduced based upon the parameter being used to incorrectly identify the data integrity issue (e.g., identifying corrupt data that was actually not corrupt, or determining that data is not corrupt that is actually corrupt). A weight assigned to a parameter of the machine learning model may be increased based upon the parameter being used to correctly identify the data integrity issue. Once the machine learning model is trained, the machine learning model may be used by the data connector component 2702 to re-evaluate results of a prior data integrity check of an object to determine whether the results were correct or incorrect. In this way, the precision of integrity checking by the data connector component 2702 may be improved.

Figure 28:
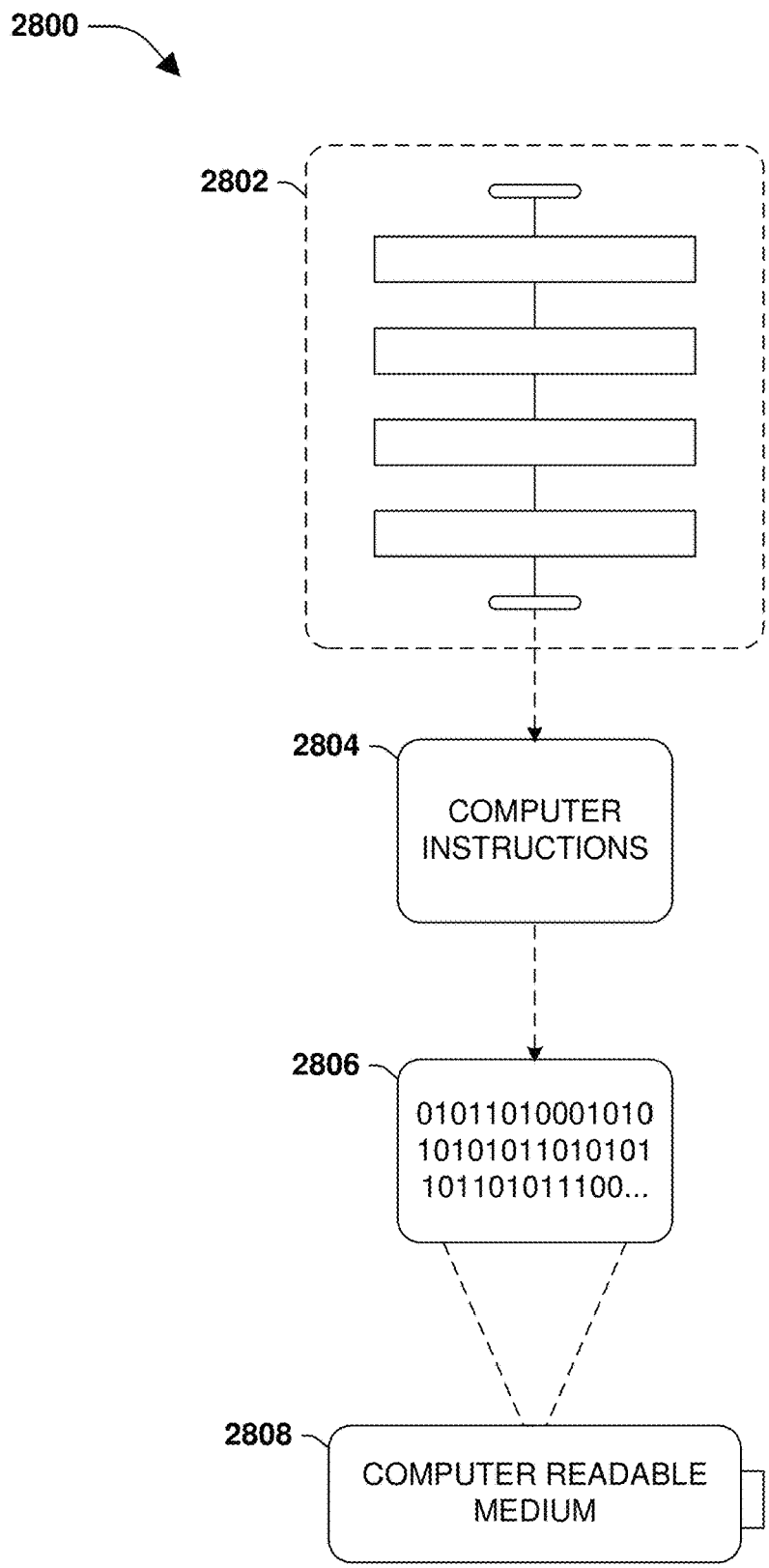
FIG. 28 is a component block diagram illustrating an example computing environment in which an embodiment of the invention may be implemented.

Still another embodiment involves a computer-readable medium 2800 comprising processor-executable instructions configured to implement one or more of the techniques presented herein. An example embodiment of a computer-readable medium or a computer-readable device that is devised in these ways is illustrated in FIG. 28, wherein the implementation comprises a computer-readable medium 2808, such as a compact disc-recordable (CD-R), a digital versatile disc-recordable (DVD-R), flash drive, a platter of a hard disk drive, etc., on which is encoded computer-readable data 2806. This computer-readable data 2806, such as binary data comprising at least one of a zero or a one, in turn comprises processor-executable computer instructions 2804 configured to operate according to one or more of the principles set forth herein. In some embodiments, the processor-executable computer instructions 2804 are configured to perform a method 2802, such as at least some of the exemplary method 600 of FIG. 6 and/or other methods described herein, for example. In some embodiments, the processor-executable computer instructions 2804 are configured to implement a system, such as at least some of the exemplary system 700 of FIG. 7 and/or other systems described herein, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
instantiating a data connector component as a container for accessing an object store within which objects comprising backup data of snapshots are stored within storage structures;
evaluating, by the data connector component, metadata associated with the snapshots to perform an integrity check for the objects by:
traversing a snapshot file system tree of a snapshot comprising backup data stored within the objects within the object store to verify a local aspect and a distributed aspect of the snapshot file system tree, wherein the integrity check verifies object header information as part of verifying the local aspect, and wherein the integrity check verifies that an expected number of files are associated with the snapshot as part of verifying the distributed aspect; and
in response to identifying an integrity issue with respect to an object of the objects, generating, by the data connector component, an indication of the integrity issue and performing an automated recovery action to correct the integrity issue.

2. The method of claim 1, comprising:
performing the integrity check to evaluate a bitmap for the snapshot to determine whether a set of objects, comprising backup data of the snapshot, are present within the object store, wherein the bitmap comprises bits corresponding to objects, and wherein a bit for the object is populated with a value to indicate whether backup data of the snapshot is stored within the object.

3. The method of claim 2, wherein the performing the integrity check comprising:
for each object of the set of objects identified as comprising the backup data of the snapshot based upon the bitmap, implementing a header API test to determine whether the object is present within the object store.

4. The method of claim 2, wherein the performing the integrity check comprising:
comparing the bitmap for the snapshot and a prior bitmap of a prior snapshot for which the integrity check was performed to identify a subset of objects to verify as being present within the object store based upon the subset of objects not being verified by the integrity check, and wherein objects checked by the integrity check are skipped for verifying the integrity of the snapshot.

5. The method of claim 1, comprising:
performing the integrity check to verify whether a value of a magic entry within an object header of the object comprises an expected value.

6. The method of claim 1, comprising:
performing the integrity check to verify whether a plurality of checksums for a plurality of slots within the single object match calculated checksums calculated for the slots, wherein the checksums are stored within an object header of the object.

7. The method of claim 1, comprising:
performing the integrity check to traverse the snapshot file system tree to verify a number of local aspects or a number of distributed aspects of the snapshot file system tree.

8. The method of claim 7, wherein the distributed aspect corresponds to a determination as to whether there is an expected number of directories, files, and data blocks associated with the snapshot and whether next pointers represent next levels within the snapshot file system tree of the snapshot.

9. The method of claim 1, comprising:
performing the integrity check to traverse the snapshot file system tree of the snapshot to verify that the snapshot file system tree is intact.

10. The method of claim 1, comprising:
performing the integrity check to traverse the snapshot file system tree to verify that the objects represent expected levels within the snapshot file system tree.

11. The method of claim 1, wherein the integrity check is triggered in response to performing a migration to verify that one or more objects associated with the migration were successfully migrated.

12. A non-transitory machine readable medium comprising instructions for performing a method, which when executed by a machine, causes the machine to:
instantiate a data connector component as a container for accessing an object store within which objects comprising backup data of snapshots are stored within storage structures;
evaluate, by the data connector component, metadata associated with the snapshots to perform an integrity check for the objects by:
  traversing a snapshot file system tree of a snapshot comprising backup data stored within the objects within the object store to verify a local aspect and a distributed aspect of the snapshot file system tree, wherein the integrity check verifies object header information as part of verifying the local aspect, and wherein the integrity check verifies that an expected number of files are associated with the snapshot as part of verifying the distributed aspect; and
in response to identifying an integrity issue with respect to an object of the objects, perform, by the data connector component, an automated recovery action to correct the integrity issue.

13. The non-transitory machine readable medium of claim 12, wherein the instructions cause the machine to:
perform the integrity check to determine whether a number of files modified in the snapshot during a timeframe conforms to an expected average of modifications to files calculated by an anomaly detection algorithm.

14. The non-transitory machine readable medium of claim 12, wherein the instructions cause the machine to:
perform the integrity check to determine whether an unexpected file operation has been performed with respect to the snapshot.

15. The non-transitory machine readable medium of claim 14, wherein the unexpected file operation corresponds to a delete operation.

16. The non-transitory machine readable medium of claim 12, wherein the instructions cause the machine to:
perform the integrity check to determine whether unexpected file encryption has been performed with respect to one or more objects.

17. The non-transitory machine readable medium of claim 12, wherein the instructions cause the machine to:
generate a physical view of data within the object for verifying an object format of the object and a logical view corresponding how a client device views the data within the object as files and directories.

18. A computing device comprising:
a memory comprising machine executable code for performing a method; and
a processor coupled to the memory, the processor configured to execute the machine executable code to cause the processor to:
  instantiate a data connector component as a container for accessing an object store within which objects comprising backup data of snapshots are stored within storage structures;
  evaluate, by the data connector component, metadata associated with the snapshots to perform file system metadata analysis for the objects by:
    traversing a snapshot file system tree of a snapshot comprising backup data stored within the objects within the object store to verify a local aspect and a distributed aspect of the snapshot file system tree, wherein the file system metadata analysis verifies object header information as part of verifying the local aspect, and wherein the file system metadata analysis verifies that an expected number of files are associated with the snapshot as part of verifying the distributed aspect; and
  generate, by the data connector component, a file system metadata analysis report based upon the file system metadata analysis and perform an automated recovery action to correct an integrity issue specified by the file system metadata analysis report.

19. The computing device of claim 18, wherein the machine executable code causes the processor to:
generate a view comprising at least one of a depiction of an amount of data change with respect to the objects or information relating to access patterns to files and directories over a time period.

20. The computing device of claim 18, wherein the machine executable code causes the processor to:
mine file attributes of files within the objects to generate a view derived from at least one of file modify time attributes, file creation times of files, sizes of files, types of files, rates of change modifications, entities that accessed the objects, times of the entities accessing the objects, or space consumed by the objects.

* * * * *